(12) United States Patent
Fujie et al.

(10) Patent No.: US 9,701,839 B2
(45) Date of Patent: Jul. 11, 2017

(54) COMPOUND, COLORING COMPOSITION, INK JET RECORDING INK, INK JET RECORDING METHOD, INK JET PRINTER CARTRIDGE, INK JET RECORDING MATERIAL, COLOR FILTER, COLOR TONER, AND TRANSFER INK

(71) Applicant: FUJIFILM Corporation, Tokyo (JP)

(72) Inventors: Yoshihiko Fujie, Kanagawa (JP); Yusuke Sakai, Kanagawa (JP); Keiichi Tateishi, Kanagawa (JP); Hiromi Kobayashi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/202,074

(22) Filed: Jul. 5, 2016

(65) Prior Publication Data

US 2016/0312032 A1 Oct. 27, 2016

Related U.S. Application Data

(63) Continuation of application No. PCT/JP2015/050187, filed on Jan. 6, 2015.

(30) Foreign Application Priority Data

| Jan. 10, 2014 | (JP) | 2014-003571 |
| Apr. 11, 2014 | (JP) | 2014-082185 |
| Aug. 20, 2014 | (JP) | 2014-167833 |
| Dec. 26, 2014 | (JP) | 2014-266429 |

(51) Int. Cl.
| *C09B 11/28* | (2006.01) |
| *B41J 2/01* | (2006.01) |
| *C09D 11/328* | (2014.01) |
| *G03G 9/09* | (2006.01) |
| *C09B 11/24* | (2006.01) |
| *G02B 5/20* | (2006.01) |

(52) U.S. Cl.
CPC .............. *C09B 11/28* (2013.01); *B41J 2/01* (2013.01); *C09B 11/24* (2013.01); *C09D 11/328* (2013.01); *G03G 9/09* (2013.01); *G03G 9/0906* (2013.01); *G03G 9/0924* (2013.01); *G02B 5/201* (2013.01)

(58) Field of Classification Search
CPC ....................................................... C09B 11/28
USPC ....................................................... 549/394
See application file for complete search history.

(56) References Cited

U.S. PATENT DOCUMENTS

| 7,237,886 B2 | 7/2007 | Maekawa et al. |
| 7,700,252 B2 | 4/2010 | Silence et al. |
| 8,343,269 B2 | 1/2013 | Takahashi et al. |
| 9,023,139 B2 * | 5/2015 | Fujie ............. C09B 11/24 106/31.43 |

FOREIGN PATENT DOCUMENTS

| EP | 1 702 611 A2 | 9/2006 |
| JP | 60-156762 A | 8/1985 |
| JP | 9-241553 A | 9/1997 |
| JP | 2004-107647 A | 4/2004 |
| JP | 2008-127572 A | 6/2008 |
| JP | 2011-148973 A | 8/2011 |
| WO | 2012/124792 A1 | 9/2012 |
| WO | 2014/002335 A1 | 1/2014 |

OTHER PUBLICATIONS

Communication dated Jan. 6, 2015 issued by International Searching Authority in counterpart International Application No. PCT/JP2015/050187 (PCT/IPEA/409).
Written Opinion dated Mar. 10, 2015 issued by International Searching Authority in counterpart International Application No. PCT/JP2015/050187 (PCT/ISA/237).
International Search Report dated Mar. 10, 2015 issued by International Searching Authority in counterpart International Application No. PCT/JP2015/050187 (PCT/ISA/210).
Communication dated Jan. 25, 2016 issued by International Searching Authority in counterpart International Application No. PCT/JP2015/050187 (PCT/IPEA/409).

(Continued)

*Primary Examiner* — Taofiq A Solola
(74) *Attorney, Agent, or Firm* — Sughrue Mion, PLLC

(57) ABSTRACT

The present invention relates to a compound which is represented by General Formula (1), a coloring composition which includes the compound, an ink jet recording ink, an ink jet recording method using the ink jet recording ink, an ink jet printer cartridge, an ink jet recording material, a color filter, a color toner, and a transfer ink.

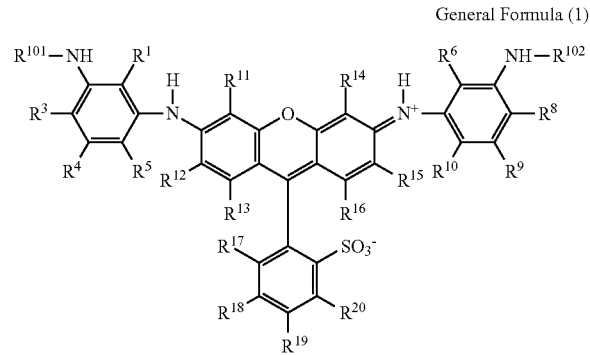

General Formula (1)

18 Claims, 3 Drawing Sheets

(56) References Cited

OTHER PUBLICATIONS

Extended European Search Report dated Feb. 16, 2017 issued by European Patent Office in counterpart European Application No. 15735297.2.
Office Action mailed Mar. 14, 2017, issued by the Japanese Patent Office in counterpart Japanese Application No. 2014-266429.
Office Action issued on Nov. 28, 2016, by the State Intellectual Property Office in counterpart Chinese Application No. 201580004033.6.

* cited by examiner

COMPOUND, COLORING COMPOSITION, INK JET RECORDING INK, INK JET RECORDING METHOD, INK JET PRINTER CARTRIDGE, INK JET RECORDING MATERIAL, COLOR FILTER, COLOR TONER, AND TRANSFER INK

CROSS REFERENCE TO RELATED APPLICATION

This is a continuation of International Application No. PCT/JP2015/050187 filed on Jan. 6, 2015, and claims priority from Japanese Patent Applications No. 2014-003571 filed on Jan. 10, 2014, No. 2014-082185 filed on Apr. 11, 2014, No. 2014-167833 filed on Aug. 20, 2014 and No. 2014-266429 filed on Dec. 26, 2014 the entire disclosures of which are incorporated herein by reference.

BACKGROUND OF THE INVENTION

1. Field of the Invention

The present invention relates to a compound, a coloring composition which includes the compound, an ink jet recording ink, an ink jet recording method, an ink jet printer cartridge, an ink jet recording material, a color filter, a color toner, and a transfer ink.

2. Description of the Related Art

As is known in the art, an ink jet recording method is a method in which printing is carried out by causing small droplets of ink to fly and attach to a recording medium such as paper. It is possible for this printing method to quickly and easily print high-quality images with high resolution using an inexpensive apparatus and, particularly in color printing, techniques have been developed in recent years for image forming methods which may substitute for photographs.

In a case of forming color images using an ink jet recording method, at least a yellow ink, a magenta ink, a cyan ink, and a black ink are generally used. For these inks, there is a demand for characteristics such as physical properties such as viscosity and surface tension to be in appropriate ranges, for excellence in terms of nozzle clogging and preservation stability and providing high-density recorded images, and, moreover, for excellence in terms of lightfastness, ozone resistance, water resistance, and moisture resistance.

Using a water-based ink which has water or a mixture of water and a water-soluble organic solvent as a main solvent satisfies most of the performances at the required level; however, in particular, color tone, saturation, lightfastness, ozone resistance, water resistance, moisture resistance, and the like are greatly affected by the coloring agent and research has been carried out on various dyes in the prior art.

For example, JP2011-148973A describes a xanthene compound, in which an acyl amino group is substituted, and studies have been carried out on the saturation, lightfastness, and ozone resistance of ink jet recording materials which are formed using a coloring composition including this compound.

SUMMARY OF THE INVENTION

However, there is a demand for further improvement in performance with regard to the field of dyes and there is a demand for a compound which has high saturation, high printing density, and which is able to further improve image fastnesses such as lightfastness and ozone resistance.

The present invention has an object of providing a compound and a coloring composition which have high saturation and excellent printing density and which are able to form images with excellent lightfastness and ozone resistance. In addition, the present invention has an object of providing an ink jet recording ink which contains the compound and the coloring composition described above, an ink jet recording method using the ink jet recording ink, an ink jet printer cartridge, and an ink jet recording material. Furthermore, the present invention has an object of providing a color filter, a color toner, and a transfer ink which contain the compound described above.

That is, the present invention is as follows.

[1]

A compound which is represented by General Formula (1) below.

General Formula (1)

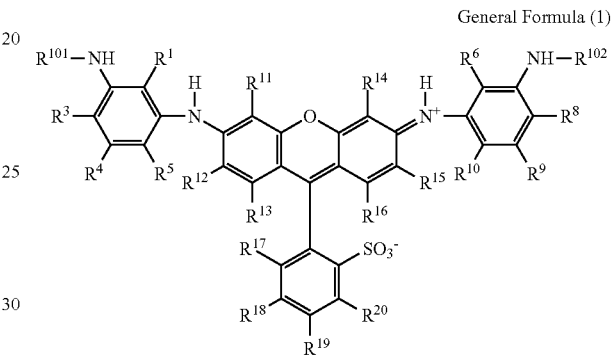

In General Formula (1), $R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, and $R^{20}$ each independently represent a hydrogen atom or a substituent group, and $R^{101}$ and $R^{102}$ each independently represent a substituted or unsubstituted alkyl group, a substituted or unsubstituted aryl group, a substituted or unsubstituted heterocyclic group, a substituted or unsubstituted alkylsulfonyl group, a substituted or unsubstituted arylsulfonyl group, a substituted or unsubstituted alkoxycarbonyl group, a substituted or unsubstituted aryloxycarbonyl group, a carbamoyl group, a substituted or unsubstituted mono alkyl amino carbonyl group, a substituted or unsubstituted dialkyl amino carbonyl group, a substituted or unsubstituted monoaryl amino carbonyl group, a substituted or unsubstituted diaryl amino carbonyl group, or a substituted or unsubstituted alkyl aryl amino carbonyl group.

[2]

The compound according to [1], in which $R^{101}$ and $R^{102}$ each independently represent a substituted or unsubstituted alkylsulfonyl group, a substituted or unsubstituted arylsulfonyl group, a substituted or unsubstituted alkoxycarbonyl group, a substituted or unsubstituted aryloxycarbonyl group, a carbamoyl group, a substituted or unsubstituted mono alkyl amino carbonyl group, a substituted or unsubstituted dialkyl amino carbonyl group, a substituted or unsubstituted monoaryl amino carbonyl group, or a substituted or unsubstituted diaryl amino carbonyl group.

[3]

The compound according to [1] or [2], in which $R^1$, $R^5$, $R^6$, and $R^{10}$ each independently represent an alkyl group with 1 to 6 carbon atoms.

[4]

The compound according to any one of [1] to [3], in which $R^4$ and $R^9$ each independently represent a sulfo group.

[5]
The compound according to any one of [1] to [4], in which $R^{12}$ and $R^{15}$ each independently represent a sulfo group.

[6]
The compound according to any one of [1] to [5] in which $R^3$ and $R^8$ each independently represent an alkyl group with 1 to 6 carbon atoms.

[7]
A coloring composition comprising the compound according to any one of [1] to [6].

[8]
An ink jet recording ink comprising the compound according to any one of [1] to [6].

[9]
An ink jet recording method which uses the ink jet recording ink according to [8].

[10]
An ink jet printer cartridge which is filled with the ink jet recording ink according to [8].

[11] An ink jet recording material which forms a color image on a target recording material using the ink jet recording ink according to [8].

[12]
A color filter comprising the compound according to any one of [1] to [6].

[13]
A color toner comprising the compound according to any one of [1] to [6].

[14]
A transfer ink comprising the compound according to any one of [1] to [6].

The compound of the present invention is able to be suitably used for a coloring composition and an ink jet recording ink. The coloring composition and the ink jet recording ink of the present invention have high saturation and excellent printing density and are able to form images with excellent lightfastness and ozone resistance. In addition, the present invention provides an ink jet recording method, an ink jet printer cartridge, and an ink jet recording material which use the ink jet recording ink described above. Furthermore, the present invention provides a color filter, a color toner, and a transfer ink which contain the compound described above.

DESCRIPTION OF THE PREFERRED EMBODIMENTS

Figure 1:
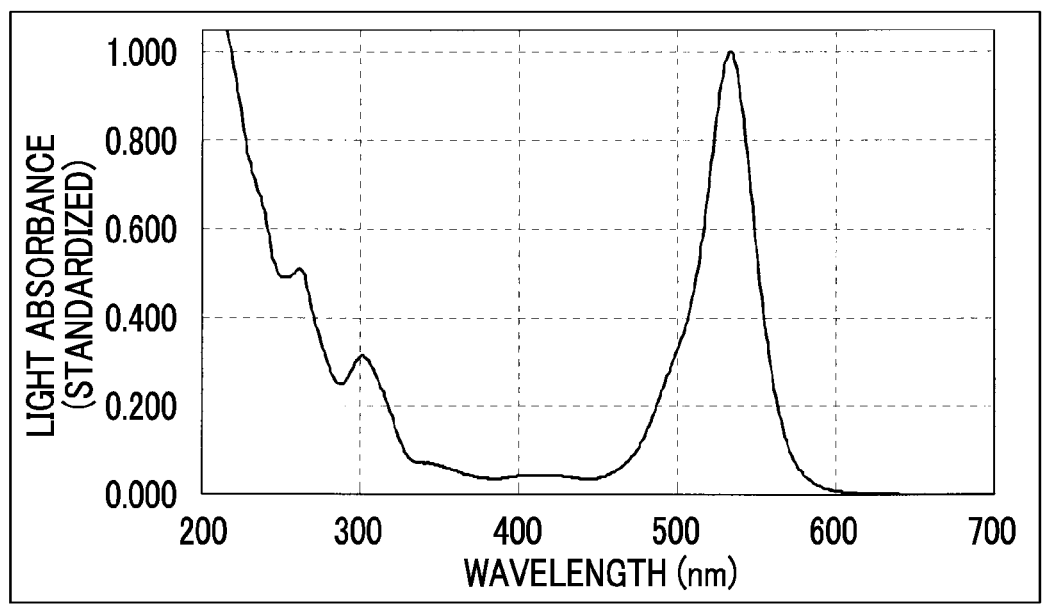
FIG. 1 is a diagram which shows an absorption spectrum in a diluted aqueous solution of Exemplified Compound (1-29).

Detailed description will be given below of the present invention.

First, specific examples of substituent groups in the present invention will be defined as a substituent group A.

(Substituent Group A)
Examples of the substituent group A include a halogen atom, an alkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acyl amino group, an amino carbonyl amino group, an alkoxycarbonyl amino group, an aryloxycarbonyl amino group, a sulfamoyl amino group, an alkyl or an aryl sulfonyl amino group, a mercapto group, an alkylthio group, an arylthio group, a heterocyclic thio group, a sulfamoyl group, an alkyl or an arylsulfinyl group, an alkyl or an arylsulfonyl group, an acyl group, an aryloxycarbonyl group, an alkoxycarbonyl group, a carbamoyl group, an aryl or a heterocyclic azo group, an imide group, a phosphino group, a phosphinyl group, a phosphinyloxy group, a phosphinyl amino group, a silyl group, an ionic hydrophilic group. These substituent groups may be further substituted and examples of further substituent groups include groups which are selected from the substituted group A described above.

Examples of halogen atoms include a fluorine atom, a chlorine atom, a bromine atom, or an iodine atom.

Examples of alkyl groups include a substituted or unsubstituted alkyl group which takes a straight-chain form, a branched form, or a cyclic form, and encompass a cycloalkyl group, a bicycloalkyl group, a tricyclo structure with large number of cyclic structures, and the like. Alkyl groups in the substituent groups which will be described below (for example, an alkoxy group, or an alkyl group in an alkylthio group) also represent alkyl groups following this concept.

Preferable alkyl groups include an alkyl group with 1 to 30 carbon atoms, for example, a methyl group, an ethyl group, a n-propyl group, an i-propyl group, a t-butyl group, an n-octyl group, an eicosyl group, a 2-chloroethyl group, a 2-cyanoethyl group, a 2-ethylhexyl group, and the like, preferable cycloalkyl groups include a substituted or unsubstituted cycloalkyl group with 3 to 30 carbon atoms, for example, a cyclohexyl group, a cyclopentyl group, a 4-n-dodecyl cyclohexyl group, and the like, and preferable bicycloalkyl groups include a substituted or unsubstituted bicycloalkyl group with 5 to 30 carbon atoms, that is, a monovalent group obtained by removing one hydrogen atom from bicycloalkane with 5 to 30 carbon atoms, for example, a bicyclo [1,2,2]heptan-2-yl group, a bicyclo [2,2,2]octan-3-yl group, and the like.

Examples of aralkyl groups include a substituted or unsubstituted aralkyl groups and the substituted or unsubstituted aralkyl group is preferably an aralkyl group with 7 to 30 carbon atoms. Examples thereof include a benzyl group and a 2-phenethyl group.

Examples of alkenyl groups include a substituted or unsubstituted alkenyl group which takes a straight-chain form, a branched form, or a cyclic form, and encompass a cycloalkenyl group, and a bicycloalkenyl group.

Preferred examples of alkenyl groups include a substituted or unsubstituted alkenyl group with 2 to 30 carbon atoms, for example, a vinyl group, an allyl group, a prenyl group, a geranyl group, an oleyl group, and the like, preferable cycloalkenyl groups include a substituted or unsubstituted cycloalkenyl group with 3 to 30 carbon atoms, that is, a monovalent group obtained by removing one hydrogen atom from cycloalkene with 3 to 30 carbon atoms, for example, a 2-cyclopentene-1-yl group, a 2-cyclohexene-1-yl group, and the like, and examples of bicycloalkenyl groups include a substituted or unsubstituted bicycloalkenyl group, preferably, a substituted or unsubstituted bicycloalkenyl group with 5 to 30 carbon atoms, that is, a monovalent group obtained by removing one hydrogen atom from bicycloalkene which has one double bond, for example, a bicyclo [2,2,1]hept-2-en-1-yl group, a bicyclo [2,2,2]oct-2-en-4-yl group, and the like.

Preferable examples of alkynyl groups include a substituted or unsubstituted alkynyl group with 2 to 30 carbon atoms, for example, an ethynyl group, a propargyl group, a trimethylsilylethynyl group, and the like.

Preferable examples of aryl groups include a substituted or unsubstituted aryl group with 6 to 30 carbon atoms, for example, a phenyl group, a p-tolyl group, a naphthyl group, an m-chlorophenyl group, an o-hexadecanoyl amino phenyl group, and the like.

Preferable examples of heterocyclic groups include a monovalent group obtained by removing one hydrogen atom from a 5- or 6-membered, substituted or unsubstituted aromatic or non-aromatic heterocyclic compound, more preferably a 5- or 6-membered aromatic heterocyclic group with 3 to 30 carbon atoms, for example, a 2-furyl group, a 2-thienyl group, a 2-pyrimidinyl group, a 2-benzothiazolyl group, and the like. Examples of non-aromatic heterocyclic groups include a morpholinyl group and the like.

Preferable examples of alkoxy groups include a substituted or unsubstituted alkoxy group with 1 to 30 carbon atoms, for example, a methoxy group, an ethoxy group, an isopropoxy group, a t-butoxy group, an n-octyloxy group, a 2-methoxy ethoxy group, and the like.

Preferable examples of aryloxy groups include a substituted or unsubstituted aryloxy group with 6 to 30 carbon atoms, for example, a phenoxy group, a 2-methylphenoxy group, a 4-t-butyl phenoxy group, a 3-nitrophenoxy group, a 2-tetradecanoyl amino phenoxy group, and the like.

Preferable examples of silyloxy groups include a substituted or unsubstituted silyloxy group with 0 to 20 carbon atoms, for example, a trimethylsilyloxy group, a diphenyl methyl silyloxy group, and the like.

Preferable examples of heterocyclic oxy groups include a substituted or unsubstituted heterocyclic oxy group with 2 to 30 carbon atoms, for example, a 1-phenyltetrazole-5-oxy group, a 2-tetrahydropyranyloxy group, and the like.

Preferable examples of acyloxy groups include a formyloxy group, a substituted or unsubstituted alkylcarbonyloxy group with 2 to 30 carbon atoms, a substituted or unsubstituted arylcarbonyloxy group with 6 to 30 carbon atoms, for example, an acetyloxy group, a pivaloyloxy group, a stearoyloxy group, a benzoyloxy group, and a p-methoxyphenyl carbonyloxy group.

Preferable examples of carbamoyloxy groups include a substituted or unsubstituted carbamoyloxy group with 1 to 30 carbon atoms, for example, an N,N-dimethylcarbamoyloxy group, an N,N-diethylcarbamoyloxy group, a morpholinocarbonyloxy group, an N,N-di-n-octyl amino carbonyl group, an N-n-octyl carbamoyloxy group, and the like.

Preferable examples of alkoxycarbonyloxy groups include a substituted or unsubstituted alkoxycarbonyloxy group with 2 to 30 carbon atoms, for example, a methoxycarbonyl group, an ethoxycarbonyloxy group, a t-butoxycarbonyloxy group, an n-octylcarbonyloxy group, and the like.

Preferable examples of aryloxycarbonyloxy groups include a substituted or unsubstituted aryloxycarbonyloxy group with 7 to 30 carbon atoms, for example, a phenoxycarbonyloxy group, a p-methoxyphenoxycarbonyloxy group, a p-n-hexadecyloxy phenoxycarbonyloxy group, and the like.

Examples of amino groups include an alkyl amino group, an aryl amino group, and a heterocyclic amino group, preferable amino groups include a substituted or unsubstituted alkyl amino group with 1 to 30 carbon atoms, a substituted or unsubstituted anilino group with 6 to 30 carbon atoms, for example, a methyl amino group, a dimethyl amino group, an anilino group, an N-methyl-anilino group, a diphenyl amino group, a triazinyl amino group, and the like.

Preferable examples of acyl amino groups include a formyl amino group, a substituted or unsubstituted alkyl carbonyl amino group with 1 to 30 carbon atoms, a substituted or unsubstituted aryl carbonyl amino group with 6 to 30 carbon atoms, for example, an acetyl amino group, a pivaloyl amino group, a lauroyl amino group, a benzoyl amino group, a 3,4,5-tri-n-octyloxyphenylcarbonyl amino group, and the like.

Preferable examples of amino carbonyl amino groups include a substituted or unsubstituted amino carbonyl amino group with 1 to 30 carbon atoms, for example, a carbamoyl amino group, an N,N-dimethyl amino carbonyl amino group, an N,N-diethyl amino carbonyl amino group, a morpholinocarbonyl amino group, and the like.

Preferable examples of alkoxycarbonyl amino groups include a substituted or unsubstituted alkoxycarbonyl amino group with 2 to 30 carbon atoms, for example, a methoxycarbonyl amino group, an ethoxycarbonyl amino group, a t-butoxycarbonyl amino group, an n-octadecyl oxycarbonyl amino group, an N-methyl-methoxycarbonyl amino group, and the like.

Preferable examples of aryloxycarbonyl amino groups include a substituted or unsubstituted aryloxycarbonyl amino group with 7 to 30 carbon atoms, for example, a phenoxycarbonyl amino group, a p-chlorophenoxycarbonyl amino group, an m-n-octyloxy phenoxycarbonyl amino group, and the like.

Preferable examples of sulfamoyl amino groups include a substituted or unsubstituted sulfamoyl amino group with 0 to 30 carbon atoms, for example, a sulfamoyl amino group, a N,N-dimethyl amino sulfonyl amino group, a N-n-octyl amino sulfonyl amino group, and the like.

Preferable examples of alkyl or aryl sulfonyl amino groups include a substituted or unsubstituted alkylsulfonyl amino group with 1 to 30 carbon atoms, a substituted or unsubstituted arylsulfonyl amino group with 6 to 30 carbon atoms, for example, a methylsulfonyl amino group, a butylsulfonyl amino group, a phenylsulfonyl amino group, a 2,3,5-trichlorophenyl sulfonyl amino group, a p-methylphenylsulfonyl amino group, and the like.

Preferable examples of alkylthio groups include a substituted or unsubstituted alkylthio group with 1 to 30 carbon atoms, for example, a methylthio group, an ethylthio group, an n-hexadecylthio group, and the like.

Preferable examples of arylthio groups include a substituted or unsubstituted arylthio group with 6 to 30 carbon atoms, for example, a phenylthio group, a p-chlorophenylthio group, an m-methoxyphenylthio group, and the like.

Preferable examples of heterocyclic thio groups include a substituted or unsubstituted heterocyclic thio group with 2 to 30 carbon atoms, for example, a 2-benzothiazolylthio group, a 1-phenyltetrazole-5-ylthio group, and the like.

Preferable examples of sulfamoyl groups include a substituted or unsubstituted sulfamoyl group with 0 to 30 carbon atoms, for example, an N-ethyl sulfamoyl group, an N-(3-dodecyloxypropyl) sulfamoyl group, an N,N-dimethylsulfamoyl group, an N-acetylsulfamoyl group, an N-benzoylsulfamoyl group, an N—(N'-phenylcarbamoyl) sulfamoyl group, and the like.

Preferable examples of alkyl or aryl sulfinyl groups include a substituted or unsubstituted alkylsulfinyl group with 1 to 30 carbon atoms, a substituted or unsubstituted arylsulfinyl group with 6 to 30 carbon atoms, for example, a methylsulfinyl group, an ethylsulfinyl group, a phenylsulfinyl group, a p-methylphenylsulfinyl group, and the like.

Preferable examples of alkyl or arylsulfonyl groups include a substituted or unsubstituted alkylsulfonyl group with 1 to 30 carbon atoms, a substituted or unsubstituted arylsulfonyl group with 6 to 30 carbon atoms, for example, a methylsulfonyl group, an ethylsulfonyl group, a phenylsulfonyl group, a p-methylphenylsulfonyl group, and the like.

Preferable examples of acyl groups include a formyl group, a substituted or unsubstituted alkylcarbonyl group with 2 to 30 carbon atoms, a substituted or unsubstituted aryl carbonyl group with 7 to 30 carbon atoms, a substituted or unsubstituted heterocyclic carbonyl group with 2 to 30 carbon atoms which is bonded with a carbonyl group by carbon atoms, for example, an acetyl group, a pivaloyl group, a 2-chloroacetyl group, a stearoyl group, a benzoyl group, a p-n-octyloxyphenylcarbonyl group, a 2-pyridycarbonyl group, a 2-furylcarbonyl group, and the like.

Preferable examples of aryloxycarbonyl groups include a substituted or unsubstituted aryloxycarbonyl group with 7 to 30 carbon atoms, for example, a phenoxycarbonyl group, an o-chlorophenoxycarbonyl group, an m-nitrophenoxycarbonyl group, a p-t-butylphenoxycarbonyl group, and the like.

Preferable examples of alkoxycarbonyl groups include a substituted or unsubstituted alkoxycarbonyl group with 2 to 30 carbon atoms, for example, a methoxycarbonyl group, an ethoxycarbonyl group, a t-butoxycarbonyl group, and an n-octadecyl oxycarbonyl group.

Preferable examples of carbamoyl groups include a substituted or unsubstituted carbamoyl group with 1 to 30 carbon atoms, for example, a carbamoyl group, an N-methylcarbamoyl group, an N,N-dimethylcarbamoyl group, an N,N-di-n-octylcarbamoyl group, an N-(methylsulfonyl) carbamoyl group, and the like.

Preferable examples of aryl or heterocyclic azo groups include a substituted or unsubstituted arylazo group with 6 to 30 carbon atoms, a substituted or unsubstituted heterocyclic azo group with 3 to 30 carbon atoms, for example, a phenylazo group, a p-chlorophenyl azo group, a 5-ethylthio-1,3,4-thiadiazol-2-yl azo group, and the like.

Preferable examples of imide groups include an N-succinimide group, an N-phthalimide group, and the like.

Preferable examples of phosphino groups include a substituted or unsubstituted phosphino group with 0 to 30 carbon atoms, for example, a dimethylphosphino group, a diphenylphosphino group, a methylphenoxyphosphino group, and the like.

Preferable examples of phosphinyl groups include a substituted or unsubstituted phosphinyl group with 0 to 30 carbon atoms, for example, a phosphinyl group, a dioctyloxyphosphinyl group, a diethoxyphosphinyl group, and the like.

Preferable examples of phosphinyloxy groups include a substituted or unsubstituted phosphinyloxy group with 0 to 30 carbon atoms, for example, a diphenoxy phosphinyloxy group, a dioctyloxyphosphinyloxy group, and the like.

Preferable examples of phosphinyl amino groups include a substituted or unsubstituted phosphinyl amino group with 0 to 30 carbon atoms, for example, a dimethoxyphosphinyl amino group, a dimethyl amino phosphinyl amino group, and the like.

Preferable examples of silyl groups include a substituted or unsubstituted silyl group with 0 to 30 carbon atoms, for example, a trimethylsilyl group, a t-butyldimethylsilyl group, a phenyldimethylsilyl group, and the like.

Examples of ionic hydrophilic groups include a sulfo group, a carboxyl group, a thiocarboxyl group, a sulfino group, a phosphono group, a dihydroxyphosphino group, a quaternary ammonium group, and the like. A sulfo group and a carboxyl group are particularly preferable. In addition, a carboxyl group, a phosphono group and a sulfo group may be in a salt state, and examples of counter cations which form salts include ammonium ions, alkali metal ions (for example, lithium ions, sodium ions, and potassium ions), and organic cations (for example, tetramethylammonium ions, tetramethylguanidium ions, and tetramethylphosphonium), and lithium salt, sodium salt, potassium salt, and ammonium salt are preferable, sodium salt or mixed salt which has sodium salt as the main component are more preferable, and sodium salt is most preferable.

Here, in a case where the compound is salt in the present invention, the salt is present in a state of being dissociated into ions in a water-soluble ink.

[Compound which is Represented by General Formula (1)]

Description will be given of the compound which is represented by General Formula (1) below.

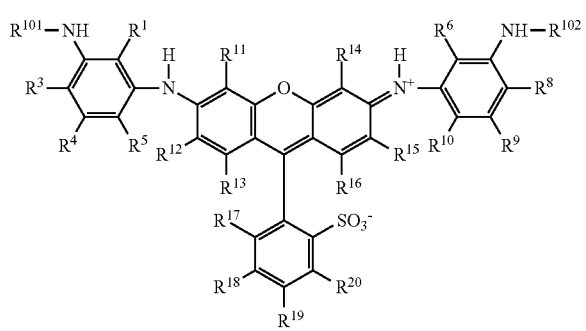

General Formula (1)

In General Formula (1), $R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, and $R^{20}$ each independently represent a hydrogen atom or a substituent group, $R^{101}$ and $R^{102}$ each independently represent a substituted or unsubstituted alkyl group, a substituted or unsubstituted aryl group, a substituted or unsubstituted heterocyclic group, a substituted or unsubstituted alkylsulfonyl group, a substituted or unsubstituted arylsulfonyl group, a substituted or unsubstituted alkoxycarbonyl group, a substituted or unsubstituted aryloxycarbonyl group, a carbamoyl group, a substituted or unsubstituted mono alkyl amino carbonyl group, a substituted or unsubstituted dialkyl amino carbonyl group, a substituted or unsubstituted monoaryl amino carbonyl group, a substituted or unsubstituted diaryl amino carbonyl group, or a substituted or unsubstituted alkyl aryl amino carbonyl group.

The compound which is represented by General Formula (1) has an amino group which has a specific substituent group. The action mechanism thereof is not clear; however, it is assumed that, the compound exhibits high saturation, excellent printing density, excellent lightfastness, and ozone resistance due to the compound having the kind of mechanism which is represented by General Formula (1).

In General Formula (1), $R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$ and $R^{20}$ each independently represent a hydrogen atom or a substituent group. In a case where $R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$ and $R^{20}$ are represented by a substituent group, examples of the substituent groups include a substituent group which is selected from the substituent group A described above.

In General Formula (1), from the point of view of the availability of raw materials and ease of synthesis, $R^1$, $R^5$, $R^6$ and $R^{10}$ preferably each independently represent a hydrogen atom, a substituted or unsubstituted alkyl group, a substituted or unsubstituted aryl group, a substituted or unsubstituted alkoxy group, a substituted or unsubstituted aryloxy group, a carboxyl group, or a halogen atom, more preferably, a substituted or unsubstituted alkyl group, a substituted or unsubstituted aryl group, a substituted or unsubstituted alkoxy group, and particularly preferably a substituted or unsubstituted alkyl group. The alkyl group is preferably an alkyl group with 1 to 6 carbon atoms, more preferably an alkyl group with 1 to 3 carbon atoms, and a methyl group is even more preferable. In addition, in a case of each group having a substituent group, examples of the substituent groups include a substituent group which is selected from the substituent group A described above.

In General Formula (1), from the point of view of the availability of raw materials, ease of synthesis, lightfastness, ozone resistance, printing density, and saturation, $R^4$ and $R^9$ preferably each independently represent a hydrogen atom, a substituted or unsubstituted alkyl group, a substituted or unsubstituted aryl group, a substituted or unsubstituted alkoxy group, a substituted or unsubstituted aryloxy group, a substituted or unsubstituted amino group, a substituted or unsubstituted acyl amino group, a substituted or unsubstituted alkoxycarbonyl amino group, a substituted or unsubstituted alkylsulfonyl amino group, a substituted or unsubstituted arylsulfonyl amino group, a substituted or unsubstituted alkyl ureido group, a substituted or unsubstituted aryl ureido group, a sulfo group, a carboxyl group, or a halogen atom, more preferably a hydrogen atom, a substituted or unsubstituted acyl amino group, a substituted or unsubstituted alkoxycarbonyl amino group, a substituted or unsubstituted alkylsulfonyl amino group, a substituted or unsubstituted arylsulfonyl amino group, a substituted or unsubstituted alkyl ureido group, a substituted or unsubstituted aryl ureido group, or a sulfo group, and particularly preferably a hydrogen atom or a sulfo group. In addition, in a case of each group having a substituent group, examples of the substituent groups include a substituent group which is selected from the substituent group A described above.

In General Formula (1), from the point of view of the availability of raw materials and ease of synthesis, $R^3$ and $R^8$ preferably each independently represent a hydrogen atom, a substituted or unsubstituted alkyl group, a substituted or unsubstituted aryl group, a substituted or unsubstituted alkoxy group, a substituted or unsubstituted aryloxy group, a substituted or unsubstituted amino group, a substituted or unsubstituted acyl amino group, a substituted or unsubstituted alkoxycarbonyl amino group, a substituted or unsubstituted alkylsulfonyl amino group, a substituted or unsubstituted arylsulfonyl amino group, a substituted or unsubstituted alkyl ureido group, a substituted or unsubstituted aryl ureido group, a sulfo group, a carboxyl group, or a halogen atom, more preferably a hydrogen atom, a substituted or unsubstituted alkyl group, or a sulfo group, and particularly preferably a substituted or unsubstituted alkyl group. Preferable examples of the alkyl groups include an alkyl group with 1 to 6 carbon atoms, more preferably an alkyl group with 1 to 3 carbon atoms, and even more preferably a methyl group. In addition, in a case of each group having a substituent group, examples of the substituent groups include a substituent group which is selected from the substituent group A described above.

In General Formula (1), from the point of view of the availability of raw materials and ease of synthesis, $R^{11}$, $R^{14}$, $R^{13}$, $R^{16}$, $R^{17}$, $R^{18}$, $R^{19}$ and $R^{20}$ preferably each independently represent a hydrogen atom, a substituted or unsubstituted alkyl group, a substituted or unsubstituted aryl group, a substituted or unsubstituted alkoxy group, a substituted or unsubstituted aryloxy group, a hydroxy group, a halogen atom, or a sulfo group, more preferably a hydrogen atom, a hydroxy group, a halogen atom, or a sulfo group, and particularly preferably a hydrogen atom. In addition, in a case of each group having a substituent group, examples of the substituent groups include a substituent group which is selected from the substituent group A described above.

In General Formula (1), from the point of view of the availability of raw materials and ease of synthesis, $R^{12}$ and $R^{15}$ preferably each independently represent a hydrogen atom, a substituted or unsubstituted alkyl group, a substituted or unsubstituted aryl group, a halogen atom, or a sulfo group, more preferably a hydrogen atom or a sulfo group. In addition, in a case of each group having a substituent group, examples of the substituent groups include a substituent group which is selected from the substituent group A described above.

In addition, from the point of view of solubility, in General Formula (1), at least one of $R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, and $R^{20}$ preferably have an ionic hydrophilic group such as a carboxyl group, a sulfo group, or a phosphono group. Examples of the counter cations of these ionic hydrophilic groups include a hydrogen atom (proton), alkali metal cations (lithium ions, sodium ions, or potassium ions), ammonium ions, and the like; however, from the point of view of ease of synthesis (ease of handling as dye powder), alkali metal cations are preferable.

In General Formula (1), $R^{101}$ and $R^{102}$ each independently represent a substituted or unsubstituted alkyl group, a substituted or unsubstituted aryl group, a substituted or unsubstituted heterocyclic group, a substituted or unsubstituted alkylsulfonyl group, a substituted or unsubstituted arylsulfonyl group, a substituted or unsubstituted alkoxycarbonyl group, a substituted or unsubstituted aryloxycarbonyl group, a carbamoyl group, a substituted or unsubstituted mono alkyl amino carbonyl group, a substituted or unsubstituted dialkyl amino carbonyl group, a substituted or unsubstituted monoaryl amino carbonyl group, a substituted or unsubstituted diaryl amino carbonyl group, or a substituted or unsubstituted alkyl aryl amino carbonyl group.

As the alkyl groups, in a case where $R^{101}$ and $R^{102}$ represent a substituted or unsubstituted alkyl group, an alkyl group with 1 to 6 carbon atoms is preferable, an alkyl group with 1 to 3 carbon atoms is more preferable, and a methyl group or an ethyl group is even more preferable. In addition, in a case where the alkyl group has a substituent group, examples of the substituent groups include a substituent group which is selected from the substituent group A described above, an aryl group is preferable, and a phenyl group is particularly preferable.

As the aryl group, in a case where $R^{101}$ and $R^{102}$ represent a substituted or unsubstituted aryl group, an aryl group with 6 to 14 carbon atoms is preferable, an aryl group with 6 to 10 carbon atoms is more preferable, and a phenyl group is even more preferable. In addition, in a case where the aryl group has a substituent group, examples of the substituent groups include a substituent group which is selected from the substituent group A described above.

As the heterocyclic group, in a case where $R^{101}$ and $R^{102}$ represent a substituted or unsubstituted heterocyclic group, a triazine group, a thiazolyl group, a benzothiazolyl group, or a thiadiazolyl group is preferable. In addition, in a case where the heterocyclic group has a substituent group, examples of the substituent groups include a substituent group which is selected from the substituent group A described above, and a substituted or unsubstituted amino group or a substituted or unsubstituted sulfamoyl group is preferable.

The alkylsulfonyl group, in a case where $R^{101}$ and $R^{102}$ represent a substituted or unsubstituted alkylsulfonyl group, an alkylsulfonyl group with 1 to 6 carbon atoms is preferable, an alkylsulfonyl group with 1 to 3 carbon atoms is more preferable, and a methylsulfonyl group is even more preferable. In addition, in a case where the alkylsulfonyl group has a substituent group, examples of the substituent groups include a substituent group which is selected from the substituent group A described above.

As the arylsulfonyl group, in a case where $R^{101}$ and $R^{102}$ represent a substituted or unsubstituted arylsulfonyl group, an arylsulfonyl group with 6 to 14 carbon atoms is preferable, an arylsulfonyl group with 6 to 10 carbon atoms is more preferable, and a phenylsulfonyl group is even more preferable. In addition, in a case where the arylsulfonyl group has a substituent group, examples of the substituent groups include a substituent group which is selected from the substituent group A described above, and a carboxyl group is particularly preferable.

In a case where $R^{101}$ and $R^{102}$ represent a substituted or unsubstituted alkoxycarbonyl group, the alkoxycarbonyl group is preferably represented by —COOR$^{201}$. Here, $R^{201}$ represents an alkyl group with 1 to 6 carbon atoms, an alkyl group with 1 to 4 carbon atoms is preferable, and an isopropyl group is more preferable. In addition, in a case where the aryloxycarbonyl group has a substituent group, examples of the substituent groups include a substituent group which is selected from the substituent group A described above.

In a case where $R^{101}$ and $R^{102}$ represent a substituted or unsubstituted aryloxycarbonyl group, the aryloxycarbonyl group is preferably represented by —COOR$^{202}$. Here, $R^{202}$ represents an aryl group with 6 to 14 carbon atoms, an aryl group with 6 to 10 carbon atoms is preferable, and a phenyl group is more preferable. In addition, in a case where the aryloxycarbonyl group has a substituent group, examples of the substituent groups include a substituent group which is selected from the substituent group A described above, and a nitro group is particularly preferable.

In a case where $R^{101}$ and $R^{102}$ represent a substituted or unsubstituted monoalkyl amino carbonyl group, the monoalkyl amino carbonyl group is preferably represented by —CONHR$^{203}$. Here, $R^{203}$ represents an alkyl group with 1 to 12 carbon atoms, an alkyl group with 1 to 10 carbon atoms is preferable, an alkyl group with 1 to 6 carbon atoms is more preferable, a methyl group, an ethyl group, an isopropyl group, a hexyl group, a 2-ethylhexyl group, a dodecyl group, and a cyclohexyl group are even more preferable, and an isopropyl group is particularly preferable. In addition, in a case where the monoalkyl amino carbonyl group has a substituent group, examples of the substituent groups include a substituent group which is selected from the substituent group A described above, and a phenyl group, a carboxyl group, a substituted or unsubstituted amino group, or a hydroxyl group is particularly preferable.

In a case where $R^{101}$ and $R^{102}$ represent a substituted or unsubstituted dialkyl amino carbonyl group, the dialkyl amino carbonyl group is preferably represented by —CONR$^{204}$R$^{205}$. Here, $R^{204}$ and $R^{205}$ each independently represent an alkyl group with 1 to 10 carbon atoms, an alkyl group with 1 to 6 carbon atoms is preferable, and a methyl group and an isopropyl group are more preferable. In addition, in a case where the dialkyl amino carbonyl group has a substituent group, examples of the substituent groups include a substituent group which is selected from the substituent group A described above, and a carboxyl group and an alkyloxycarbonyl group (preferably an alkyloxycarbonyl group with 2 to 6 carbon atoms, and more preferably an ethyloxycarbonyl group) are particularly preferable.

In a case where $R^{101}$ and $R^{102}$ represent a substituted or unsubstituted monoaryl amino carbonyl group, the monoaryl amino carbonyl group is preferably represented by —CONHR$^{206}$. Here, $R^{206}$ represents an aryl group with 6 to 14 carbon atoms, an aryl group with 6 to 12 carbon atoms is preferable, and an aryl group with 6 to 10 carbon atoms is more preferable. In detail, a phenyl group, a biphenyl group, and a naphthyl group are preferable, and a phenyl group is more preferable. In addition, in a case where the monoaryl amino carbonyl group has a substituent group, examples of the substituent groups include a substituent group which is selected from the substituent group A described above, and a carboxyl group, a hydroxyl group, a phosphono group, and an alkoxy group (preferably an alkoxy group with 1 to 6 carbon atoms, and more preferably a cyclohexyloxy group) are particularly preferable.

In a case where $R^{101}$ and $R^{102}$ represent a substituted or unsubstituted diaryl amino carbonyl group, the diaryl amino carbonyl group is preferably represented by —CONR$^{207}$R$^{208}$. Here, $R^{207}$ and $R^{208}$ each independently represent an aryl group with 6 to 14 carbon atoms, an aryl group with 6 to 10 carbon atoms is preferable, and a phenyl group is more preferable. In addition, in a case where the diaryl amino carbonyl group has a substituent group, examples of the substituent groups include a substituent group which is selected from the substituent group A described above.

From the point of view of saturation, lightfastness, and ozone resistance, $R^{101}$ and $R^{102}$ are preferably a substituted or unsubstituted alkylsulfonyl group, a substituted or unsubstituted arylsulfonyl group, a substituted or unsubstituted alkoxycarbonyl group, a substituted or unsubstituted aryloxycarbonyl group, a carbamoyl group, a substituted or unsubstituted monoalkyl amino carbonyl group, a substituted or unsubstituted dialkyl amino carbonyl group, a substituted or unsubstituted monoaryl amino carbonyl group, or a substituted or unsubstituted diaryl amino carbonyl group, more preferably a substituted or unsubstituted alkylsulfonyl group, a substituted or unsubstituted arylsulfonyl group, a substituted or unsubstituted monoalkyl amino carbonyl group, a substituted or unsubstituted dialkyl amino carbonyl group, a substituted or unsubstituted monoaryl amino carbonyl group, or a substituted or unsubstituted diaryl amino carbonyl group, and particularly preferably a substituted or unsubstituted monoalkyl amino carbonyl group, a substituted or unsubstituted dialkyl amino carbonyl group, a substituted or unsubstituted monoaryl amino carbonyl group, or a substituted or unsubstituted diaryl amino carbonyl group.

Specific examples of the compound which is represented by General Formula (1) will be given below; however, the present invention is not limited thereto. In the structural formula of the specific compounds described below, Me represents a methyl group, Et represents an ethyl group, i-Pr represents an isopropyl group, and n-Bu represents an n-butyl group. In addition, the ratio of R and M is the molar ratio.

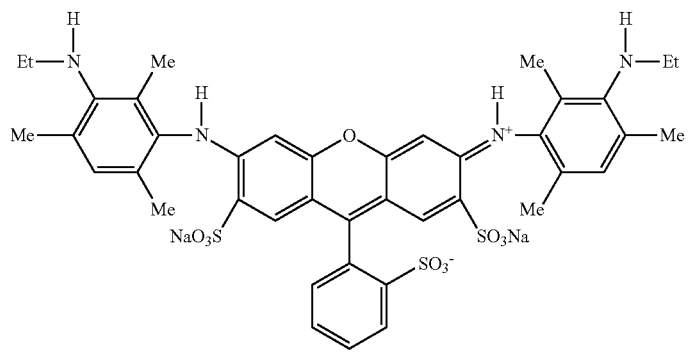

(1-1)

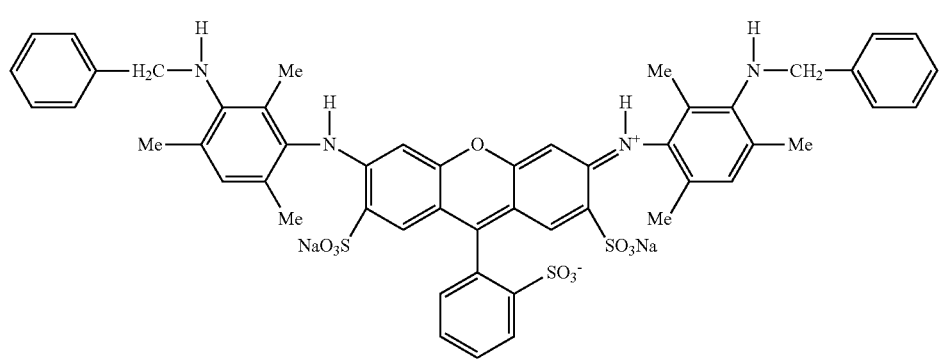

(1-2)

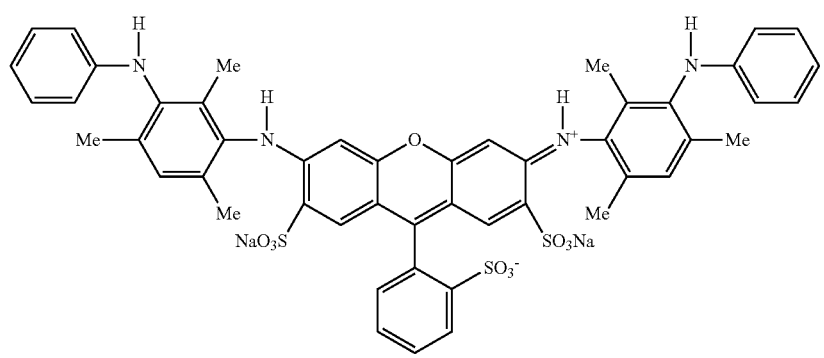

(1-3)

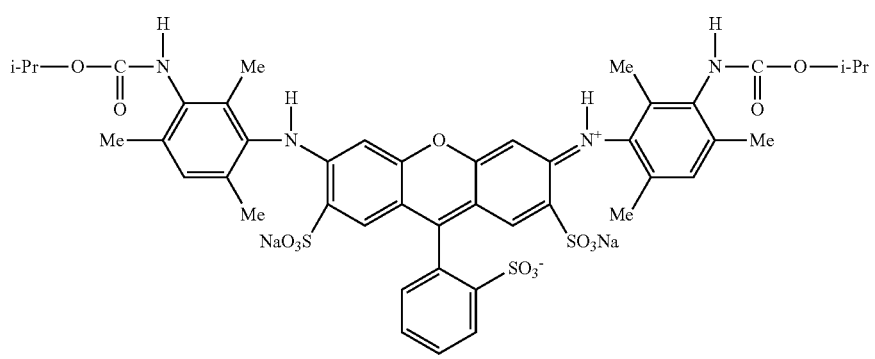

(1-4)

-continued
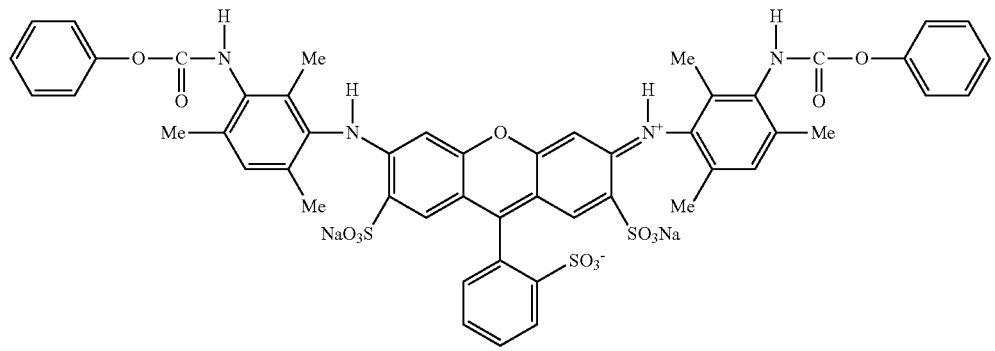
(1-5)
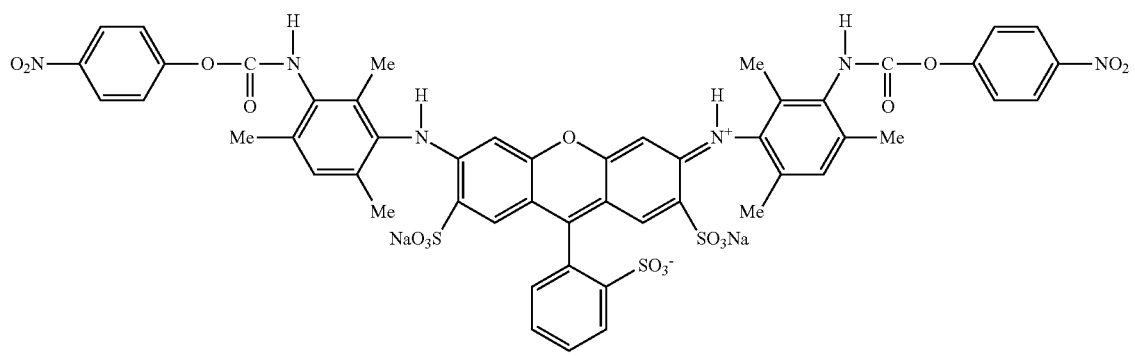
(1-6)
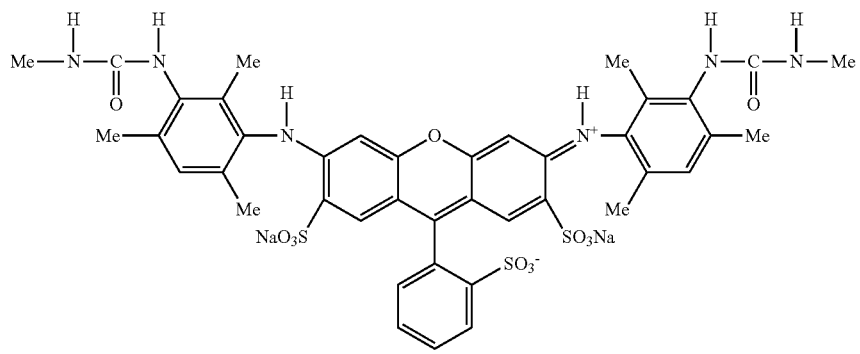
(1-7)
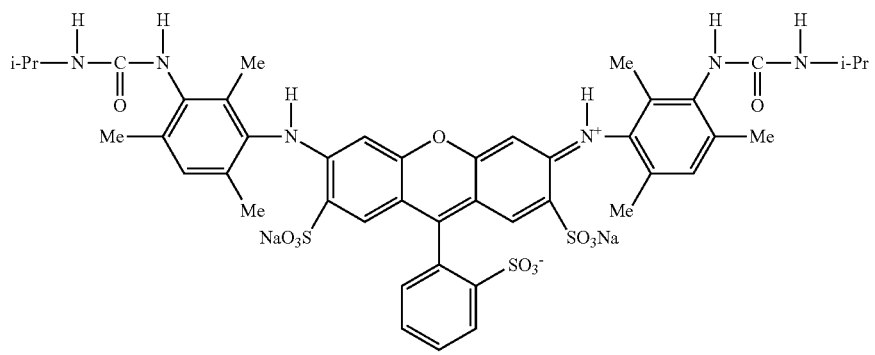
(1-8)

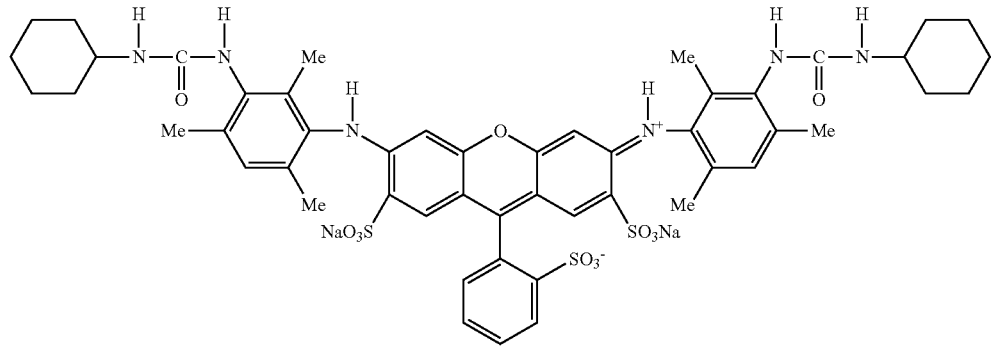
(1-9)
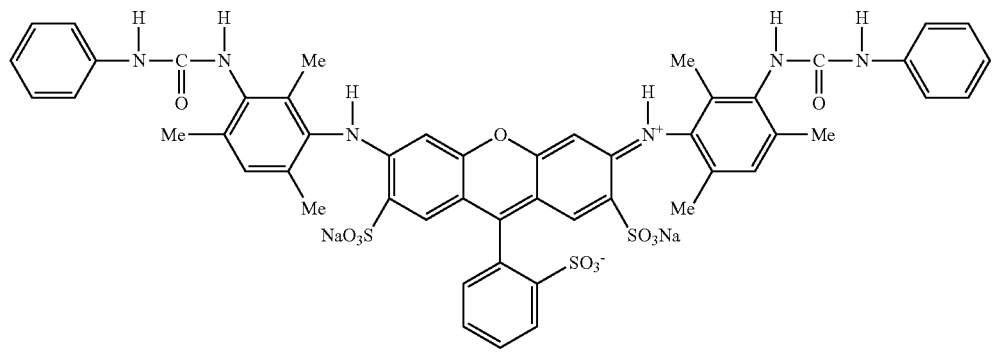
(1-10)
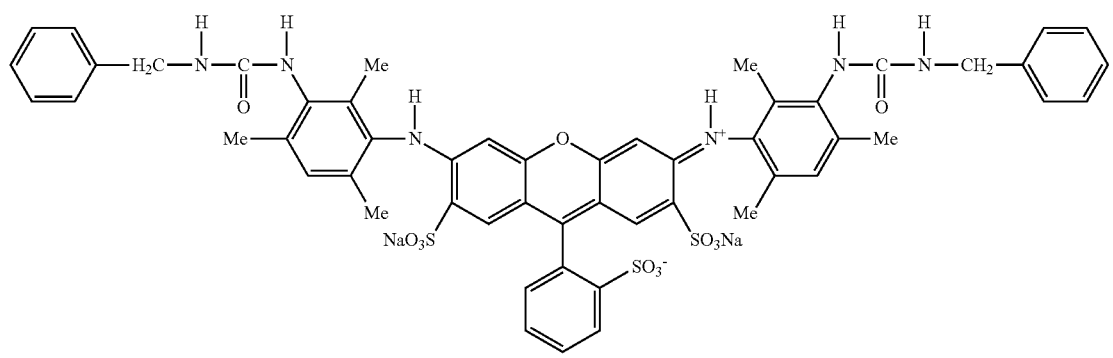
(1-11)
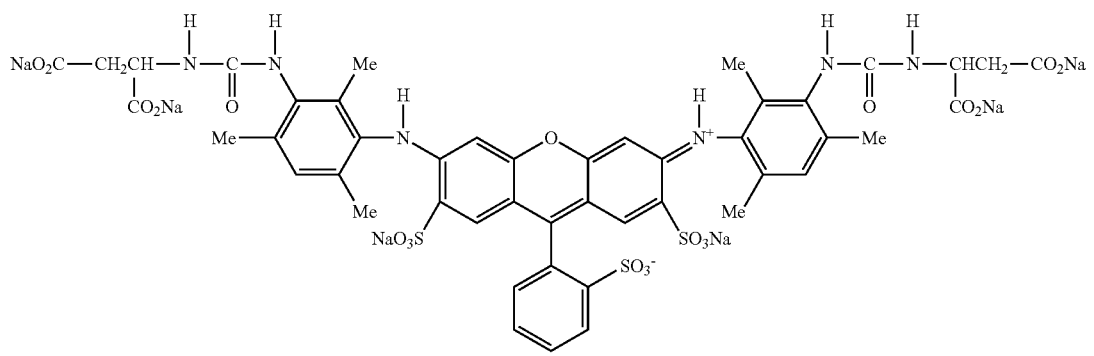
(1-12)

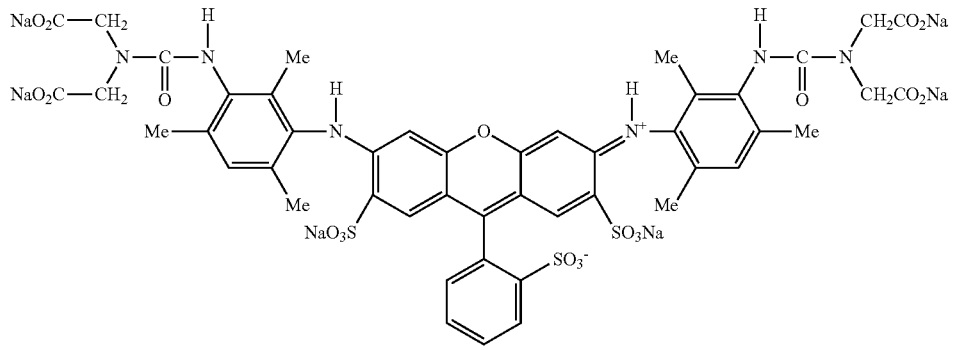
(1-13)
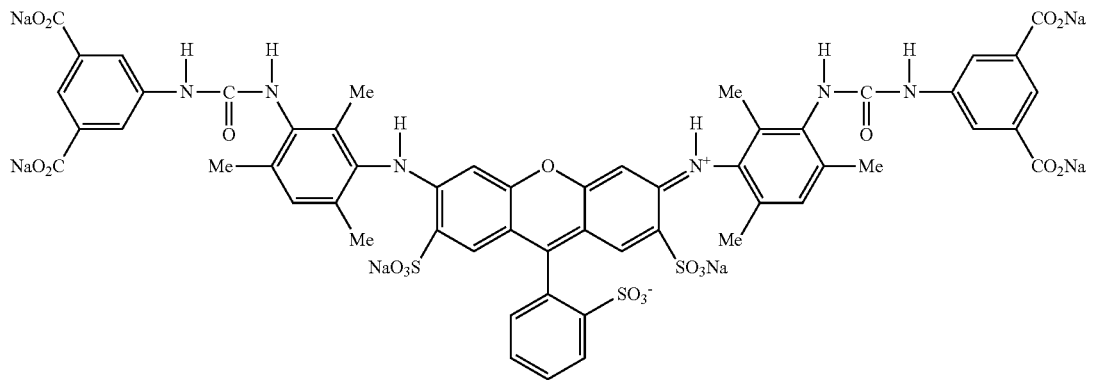
(1-14)
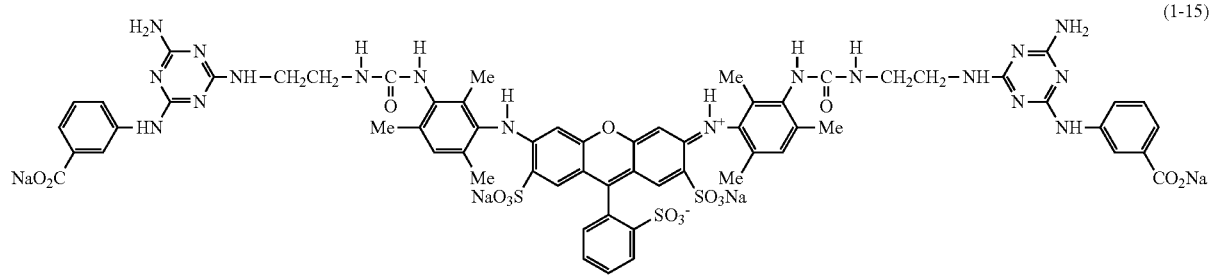
(1-15)
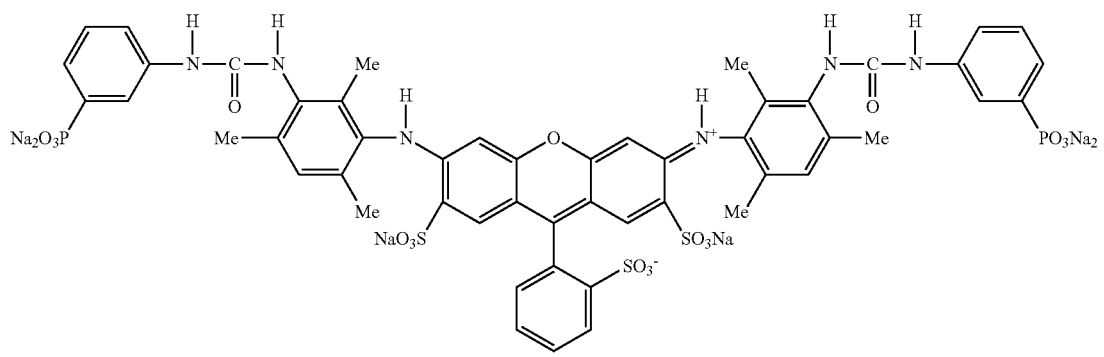
(1-16)

-continued
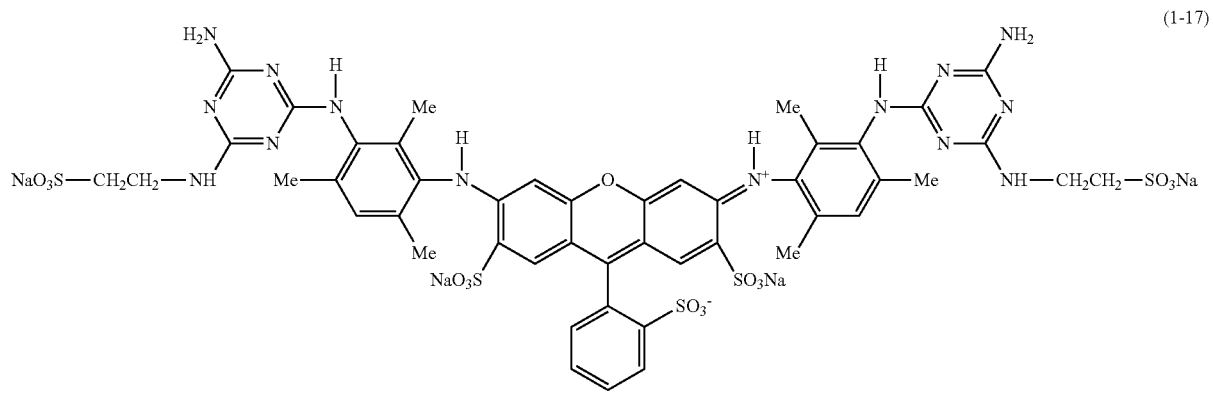
(1-17)
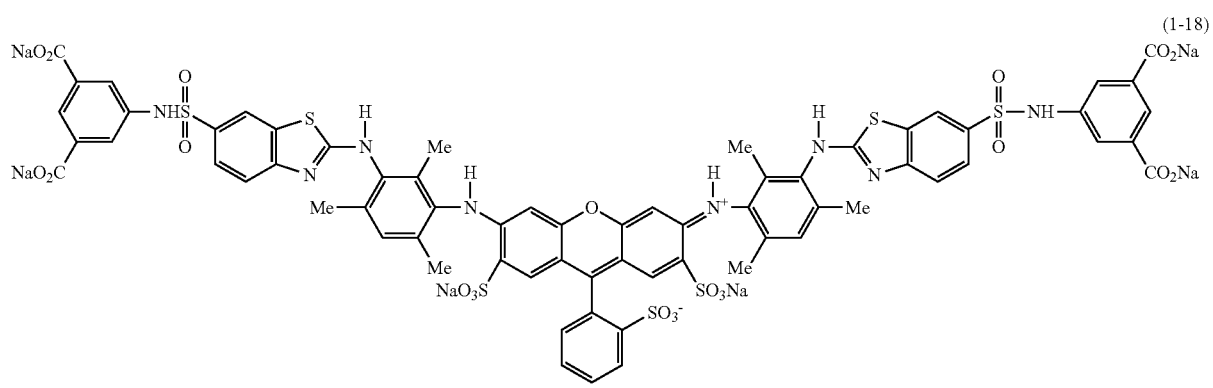
(1-18)
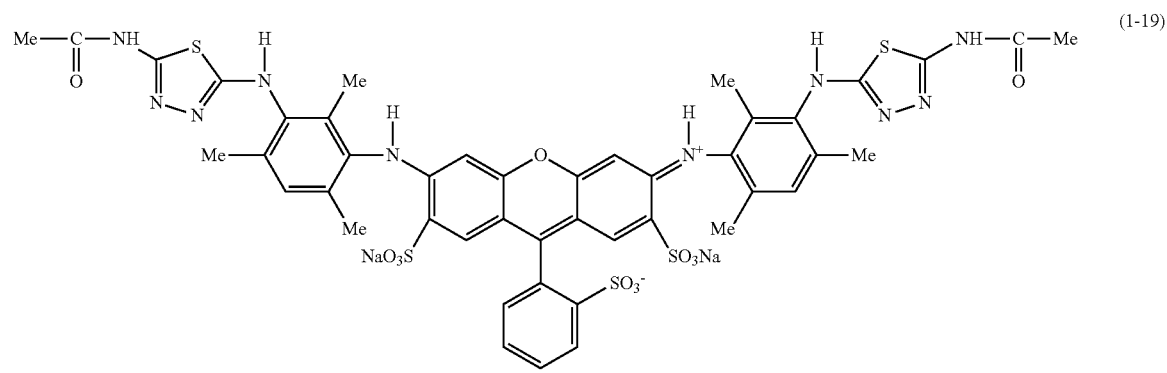
(1-19)
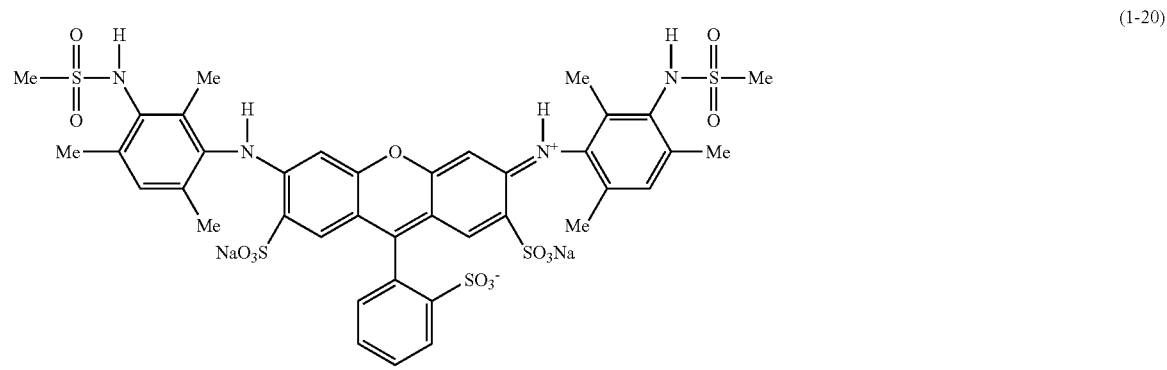
(1-20)

-continued
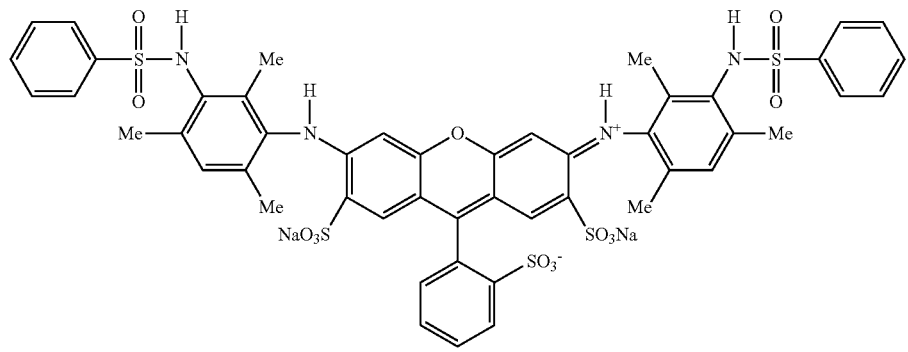
(1-21)
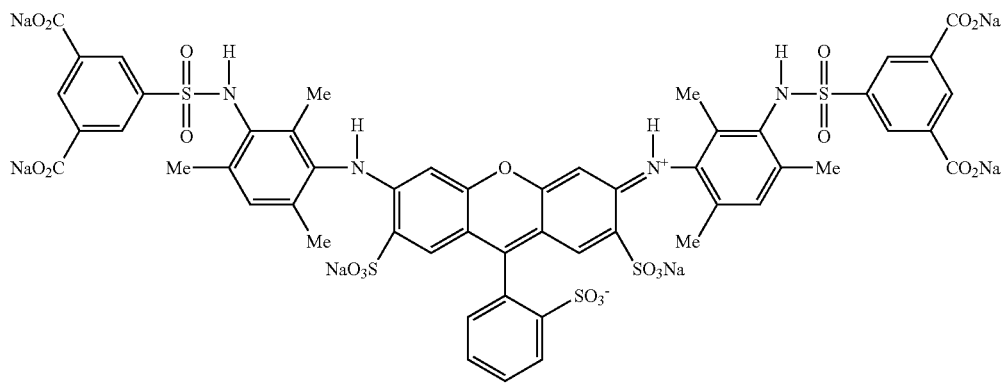
(1-22)
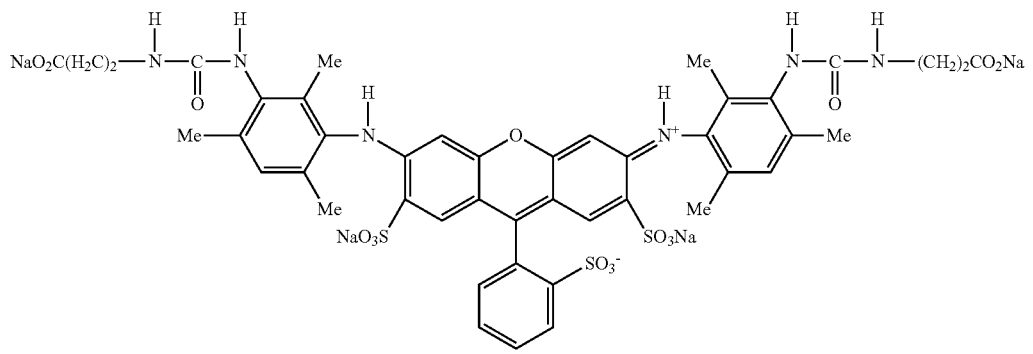
(1-23)
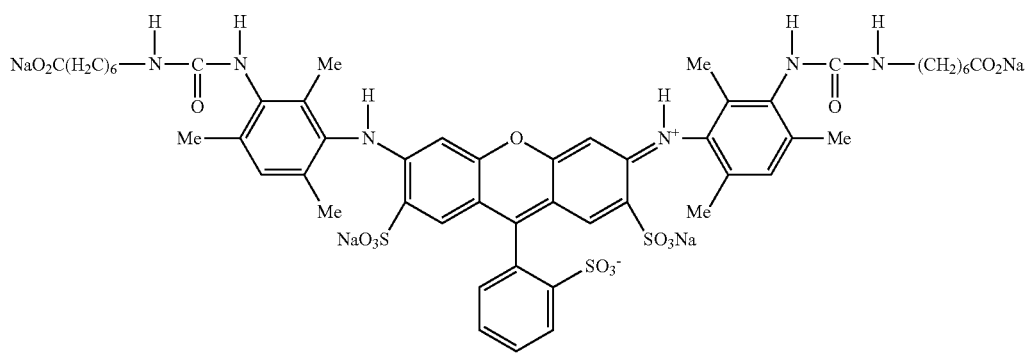
(1-24)

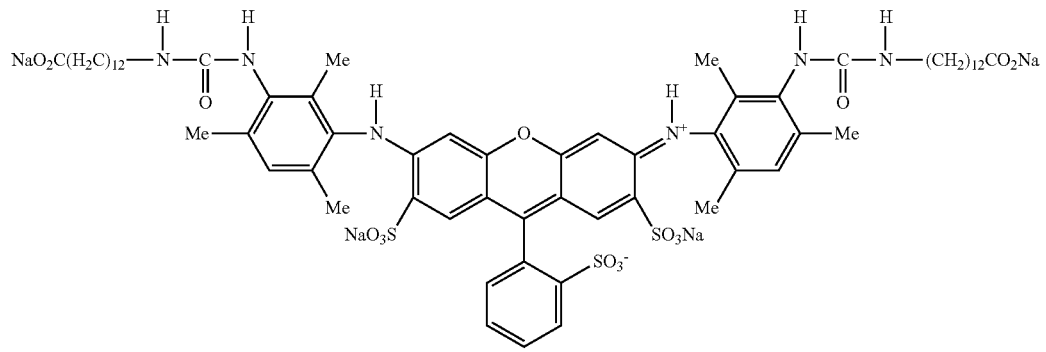
(1-25)
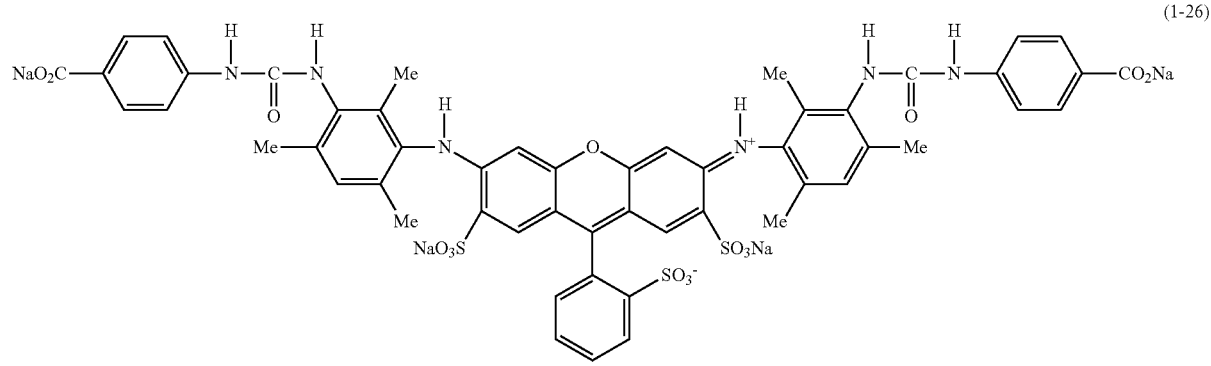
(1-26)
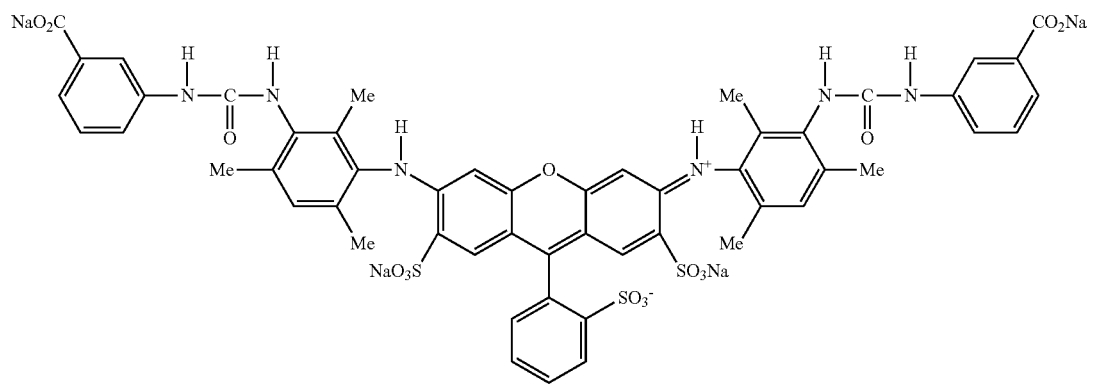
(1-27)
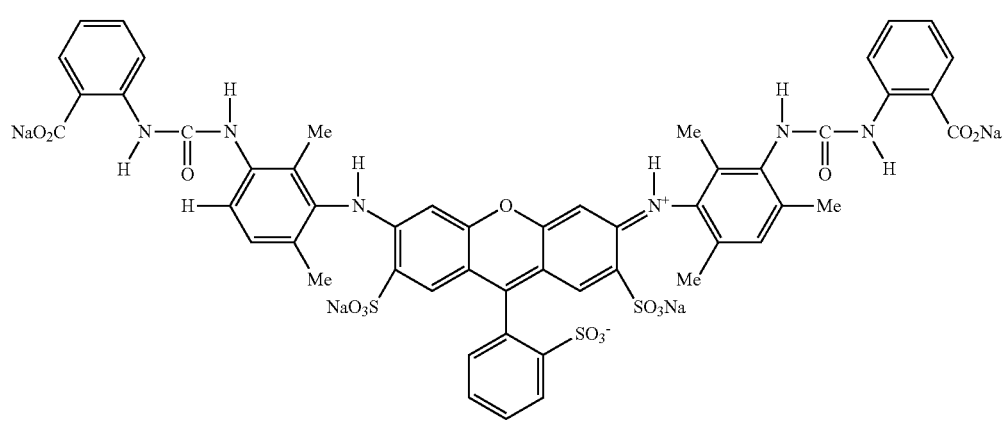
(1-28)

-continued
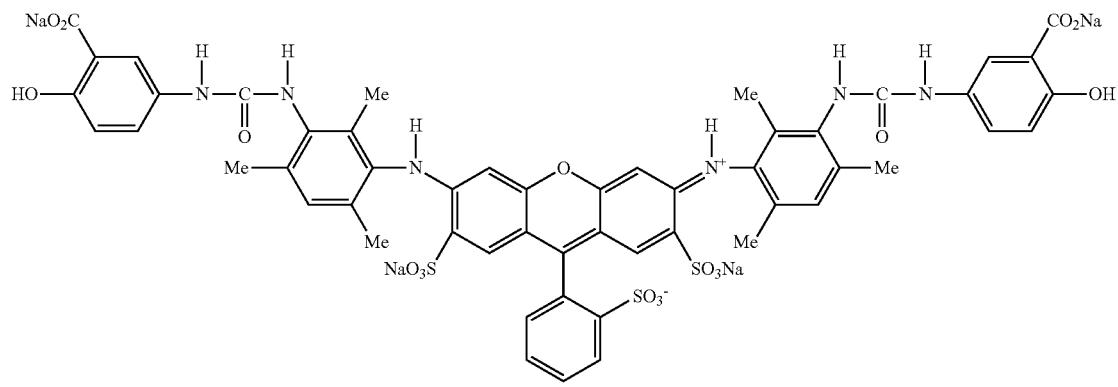
(1-29)
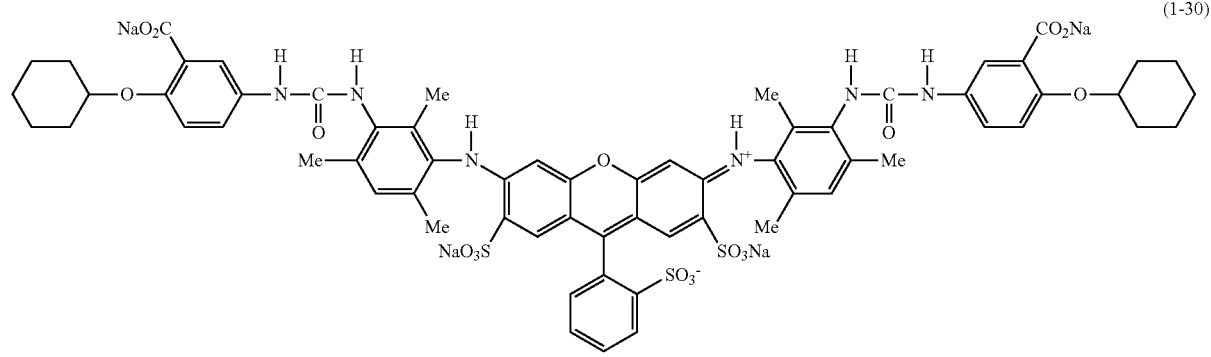
(1-30)
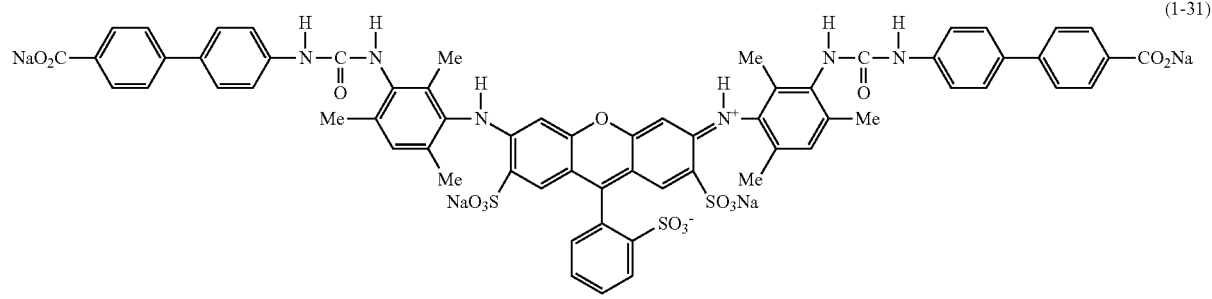
(1-31)
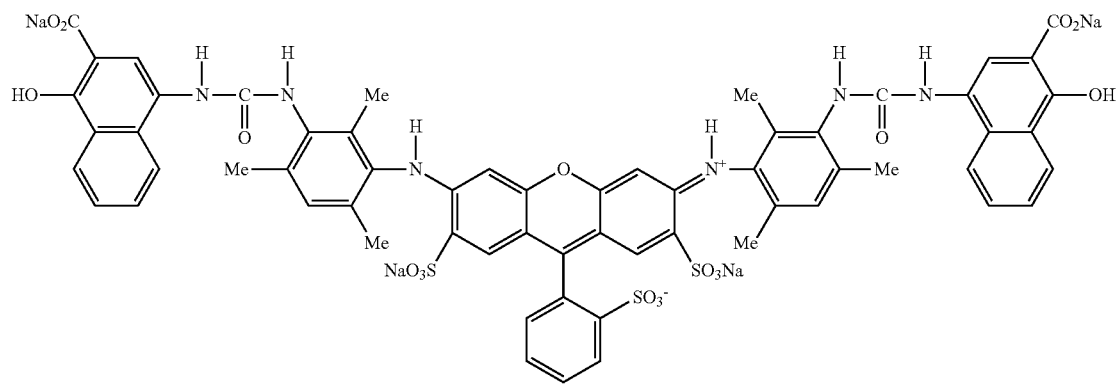
(1-32)

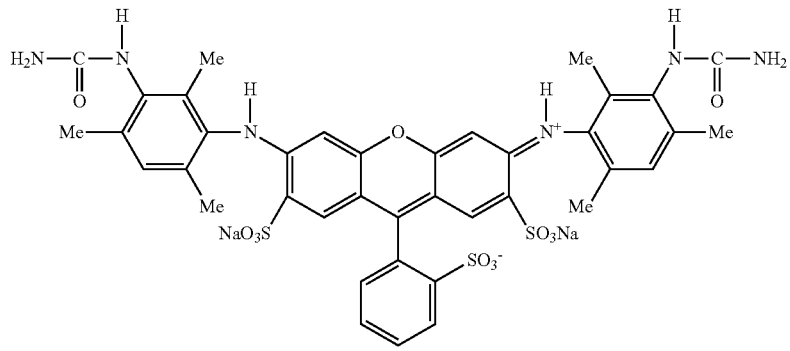
(1-33)
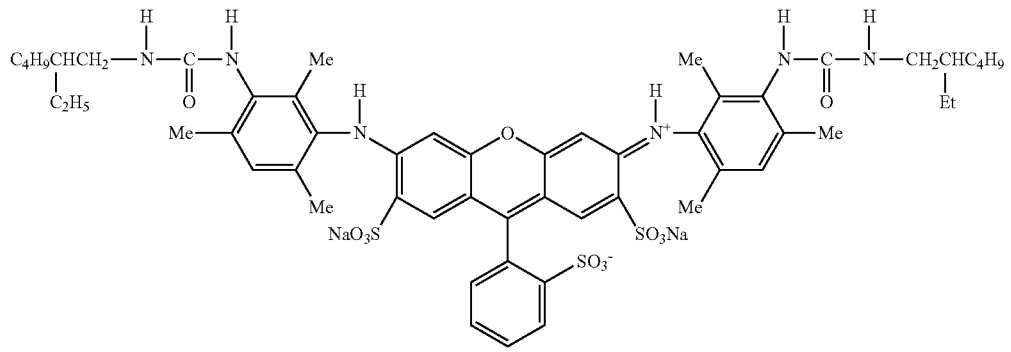
(1-34)
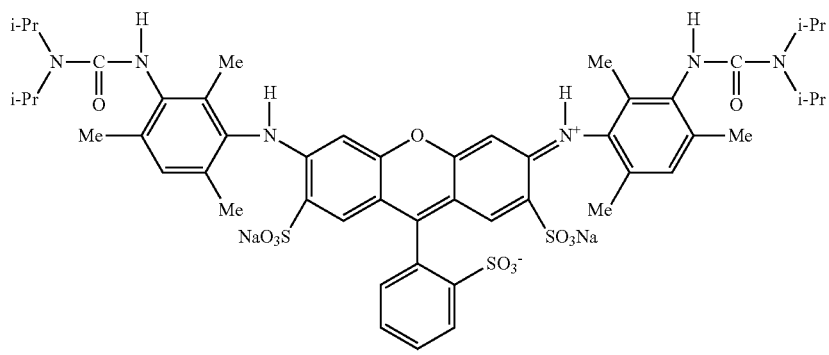
(1-35)
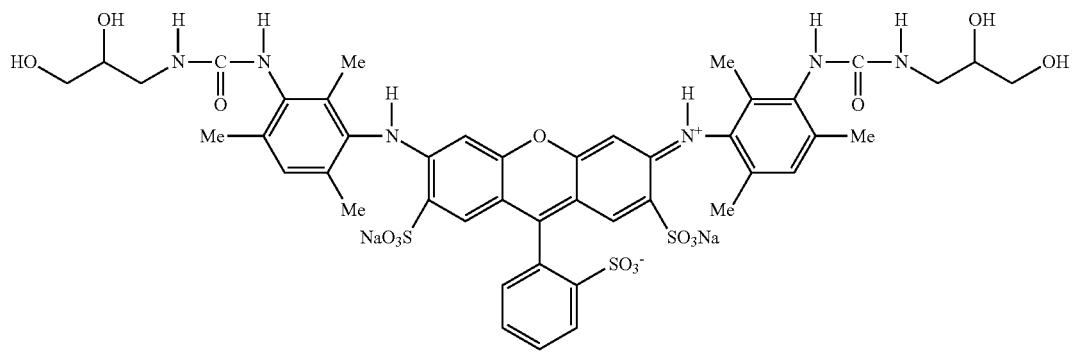
(1-36)

-continued
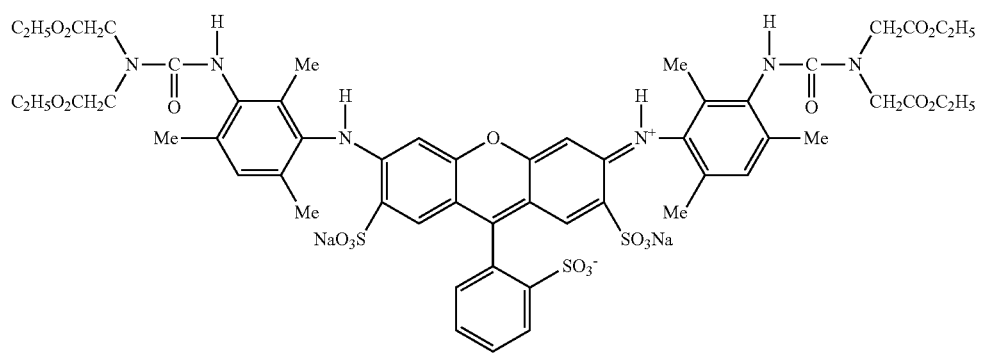
(1-37)
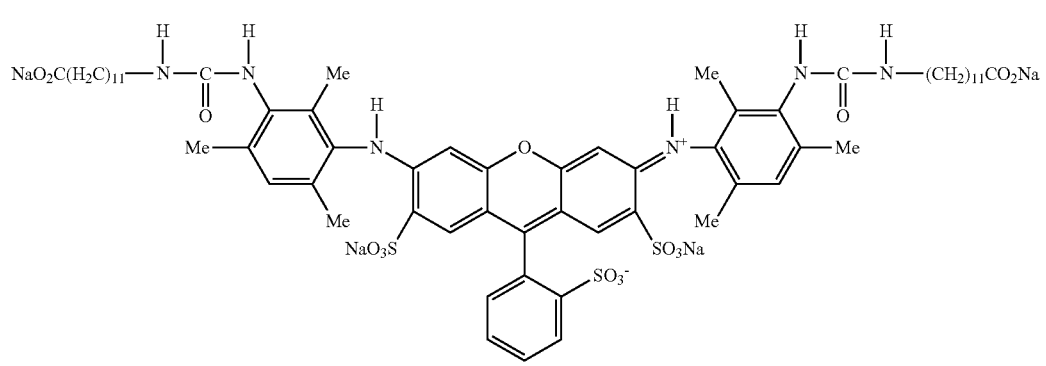
(1-38)
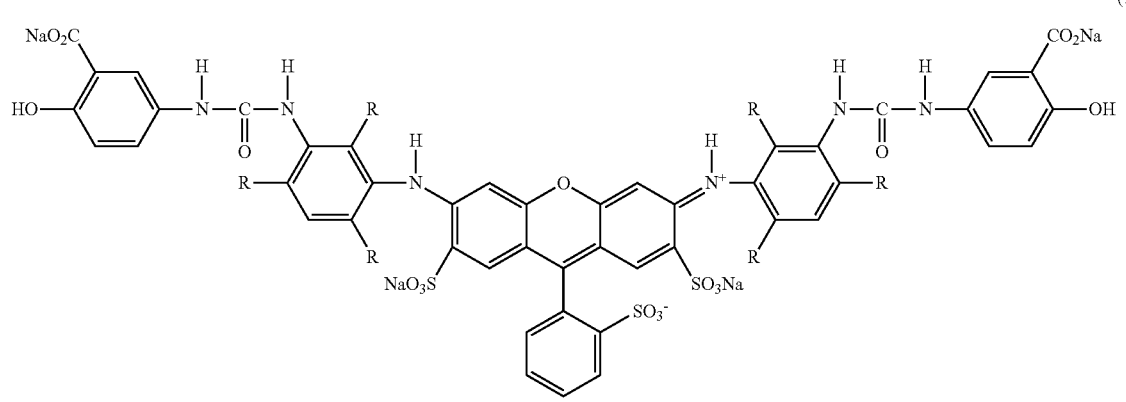
(1-39)
R: Et/Me = 2/1
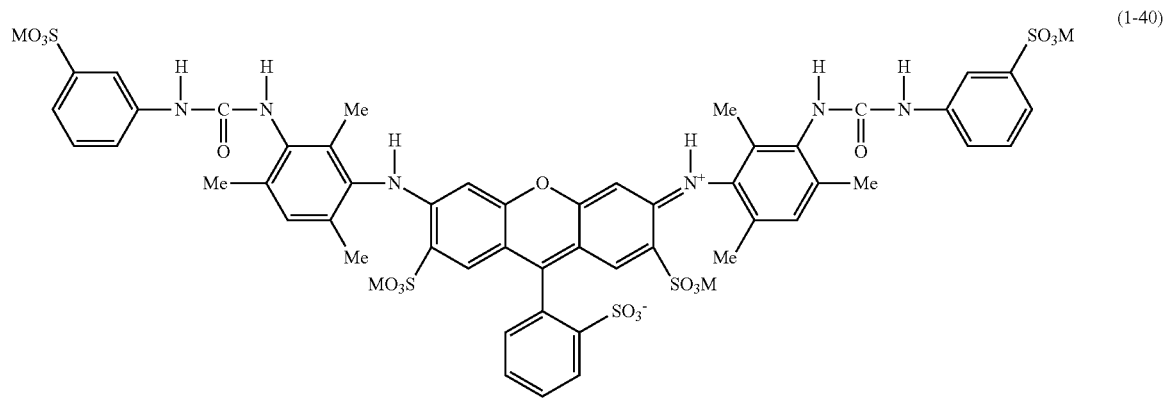
(1-40)
M: Na/Li = 1/1

(1-41)
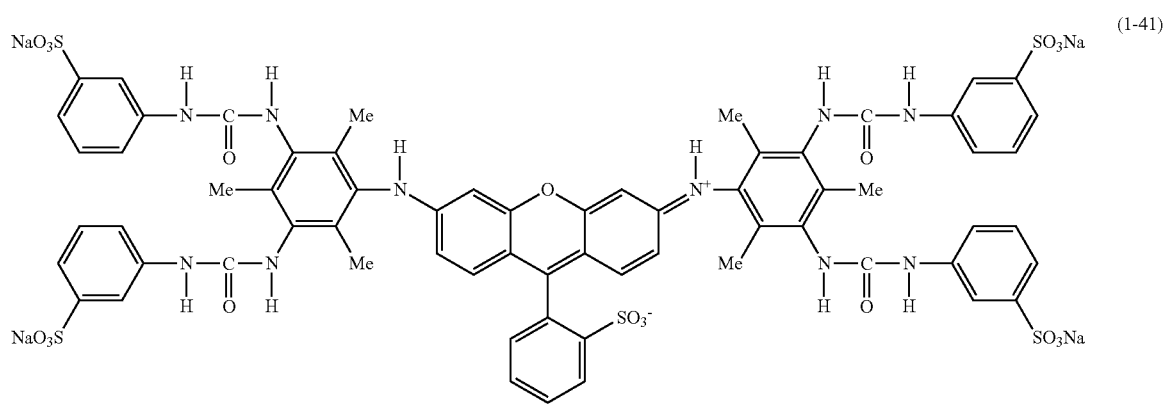
(1-42)
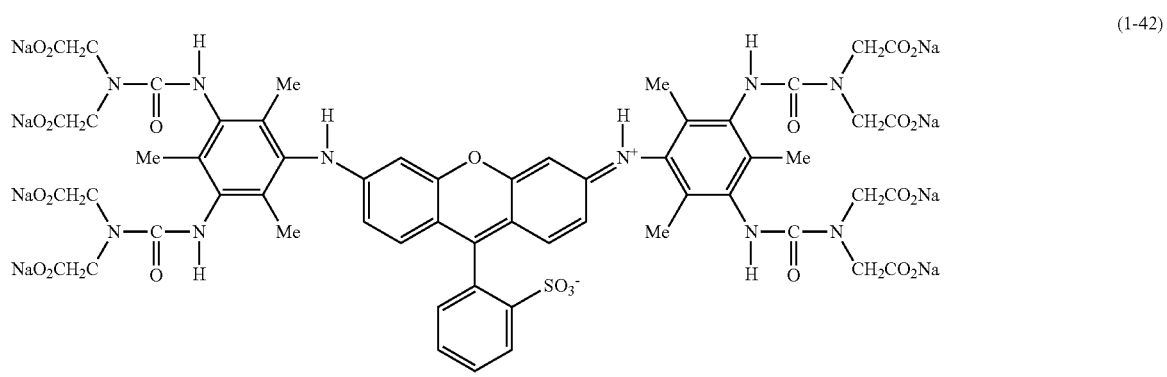
(1-43)
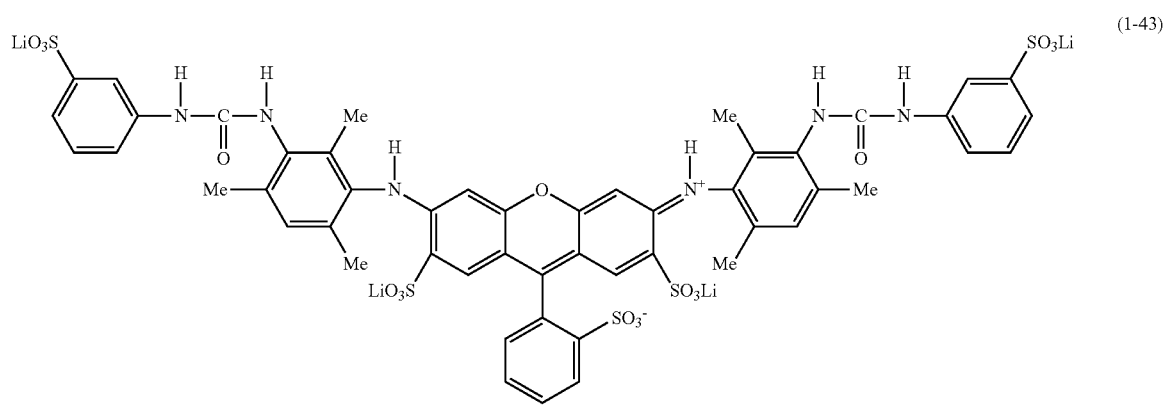
(1-44)
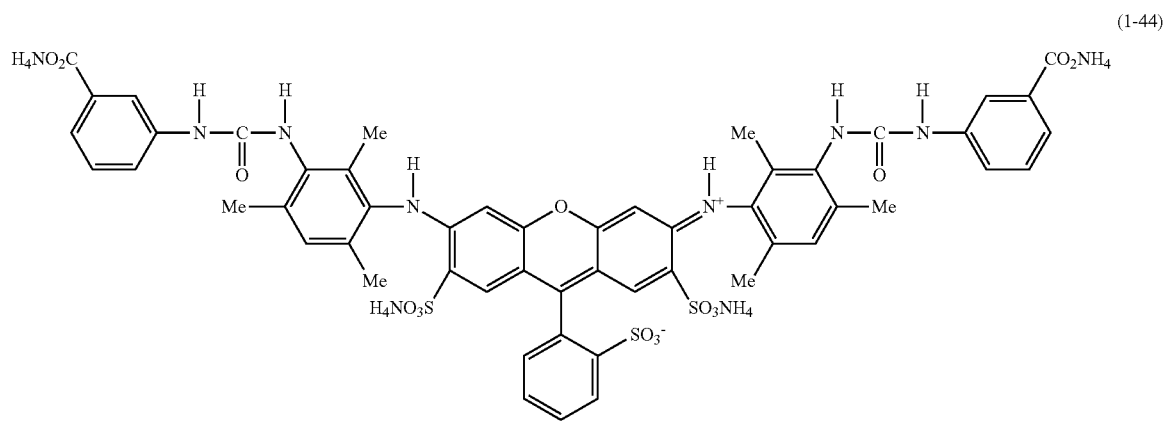

(1-45)
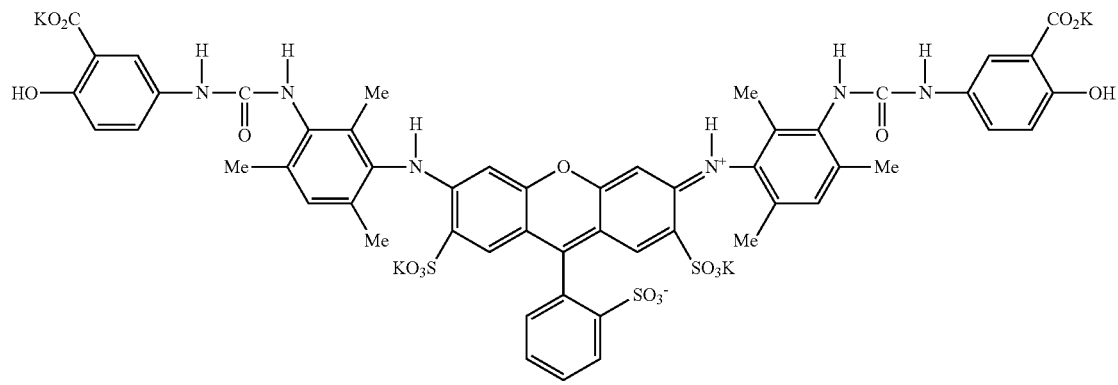
(1-46)
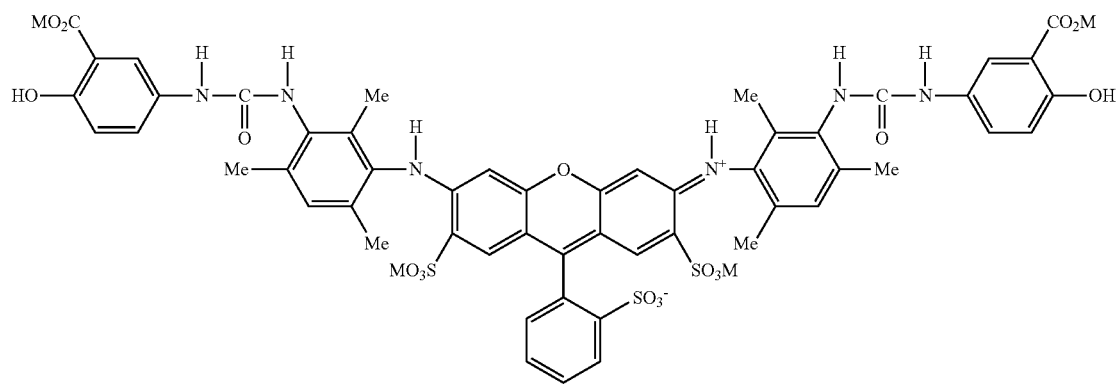
M: K/Na = 1/1
(1-47)
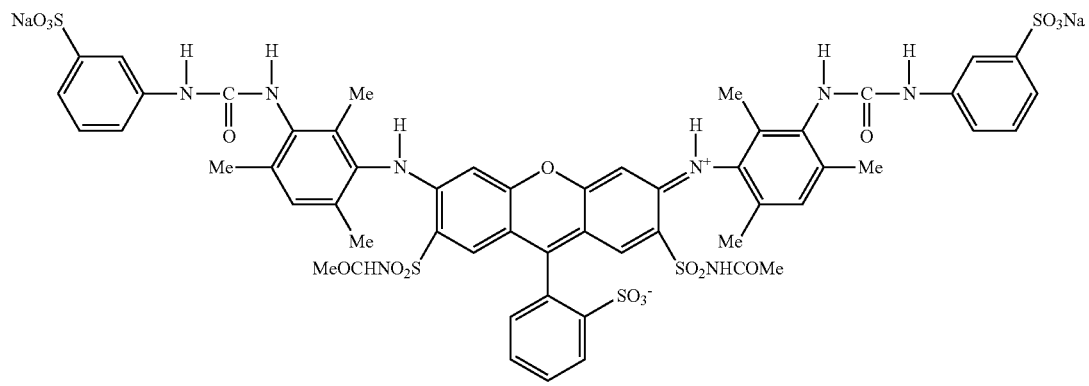
(1-48)
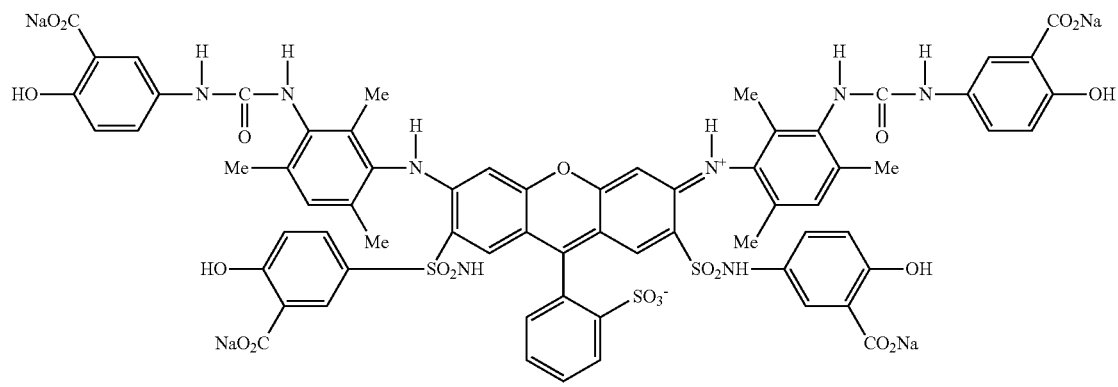

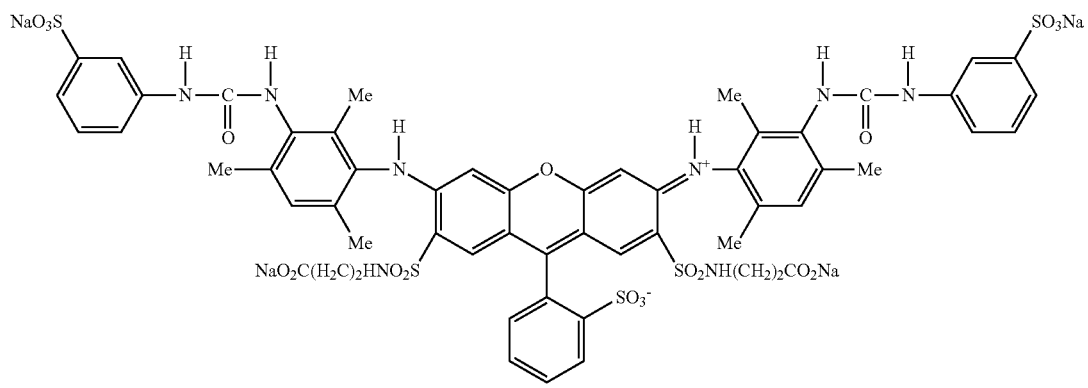
(1-49)
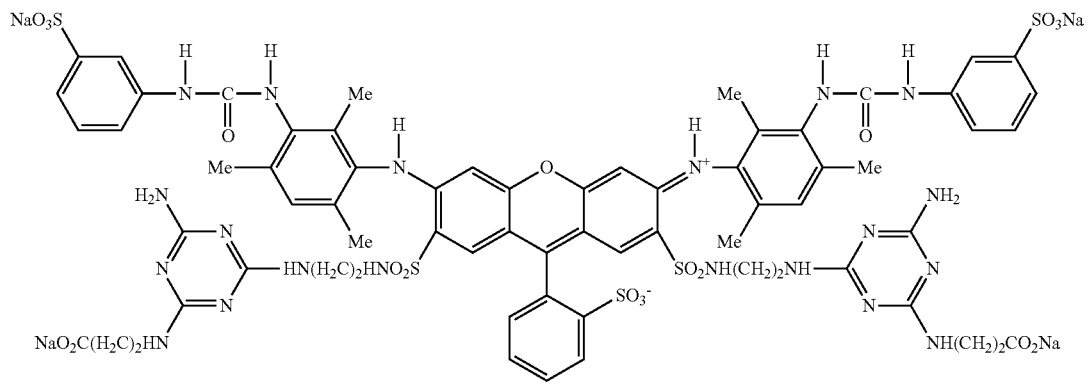
(1-50)
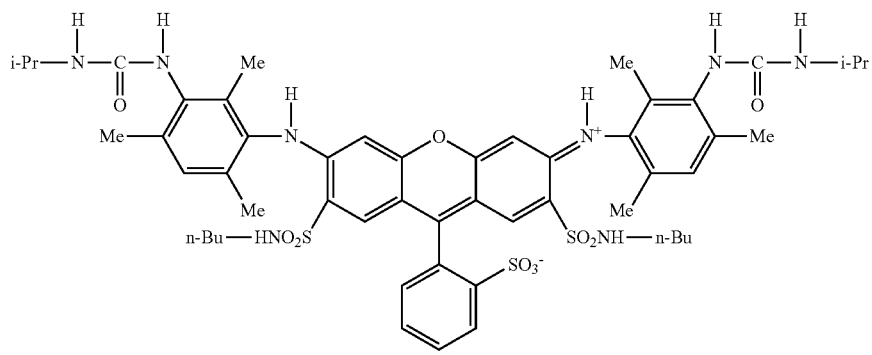
(1-51)
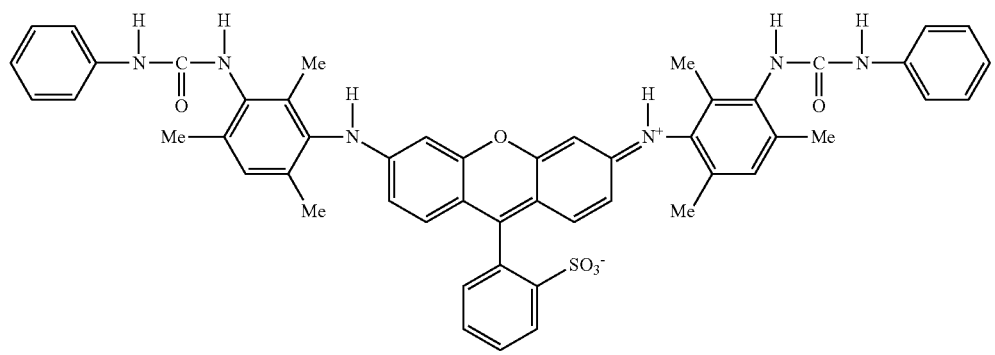
(1-52)

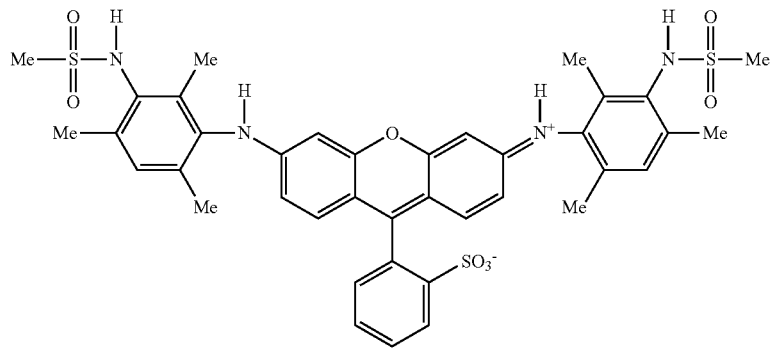
(1-53)
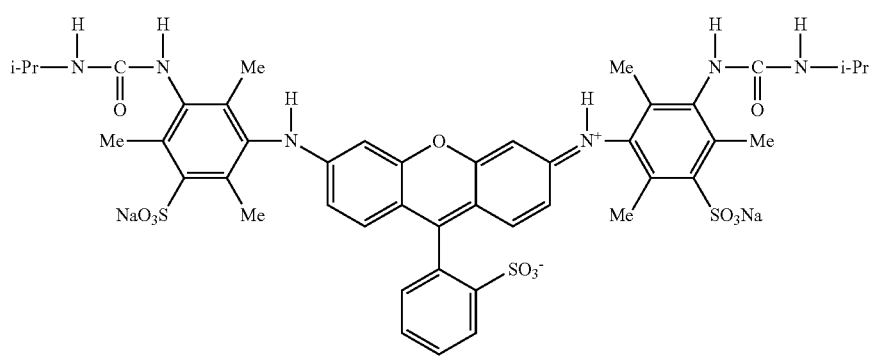
(1-54)
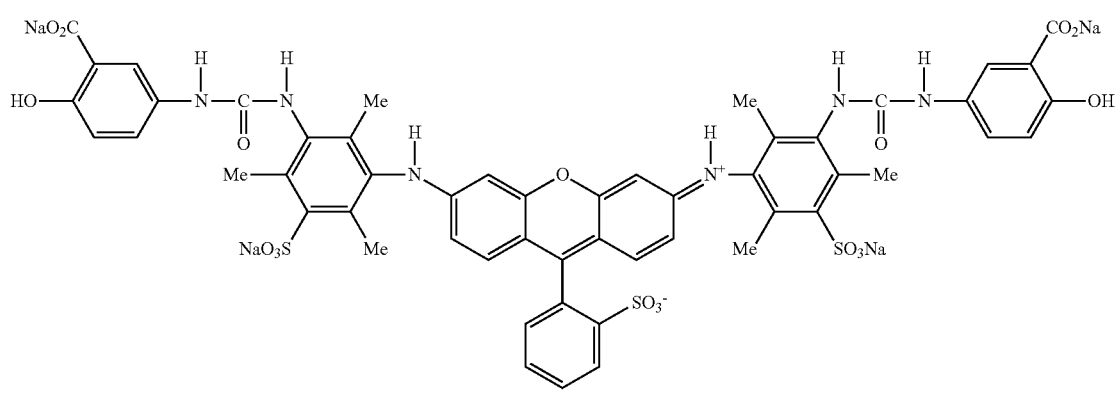
(1-55)
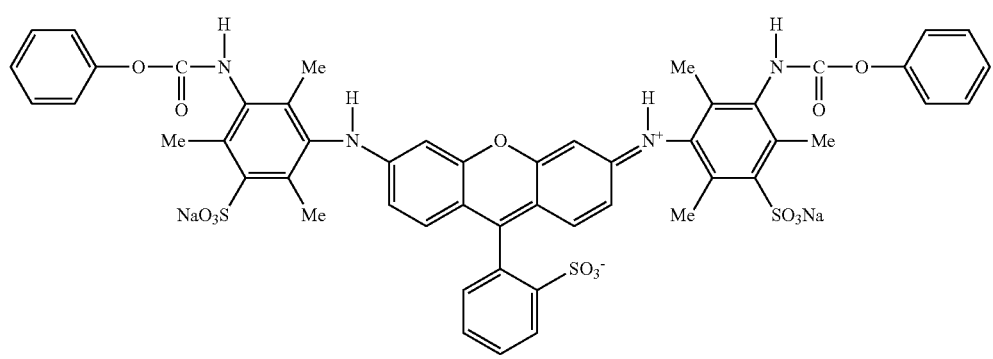
(1-56)

(1-57)

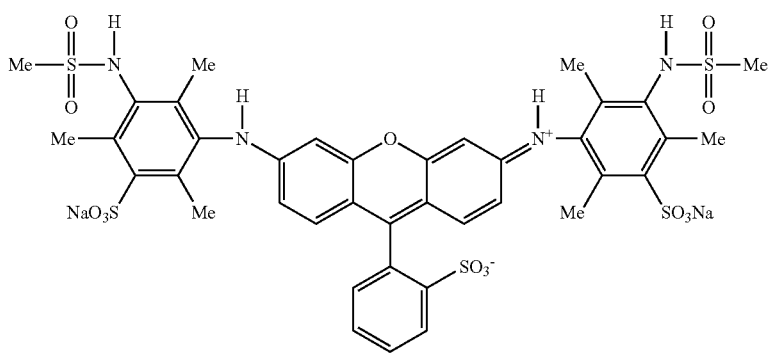

Here, a specific method for synthesizing the compound which is represented by General Formula (1) will be exemplified in Examples.

[Coloring Composition]

The coloring composition of the present invention contains at least one type of compound which is represented by General Formula (1) described above. The coloring composition of the present invention is able to contain a medium; however, in a case of using a solvent as a medium, the coloring composition is particularly favorable as an ink jet recording ink. It is possible to produce the coloring composition of the present invention by using a lipophilic medium or a water-based medium as a medium, and dissolving and/or dispersing the compound which is represented by General Formula (1) described above therein. A water-based medium is preferably used. The coloring composition of the present invention also includes ink compositions from which the medium is removed.

In the present invention, the content of the compounds of the present invention which are included in a coloring composition is determined according to the type of the substituent group to be used in General Formula (1), the type of solvent components which are used for producing the coloring composition, and the like; however, the content of the compounds which are represented by General Formula (1) in the coloring composition with respect to the total mass of the coloring composition is preferably 1 mass % to 20 mass %, more preferably 1 mass % to 10 mass %, and even more preferably 2 mass % to 6 mass %.

It is possible to make the printing density of ink on a recording medium favorable when printing and it is possible to secure the necessary image density by setting the content of the compounds which are represented by General Formula (1) which are included in the coloring composition to 1 mass % or more. In addition, by setting the total amount of the compounds which are represented by General Formula (1) which are included in the coloring composition to 10 mass % or less, it is possible to make the discharge property of the coloring composition favorable in a case of being used for an ink jet recording method, and moreover, it is possible to obtain effects such as the ink jet nozzles being not easily clogged.

The coloring composition of the present invention may contain other additive agents as necessary within a range which does not impair the effects of the present invention. Examples of other additive agents include additive agents which may be used for the ink jet recording ink which will be described below.

[Ink Jet Recording Ink]

Next, description will be given of the ink jet recording ink of the present invention.

The ink jet recording ink of the present invention contains the compounds which are represented by the above General Formula (1) of the present invention.

It is possible to produce the ink jet recording ink by dissolving and/or dispersing the compounds which are represented by General Formula (1) in a lipophilic medium or a water-based medium. The ink jet recording ink is preferably an ink which uses a water-based medium.

It is possible for the ink jet recording ink to contain other additive agents as necessary within a range which does not impair the effects of the present invention. Examples of other additive agents include additive agents known in the art such as drying inhibitors (wetting agents), fading inhibitors, emulsion stabilizers, permeation-promoting agents, ultraviolet absorbers, preservative agents, antifungal agents, pH adjusting agents, surface tension adjusting agents, antifoaming agents, viscosity adjusting agents, dispersing agents, dispersion stabilizers, rust preventive agents, and chelating agents. In a case of a water-soluble ink, the various types of the additive agents are directly added to an ink liquid. In a case of using an oil-soluble dye in the form of a dispersoid, additive agents are generally added to the dispersoid after preparing the dye dispersoid; however, the additive agents may also be added to an oil phase or a water phase during preparation.

Drying inhibitors are favorably used for the purpose of preventing an ink jet recording ink from being clogged due to drying in the ink ejection port of a nozzle which is used for an ink jet recording method.

The drying inhibitor is preferably a water-soluble organic solvent which has a lower vapor pressure than water. Specific examples of the drying inhibitor include polyhydric alcohols which are represented by ethylene glycol, propylene glycol, diethylene glycol, polyethylene glycol, thiodiglycol, dithiodiglycolic, 2-methyl-1,3-propanediol, 1,2,6-hexanetriol, acetylene glycol derivatives, glycerin, trimethylol propane, and the like, lower alkyl ethers of polyhydric alcohols such as ethylene glycol monomethyl (or ethyl) ether, diethylene glycol monomethyl (or ethyl) ether, and triethylene glycol monoethyl (or butyl) ether, heterocycles such as 2-pyrrolidone, N-methyl-2-pyrrolidone, 1,3-dimethyl-2-imidazolidinone, and N-ethylmorpholine, sulfur containing compounds such as sulfolane, dimethyl sulfoxide, and 3-sulfolene, polyfunctional compounds such as diacetone alcohol and diethanolamine, and urea derivatives. Among these, polyhydric alcohols such as glycerine and diethylene glycol are more preferable. In addition, the drying inhibitors described above may be used individually or two or more types thereof may be used together. The drying inhibitors are preferably contained in ink at 10 mass % to 50 mass %.

Permeation-promoting agents are favorably used for the purpose of improving the permeation of the ink jet recording ink into paper. As the permeation-promoting agents, it is possible to use alcohols such as ethanol, isopropanol, butanol, di (tri) ethylene glycol monobutyl ether, and 1,2-hexanediol, sodium lauryl sulfate, sodium oleate, and non-ionic surfactants. Sufficient effects are generally exhibited when the above are contained in ink at 5 mass % to 30 mass %, and the above are preferably used within an adding amount range which does not cause printing bleeding and paper through (print through).

Ultraviolet absorbers are used for the purpose of improving the storage property of an image. As ultraviolet absorbers, it is also possible to use the benzotriazole-based compounds which are described in JP1983-185677A (JP-S58-185677A), JP1986-190537A (JP-S61-190537A), JP1990-782A (JP-H2-782A), JP1993-197075A (JP-H5-197075A), JP1997-34057A (JP-H9-34057A), and the like, the benzophenone-based compounds which are described in JP1971-2784A (JP-S46-2784A), JP1993-194483A (JP-H5-194483A), U.S. Pat. No. 3,214,463A, and the like, the cinnamic acid-based compounds which are described in JP1973-30492B (JP-S48-30492B), JP1981-21141B (JP-S56-21141B), and JP1998-88106A (JP-H10-88106A), the triazine-based compounds which are described in JP1992-298503A (JP-H4-298503A), JP1996-53427A (JP-H8-53427A), JP1996-239368A (JP-H8-239368A), JP1998-182621A (JP-H10-182621A), JP1996-501291A (JP-H8-501291A), and the like, the compounds which are described in Research Disclosure No. 24239, or compounds which absorb ultraviolet rays and emit fluorescence represented by stilbene-based compounds and benzoxazole-based compounds, that is, so-called fluorescent brightening agents.

Fading inhibitors are used for the purpose of improving the storage property of an image. As fading inhibitors, it is possible to use various types of organic and metal complex-based fading inhibitors. Examples of the organic fading inhibitors include hydroquinones, alkoxy phenols, dialkoxy phenols, phenols, anilines, amines, indane, chromans, alkoxyanilines, heterocyclic compounds, and the like, and examples of the metal complexes include nickel complexes, zinc complexes. In more detail, it is possible to use the compounds which are described in the patent which are cited in Sections I and J in No. VII in Research Disclosure No. 17643, Research Disclosure No. 15162, the left column in page 650 in Research Disclosure No. 18716, page 527 in Research Disclosure No. 36544, and page 872 in Research Disclosure No. 307105, or the compounds which are included in General Formulas and compound examples of representative compounds which are described in page 127 to page 137 in JP1987-215272A (JP-562-215272A).

Examples of the antifungal agents include sodium dehydroacetate, sodium benzoate, sodium pyridine-1-oxide, p-hydroxy benzoic acid ethyl ester, 1,2-benzisothiazolin-3-one, salts thereof, and the like. The above are preferably used in ink at 0.02 mass % to 1.00 mass %.

As pH adjusting agents, it is possible to use neutralizing agents (organic salt groups or inorganic alkalis). pH adjusting agents are preferably added such that the ink jet recording ink has a pH of 6 to 10 for the purpose of improving the preservation stability of the ink jet recording ink, and more preferably added such that the pH is 7 to 10.

Examples of surface tension adjusting agents include non-ionic, cationic or anionic surfactants. Here, the surface tension of the ink jet recording ink of the present invention is preferably 25 mN/m to 70 mN/m. 25 mN/m to 60 mN/m is more preferable. In addition, the viscosity of the ink jet recording ink of the present invention is preferably 30 mPa·s or less. Furthermore, it is more preferable to adjust the viscosity to 20 mPa·s or less. Examples of surfactants are preferably anion-based surfactants such as fatty acid salts, alkyl sulfuric acid ester salts, alkyl benzene sulfonic acid salts, alkyl naphthalene sulfonic acid salts, dialkyl sulfosuccinate acid salts, alkyl phosphoric ester salts, naphthalene sulfonic acid formalin condensates, and polyoxyethylene alkyl sulfuric acid salts, or non-ionic-based surfactants such as polyoxyethylene alkyl esters, polyoxyethylene alkyl allyl ethers, polyoxyethylene fatty acid esters, sorbitan fatty acid esters, polyoxyethylene sorbitan fatty acid esters, polyoxyethylene alkyl amines, glycerin fatty acid esters, and oxyethyleneoxypropylene block copolymers. In addition, SURFYNOLS (produced by Air Products and Chemicals, Inc.) which are acetylene-based polyoxyethylene oxide surfactants are also preferably used. In addition, amine oxide-type amphoteric surfactants such as N,N-dimethyl-N-alkylamine oxides are also preferable. Furthermore, it is also possible to use the examples of surfactants which are described in page 37 and page 38 in JP1984-157636A (JP-S59-157636A) and Research Disclosure No. 308119 (1989).

As anti-foaming agents, it is also possible to use chelating agents and the like which are represented by fluorine-based or silicone-based compounds or EDTA as necessary.

In a case where the compound of the present invention is dispersed in a water-based medium, it is preferable to disperse colored fine particles which contain the compound and oil-soluble polymer as described in each of JP1999-286637A (JP-H11-286637A), JP2000-78491, JP2000-80259, JP2000-62370, and the like, or it is preferable to disperse the compound of the present invention which is dissolved in an organic solvent with a high boiling point in a water-based medium as described in each specification of JP2000-78454, JP2000-78491, JP2000-203856, and JP2000-203857. It is preferable to use specific methods, the oil-soluble polymer to be used, the organic solvents with a high boiling point, the additive agents, and the usage amounts thereof in a case where the compound of the present invention is dispersed in a water-based medium which are described in the patent specifications and the like described above. Alternatively, the compound of the present invention may be dispersed as a solid in a fine particle state. It is possible to use a dispersing agent or a surfactant during the dispersing. As a dispersing apparatus, it is possible to use a simple stirrer, an impeller stirring method, an inline stirring method, a milling method (for example, a colloid mill, a ball mill, a sand mill, an attritor, a roll mill, an agitator mill, or the like), an ultrasonic wave method, a high-pressure emulsion dispersing method (a high-pressure homogenizer; examples of specific commercially available apparatuses include a Gaulin homogenizer, a Microfluidizer, DeBEE2000, or the like). The details of the preparation method for the ink jet recording ink described above are described in each of JP1993-148436A (JP-H5-148436A), JP1993-295312A (JP-H5-295312A), JP1995-97541A (JP-H7-97541A), JP1995-82515A (JP-H7-82515A), JP1995-118584A (JP-H7-118584A), JP1999-286637A (JP-H11-286637A), and JP2000-87539 other than the patents described above, and use is also possible for the preparation of the ink jet recording ink of the present invention.

The water-based medium has water as a main component and it is possible to use a mixture to which a water-miscible organic solvent is added as desired. Examples of the water-miscible organic solvent include alcohol (for example, methanol, ethanol, propanol, isopropanol, butanol, isobutanol, sec-butanol, t-butanol, pentanol, hexanol, cyclohexanol, benzyl alcohol), polyhydric alcohols (for example, ethylene glycol, diethylene glycol, triethylene glycol, polyethylene glycol, propylene glycol, dipropylene glycol, polypropylene glycol, butylene glycol, hexane diol, pentane diol, glycerin, hexanetriol, and thiodiglycol), glycol derivatives (for example, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, and ethylene glycol mono phenyl ether), amines (for example, ethanolamine, diethanolamine, triethanolamine, N-methyl diethanolamine, N-ethyl diethanolamine, morpholine, N-ethylmorpholine, ethylene diamine, diethylenetriamine, triethylenetetramine, polyethylene imine, and tetramethyl propylenediamine), and other polar solvents (for example, formamide, N,N-dimethylformamide, N,N-dimethylacetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone). Here, two or more types of water-miscible organic solvents may be used together.

In 100 parts by mass of the ink jet recording ink of the present invention, the compounds which are represented by General Formula (1) are preferably contained at 0.2 parts by mass to 10 parts by mass, and more preferably contained at 1 part by mass to 6 parts by mass. In addition, other pigments may be used together with the compounds which are represented by General Formula (1) in the ink jet recording ink of the present invention. In a case using two or more types of pigments together, the total content of the pigments is preferably within the ranges described above.

The viscosity of the ink jet recording ink of the present invention is preferably 30 mPa·s or less. In addition, the surface tension thereof is preferably 25 mN/m to 70 mNm. It is possible to adjust the viscosity and surface tension by adding various types of additive agents, for example, viscosity adjusting agents, surface tension adjusting agents, specific resistance adjusting agents, coating film adjusting agents, ultraviolet absorbers, antioxidants, fading inhibitors, antifungal agents, rust preventive agents, dispersing agents, and surfactants.

It is possible to use the ink jet recording ink of the present invention for inks with various tones; however, use for magenta tone inks is preferable. In addition, it is possible to use the ink jet recording ink not only to form single color images but also to form full color images. It is possible to use magenta tone ink, cyan tone ink, and yellow tone ink to form full color images, and, moreover, black tone ink may be further used in order to adjust the tone.

It is possible to use arbitrary dyes as applicable yellow dyes. Examples thereof include aryl or heterylazo dyes which have phenols naphthols, anilines, heterocycles such as pyrazolones and pyridines, open chain-type active methylene compounds, and the like as a coupling component (referred to below as coupler components); azomethine dyes which have open chain-type active methylene compounds and the like as coupler components; methine dyes such as benzylidene dyes and monomethine oxonol dyes; quinone-based dyes such as naphthoquinone dyes and anthraquinone dyes; and the like, and examples of types of dyes other than the above include quinophthalone dyes, nitro-nitroso dyes, acridine dyes, acridinone dyes, and the like.

It is possible to use arbitrary dyes as applicable magenta dyes. Examples thereof include aryl or heterylazo dyes which have phenols, naphthols, anilines, and the like as coupler components; azomethine dyes which have pyrazolones, pyrazolotriazoles, and the like as coupler components; methine dyes such as arylidene dyes, styryl dyes, merocyanine dyes, cyanine dyes, and oxonol dyes; carbonium dyes such as diphenylmethane dyes, triphenylmethane dyes, and xanthene dyes; quinone dyes such as naphthoquinones, anthraquinones, and anthrapyridones; and condensed polycyclic dyes such as dioxazine dyes.

It is possible to use arbitrary dyes as applicable cyan dyes. Examples thereof include aryl or heterylazo dyes which have phenols, naphthols, and anilines, as coupler components; azomethine dyes which have phenols, naphthols, and heterocyclic compounds such as pyrrolotriazole as coupler components; polymethine dyes such as cyanine dyes, oxonol dyes, and merocyanine dyes; carbonium dyes such as diphenylmethane dyes, triphenylmethane dyes, and xanthene dyes; phthalocyanine dyes; anthraquinone dye; and indigo thioindigo dyes.

Each of the dyes described above may be each of yellow, magenta, and cyan for the first time after a part of the chromophore is dissociated, and, in such a case, the counter cations may be inorganic cations such as alkali metal, ammonium, or may be organic cations such as pyridinium, quaternary ammonium salts, and, moreover, may be polymer cations which have the above in a part of the structure.

Examples of applicable black coloring materials other than disazo, trisazo, tetraazo dyes include carbon black dispersions.

It is possible to use the ink composition of the present invention for a recording method such as printing, copying, marking, writing, drafting, or stamping, and the ink composition of the present invention is particularly suitable for use in an ink jet recording method.

[Ink Jet Recording Method]

The present invention also relates to an ink jet recording method which forms images using the coloring composition or the ink jet recording ink of the present invention.

The ink jet recording method of the present invention forms images on an image-receiving material known in the art, that is, plain paper, resin-coated paper, ink jet paper, film, electrophotographic common paper, fabric, glass, metal, or ceramics which are described in JP1996-169172A (JP-H8-169172A), JP1996-27693A (JP-H8-27693A), JP1990-276670A (JP-H2-276670A), JP1995-276789A (JP-H7-276789A), JP1997-323475A (JP-H9-323475A), JP1987-238783A (JP-S62-238783A), JP1998-153989A (JP-H10-153989A), JP1998-217473A (JP-H10-217473A), JP1998-235995A (JP-H10-235995A), JP1998-337947A (JP-H10-337947A), JP1998-217597A (JP-H10-217597A), JP1998-337947A (JP-H10-337947A), and the like by supplying energy to the ink jet recording ink.

When forming an image, a polymer fine particle dispersoid (also referred to as a polymer latex) may also be used for the purpose of imparting glossiness or water resistance or improving the weather resistance. The time of application of the polymer latex to the image-receiving material may be before, after, or at the same time as the time of application of the coloring agents, therefore, the adding place may also be on the image-receiving paper or in the ink, alternatively, the polymer latex may be used as a liquid substance of an individual polymer latex. In detail, it is possible to preferably use the methods which are described in each specification of JP2000-363090, JP2000-315231, JP2000-354380, JP2000-343944, JP2000-268952, JP2000-299465, JP2000-297365, and the like.

[Ink Jet Printer Cartridge and Ink Jet Recording Material]

The ink jet recording ink cartridge of the present invention is filled with the ink jet recording ink of the present invention described above. In addition, the ink jet recording material of the present invention forms a color image on a target recording material using the ink jet recording ink of the present invention described above.

Description will be given below of a recording paper and a recording film which are used for ink jet printing using the ink of the present invention.

The support body in the recording paper or recording film is formed of a chemical pulp such as LBKP, and NBKP, a mechanical pulp such as GP, PGW, RMP, TMP, CTMP, CMP, and CGP, or waste paper pulp such as DIP, and it is possible to use a support body which is produced using various types of apparatuses such as a fourdrinier paper machine or a cylinder paper machine after mixing additive agents such as pigments binders, sizing agents, fixing agents, cationic agents, and paper strengthening agents, which are known in the art as necessary. The supporting body may be any synthetic paper or plastic film sheet other than the above supporting body, and the thickness of the supporting body is desirably 10 μm to 250 μm and the basis weight is desirably 10 g/m² to 250 g/m².

An ink-receiving layer and a backcoat layer may be provided on the support body as is or, the ink-receiving layer and the backcoat layer may be provided after size pressing or providing an anchor coat layer using starch, polyvinyl alcohol or the like. Furthermore, a flattening process may be performed on the support body using a calendar apparatus such as a machine calendar, a TG calendar, a soft calendar, or the like. A paper or a plastic film of which both surfaces are laminated with polyolefin (for example, polyethylene, polystyrene, polyethylene terephthalate, polybutene and copolymers thereof) are more preferably used as the support body in the present invention.

A white pigment (for example, titanium oxide or zinc oxide) or a coloring dye (for example, cobalt blue, ultramarine blue, or neodymium oxide) is preferably added to the polyolefin.

The ink-receiving layer which is provided on the support body contains a pigment and a water-based binder. The pigment is preferably a white pigment and examples of the white pigments include white inorganic pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide, and zinc carbonate, and organic pigments such as styrene-based pigments, acrylic-based pigments, urea resins, melamine resins, and the like. As the white pigment which is contained in the ink-receiving layer, a porous inorganic pigment is preferable and synthetic amorphous silica and the like with a large pore area are particularly favorable. Regarding the synthetic amorphous silica, it is possible to use either of an anhydrated silicic acid which is obtained by a dry production method or a hydrated silicic acid which is obtained by wet production method; however, it is particularly desirable to use hydrated silicic acid.

Examples of the water-based binders which are contained in the ink-receiving layer include water-soluble polymers such as polyvinyl alcohol, silanol-modified polyvinyl alcohol, starch, cationic starch, casein, gelatin, carboxymethyl cellulose, hydroxyethyl cellulose, polyvinylpyrrolidone, polyalkylene oxide, and polyalkylene oxide derivatives, water-dispersible polymers such as styrene-butadiene latex and acrylic emulsions, and the like. It is possible to use the water-based binders individually or two more types together. In the present invention, polyvinyl alcohol and silanol-modified polyvinyl alcohol are particularly favorable among the above in terms of the adhesiveness to the pigment and the peeling resistance of the ink-receiving layer.

The ink-receiving layer is able to contain mordants, water resistant agents, lightfastness improving agents, surfactants, and other additive agents other than pigments and water-based binding agents.

The mordant which is added to the ink-receiving layer is preferably immobilized. A polymer mordant is preferably used for this purpose.

Polymer mordants are described in each of the publications of JP1973-28325A (JP-S48-28325A), JP1979-74430A (JP-S54-74430A), JP1979-124726A (JP-S54-124726A), JP1980-22766A (JP-S55-22766A), JP1980-142339A (JP-S55-142339A), JP1985-23850A (JP-S60-23850A), JP1985-23851A (JP-S60-23851A), JP1985-23852A (JP-S60-23852A), JP1985-23853A (JP-S60-23853A), JP1985-57836A (JP-S60-57836A), JP1985-60643A (JP-S60-60643A), JP1985-118834A (JP-S60-118834A), JP1985-122940A (JP-S60-122940A), JP1985-122941A (JP-S60-122941A), JP1985-122942A (JP-S60-122942A), JP1985-235134A (JP-S60-235134A), and JP1989-161236A (JP-H1-161236A) and in each of the specifications of U.S. Pat. Nos. 2,484,430A, 2,548,564A, 3,148,061A, 3,309,690A, 4,115,124A, 4,124,386A, 4,193,800A, 4,273,853A, 4,282,305A, and 4,450,224A. An image-receiving material which contains the polymer mordants which are described in page 212 to page 215 in JP1989-161236A (JP-H1-161236A) is particularly preferable. When the polymer mordants which are described in the publications above are used, an image with excellent image quality is obtained and the lightfastness of the image is improved.

Water resistant agents are effective for making an image water resistant and the water resistant agent is particularly desirably a cation resin. Examples of the cation resin include polyamide polyamine epichlorohydrin, polyethylene imine, polyamine sulfone, dimethyl diallyl ammonium chloride polymer, cation polyacrylamide, colloidal silica, and the like, and polyamide polyamine epichlorohydrin is particularly preferable among the cation resins. The content of the cation resins is preferably 1 mass % to 15 mass % with respect to the total solid content of the ink-receiving layer and particularly preferably 3 mass % to 10 mass %.

Examples of the lightfastness improving agents include benzotriazole-based ultraviolet absorbers and the like such as zinc sulfate, zinc oxide, hindered amine antioxidants, and benzophenone. Among the above, zinc sulfate is particularly preferable.

The surfactant functions as a coating aiding agent, a peeling property improving agent, a slidability improving agent, or an antistatic agent. The surfactant is described in each of the publications of JP1987-173463A (JP-S62-173463A) and JP1987-183457A (JP-S62-183457A). An organic fluoro compound may be used instead of the surfactant. The organic fluoro compound is preferably hydrophobic. Examples of the organic fluoro compounds include a fluorine-based surfactant, an oil-form fluorine-based compound (for example, fluorine oil), and a solid-form fluorine compound resin (for example, a tetrafluoroethylene resin). The organic fluoro compounds are described in each of the publications of JP1982-9053B (JP-S57-9053B) (columns No. 8 to 17), JP1986-20994A (JP-S61-20994A), and JP1987-135826A (JP-S62-135826A. Examples of other additive agents to be added to the ink-receiving layer include a pigment dispersing agent, a thickener, an anti-foaming agent, a dye, a fluorescent brightening agent, a preservative agent, a pH adjusting agent, a matting agent, a film curing agent, and the like. Here, the ink-receiving layer may be one layer or two layers.

It is also possible to provide a back coating layer on the recording paper and a recording film and examples of components which are able to be added to this layer include white pigments, water-based binders, and other components. Examples of the white pigments which are contained in the back coat layer include white inorganic pigments such as precipitated calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudoboehmite, aluminum hydroxide, alumina, lithopone, zeolite, hydrated halloysite, magnesium carbonate, and magnesium hydroxide and organic pigments such as styrene-based plastic pigments, acrylic plastic pigments, polyethylene, microcapsules, urea resin, melamine resins, and the like.

Examples of the water-based binder which is contained in the back coat layer include water-soluble polymers such as styrene/maleic acid salt copolymers, styrene/acrylic acid salt copolymers, polyvinyl alcohol, silanol-modified polyvinyl alcohol, starch, cationized starch, casein, gelatin, carboxymethyl cellulose, hydroxyethyl cellulose, and polyvinyl pyrrolidone, water-dispersible polymers such as styrene-butadiene latex and acrylic emulsions, and the like. Examples of other components which are contained in the back coat layer include anti-foaming agents, foam inhibitors, dyes, fluorescent brightening agents, preservative agents, water resistant agents, and the like.

A polymer latex may be added to the constituent layers (including the back coat layer) of the ink jet recording sheet and the recording film. The polymer latex is used for the purpose of improving the physical properties of the film such as the size stability, curling prevention, adhesion prevention, and film cracking prevention. The polymer latex is described in each of the publications of JP1987-245258A (JP-S62-245258A), JP1987-136648A (JP-S62-136648A), and JP1987-110066A (JP-S62-110066A). When a polymer latex with low glass transition temperature (40° C. or lower) is added to a layer which includes a mordant, it is possible to prevent the layer from cracking or curling. In addition, it is possible to prevent the layer from curling even when a polymer latex with high glass transition temperature is added to the back coat layer.

The ink of the present invention is not limited to an ink jet recording method and may be used in the method which is known in the art, for example, a charge control method in which ink is discharged using electrostatic attraction, a drop-on-demand method (pressure pulse method) using the vibration pressure of piezo elements, an acoustic ink jet method in which electrical signals are changed to acoustic beams to irradiate the ink and discharge the ink using radiation pressure, and a thermal ink jet method in which air bubbles are formed by heating ink and using the generated pressure. The ink jet recording methods include a method of discharging a number of inks with low concentration referred to as photo inks at small volumes, a method of improving image quality using a plurality of inks with substantially the same tone and different concentration, and a method using colorless transparent inks.

[Color Filter]

The present invention also relates to a color filter which contains the compounds which are represented by General Formula (1) above.

Examples of the method for forming the color filter include a method for forming a pattern using a photo resist first and then carrying out dyeing, or a method for forming a pattern using the photo resist in which pigments were added, which are described in the publications of JP 1992-163552A (JP-H4-163552A), JP1992-128703A (JP-H4-128703A), and JP1992-175753A (JP-H4-175753A). The method which is used in a case of introducing the compounds of the present invention to the color filter may be any one of the above methods; however, preferable methods include the methods which are described in JP1992-175753A (JP-H4-175753A) and JP1994-35182A (JP-H6-35182A), in which a color filter is formed by coating a positive resist composition which contains a thermosetting resin, a quinonediazide compound, a cross-linking agent, a pigment, and a solvent on a substrate, then carrying out exposure through a mask, forming a positive resist pattern by developing the exposed portion described above, exposing the entire surface of the positive resist pattern described above, and then curing the exposed positive resist pattern. In addition, it is possible to obtain color filters of RGB primary colors or Y, M, and C complementary colors by forming a black matrix using conventional methods. Even in a case of a color filter, there is no limit on the usage amount of the compound of the present invention; however, 0.1 mass % to 50 mass % is preferable.

For the thermosetting resin, quinonediazide compound, cross-linking agent, and solvent to be used at this time and the usage amounts thereof, it is possible to preferably use those are described in the patent publications described above.

[Color Toner]

The present invention also relates to a color toner which contains a compound which is represented by General Formula (1) above.

The content of the compound of the present invention in 100 parts by mass of the color toner is not particularly limited; however, it is preferable to contain 0.1 parts by mass or more, more preferably 1 part by mass to 20 parts by mass, and most preferably 2 parts by mass to 10 parts by mass. It is possible to use all binders which are commonly used as a binder resin for the color toner for introducing the compound of the present invention. Examples thereof include styrene-based resins, acrylic-based resins, styrene/acrylic-based resins, polyester resins, and the like.

An inorganic fine powder or organic fine particles may be externally added to the toner for the purpose of liquidity improvement, charge control and the like. Silica fine particles or titania fine particles surface-treated with an alkyl group-containing coupling agent or the like are preferably used. Here, the average primary particle diameter of the particles is preferably 10 nm to 500 nm, furthermore, adding 0.1 mass % to 20 mass % thereof to the toner is preferable.

It is possible to use all the releasing agents which are conventionally used as a releasing agent. Specific examples include olefins such as low molecular weight polypropylene, low molecular weight polyethylene and ethylene-propylene copolymer and microcrystalline wax, carnauba wax, sasol wax, paraffin wax, and the like. The adding amount is preferably added at 1 mass % to 5 mass % to the toner.

A charge control agent may be added as necessary; however, a colorless charge control agent is preferable from the point of view of the color developing property. Examples thereof include quaternary ammonium salt structures, calixarene structure, or the like.

As a carrier, either non-coated carriers formed of only magnetic material particles such as iron or ferrite, or resin-coated carriers in which the magnetic material particle surfaces are coated by a resin or the like may be used. The average particle diameter of the carrier is preferably 30 µm to 150 µm in volume average particle diameter.

Image forming methods in which toner is applied are not particularly limited; however, examples thereof include a method for forming an image by transfer after repeatedly forming a color image on a photoreceptor, or a method for forming a color image transferred to an image forming member such as paper after sequentially transferring a formed image on a photoreceptor to an intermediate transfer body or the like and forming a color image on an intermediate transfer body or the like.

[Transfer Ink]

The present invention also relates to a transfer ink which contains the compound which is represented by General Formula (1) above.

A sublimation transfer ink is preferable as the transfer ink. The sublimation transfer ink generally contains a sublimation dye and water; however, in addition, a sublimation transfer ink which includes a water-soluble organic solvent is widely used in order to prevent clogging of the nozzles of the ink jet head or to secure the discharge stability. Examples of the water-soluble organic solvent include polyol compounds, glycol ethers, sugars, betaine compounds, and the like.

Other components of the sublimation transfer ink of the present invention may include dispersing agents, preservative and antifungal agents, pH adjusting agents, chelating agents, rust preventive agents, ultraviolet absorbers, anti-foaming agents, surface tension adjusting agents, polysiloxane compounds, or the like. The dispersing agent is not particularly limited; however, it is possible to use anion-based dispersing agents such as formalin condensates of aromatic sulfonic acids, non-ionic-based dispersing agents such as ethylene oxide adducts of phytosterols or ethylene oxide adducts of cholestanol, and polymer dispersing agents such as polyacrylic acid moiety alkyl esters, polyalkylene polyamines, polyacrylic acid salts, styrene-acrylic acid copolymers, and vinylnaphthalene-maleic acid copolymers.

As the method for creating a dyed material, it is possible to use the creation methods which are described in JP2004-107647A, JP2009-202541A, JP2013-163716A, JP2014-15685A, and JP2014-80539A.

For the additive agents and solvents to be used at this time, the usage amounts thereof, and the physical properties of the ink, it is possible to preferably use those described in the patent publications described above, or, those which are used for the ink jet recording ink.

Any material may be used for the material to be dyed, for example, sheet-like materials such as fabric (hydrophobic fiber fabric or the like), resin (plastic) films, and paper are suitably used; however, material which has a three-dimensional shape such as a spherical shape, or a rectangular parallelepiped shape other than a sheet may also be used.

EXAMPLES

Detailed description will be given of the present invention below using Examples; however, the present invention is not limited to the Examples. Unless otherwise stated, "%" and "parts" in the Example are mass % and parts by mass.

Synthesis Example (Synthesis of Exemplified Compound (1-4))

It is possible to synthesize the Exemplified Compound (1-4), for example, according to the following scheme.

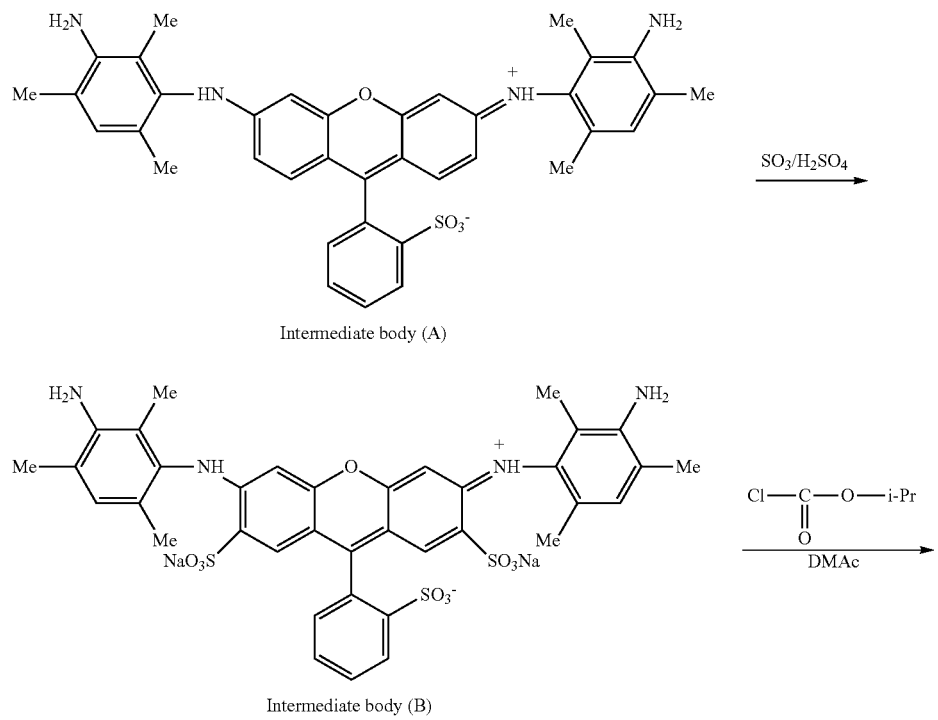

Intermediate body (A)

Intermediate body (B)

-continued

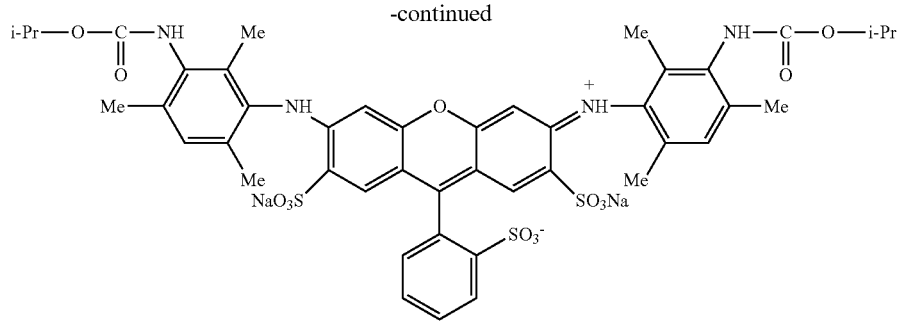

Exemplified Compound (1-4)

(Synthesis of Intermediate Body (B))

23.0 g of intermediate body (A) (synthesized using the method which is described in paragraph "0065", page 17 in JP2011-148973A) was added to 420 g of 10% fuming sulfuric acid and a reaction was carried out for 48 hours at room temperature. The reaction liquid was poured into a large excess of ethyl acetate and the precipitated crystals were filtered and separated. The filtered and separated crystals were dissolved in 500 mL of methanol, adjusted to pH7 using 28% of sodium methoxide methanol solution and the precipitated sodium sulfate was removed by filtration. The filtrate was concentrated using a rotary evaporator and the obtained residue was purified using column chromatography (filler: SEPHADEX LH-20 (produced by Pharmacia), developing solvent: methanol), and crystals of the intermediate body (B) were obtained. The yield was 21.0 g, the yield rate was 68%, and MS (m/z)=793 ([M−2Na+H], 100%).

(Synthesis of Exemplified Compound (1-4))

3.0 g of the intermediate body (B) was dissolved in 40 mL of N,N-dimethylacetamide (DMAc) and the internal temperature thereof was cooled to 10° C. or lower. 1.76 g of chloroformic acid isopropyl ester (produced by Tokyo Chemical Industry Co., Ltd.) was added dropwise thereto while maintaining the internal temperature at 10° C. or lower. The reaction liquid was returned to room temperature and stirred for 2 hours. The obtained reaction liquid was poured into a large excess of ethyl acetate and the precipitated solid was filtered and separated. The obtained solid was dissolved in 25 mL of water and adjusted to pH7 using a sodium hydroxide solution. After the obtained water solution was purified using column chromatography (filler: SEPHADEX LH-20 (produced by Pharmacia), developing solvent: water/methanol), the inorganic salt and residual organic solvent were removed using a dialysis membrane (3500 molecular weight cutoff, SPECTRA/POR3 DIALYSIS MEMBRANE (product name, produced by Spectrum Inc.)), the obtained water solution was adjusted to pH7 again with a diluted water solution of sodium hydroxide, dust was then removed and the resultant was filtered through a membrane filter, and green shiny crystals of the Exemplified Compound (1-4) were obtained by concentrating and crystallizing the obtained water solution using a rotary evaporator. The yield was 2.5 g and the yield rate was 69%. MS (m/z)=1008 ([M−1]⁻, 100%). The maximum absorption wavelength of absorption spectrum of the Exemplified Compound (1-4) in the diluted aqueous solution was 530 nm and the molar absorption coefficient was 57000.

(Synthesis of Exemplified Compound (1-5))

It is possible to synthesize the Exemplified Compound (1-5) according to the following scheme.

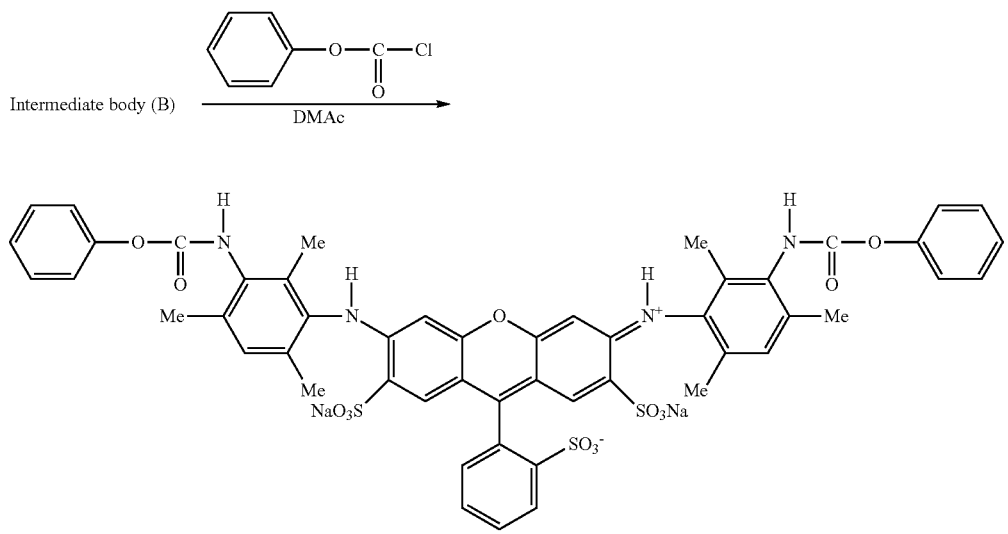

Exemplified Compound (1-5)

20 g of the intermediate body (B) obtained as a synthetic intermediate body of the Exemplified Compound (1-4) described above was dissolved in 120 mL of N,N-dimethylacetamide (DMAc) and the internal temperature thereof was cooled to 0° C. After adding 10 mL of chloroformic acid phenyl (produced by Tokyo Chemical Industry Co., Ltd.) dropwise thereto while maintaining the inner temperature at 5° C. or lower, a reaction was carried out for 90 minutes at 0° C. to 5° C. The obtained reaction liquid was poured into 1500 mL of ethyl acetate and, after the precipitated crystals were filtered and separated, the crystals were dissolved in 200 mL of water and the pH was adjusted to 7 with a diluted water solution of sodium hydroxide, and the obtained water solution was purified with column chromatography (filler: SEPHADEX LH-20 (produced by Pharmacia), (developing solvent: water/methanol). The resultant was concentrated using a rotary evaporator and redissolved in water, then, after a strong acid ion-exchange resin (AMBERLITE IR124-H (product name), Organo Corp.) was passed therethrough, the pH was adjusted to 7 with a diluted water solution of sodium hydroxide, the resultant was filtered through a membrane filter after dust was removed, and a green shiny solid of Exemplified Compound (1-5) was obtained by concentrating and drying the resultant using a rotary evaporator. The yield was 24 g and the yield rate was 93%. MS (m/z)=1054 ([M−Na]⁻, 100%). The maximum absorption wavelength of absorption spectrum of the Exemplified Compound (1-5) in the diluted aqueous solution was 531 nm.

(Synthesis of Exemplified Compound (1-8))

It is possible to synthesize Exemplified Compound (1-8) according to the following scheme.

Figure 5:
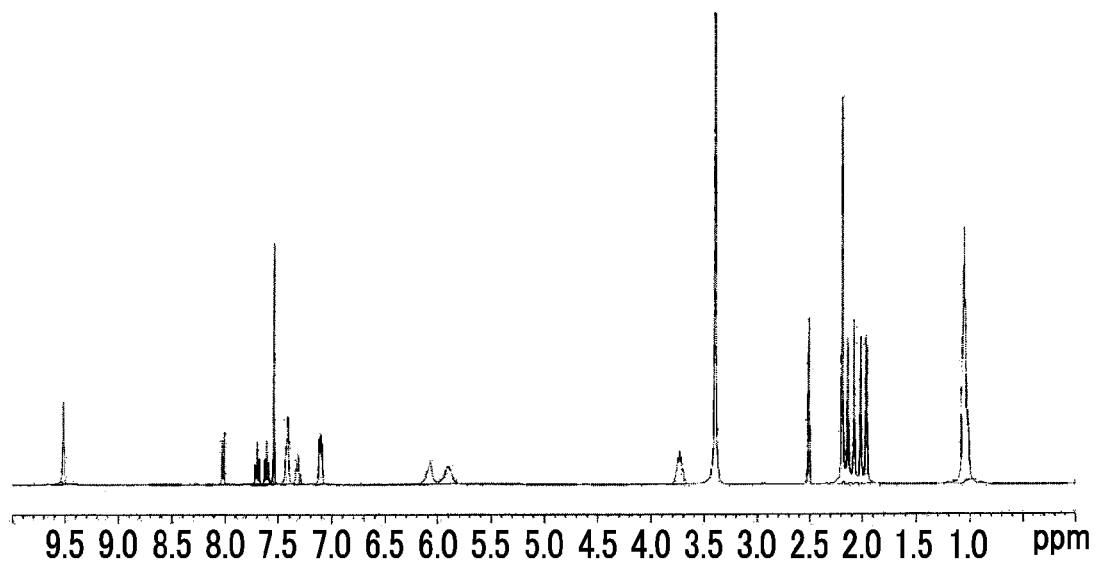
FIG. 5 is a diagram which shows the $^1$H-NMR spectrum in dimethyl sulfoxide-d6 of Exemplified Compound (1-8).

4 g of the intermediate body (B) obtained as a synthetic intermediate body of the Exemplified Compound (1-4) described above was dissolved in 56 mL of N,N-dimethylacetamide (DMAc) and the internal temperature thereof was cooled to 0° C. After adding 4.8 mL of chloroformic acid phenyl (produced by Tokyo Chemical Industry Co., Ltd.) dropwise thereto while maintaining the internal temperature at 5° C. or lower, a reaction was carried out for 90 minutes at room temperature. The internal temperature was cooled to 0° C. again and, after adding 4.0 mL of isopropyl amine (produced by Wako Pure Chemical Industries, Ltd.) dropwise thereto at an internal temperature of 10° C. or lower, stirring was carried out for 30 minutes at room temperature. The obtained reaction liquid was poured into a large excess of ethyl acetate and the precipitated solid was filtered and separated. The obtained solid was dissolved in water and adjusted to pH7 with a diluted water solution of sodium hydroxide, and the obtained water solution was purified with column chromatography (filler: SEPHADEX LH-20 (produced by Pharmacia), developing solvent: water/methanol). After concentrating the resultant using a rotary evaporator, the resultant was redissolved in water and, after a strong acid ion-exchange resin (AMBERLITE IR120-H (product name), Organo Corp.) was passed therethrough, the pH was adjusted to 7 with a diluted water solution of sodium hydroxide, and then dust was removed and the resultant filtered through a membrane filter, and a green shiny solid of Exemplified Compound (1-8) was obtained by concentrating and drying using a rotary evaporator. The yield was 3.1 g and the yield rate was 67%. MS (m/z)=962 ([M−1]⁻, 100%). The maximum absorption wavelength of absorption spectrum of the Exemplified Compound (1-8) in the diluted aqueous solution was 531 nm and the molar absorption coefficient was 65000. The $^1$H-NMR spectrum in dimethyl sulfoxide-d6 of the Exemplified Compound (1-8) is shown in FIG. 5.

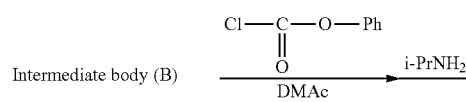

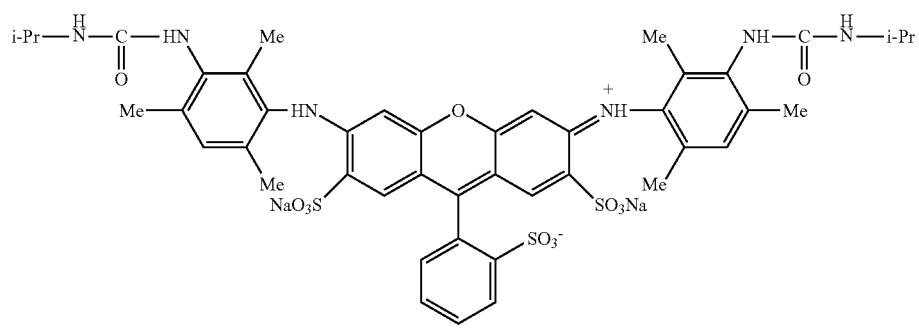

Exemplified Compound (1-8)

(Synthesis of Exemplified Compound (1-10))

It is possible to synthesize Exemplified Compound (1-10), for example, according to the following scheme.

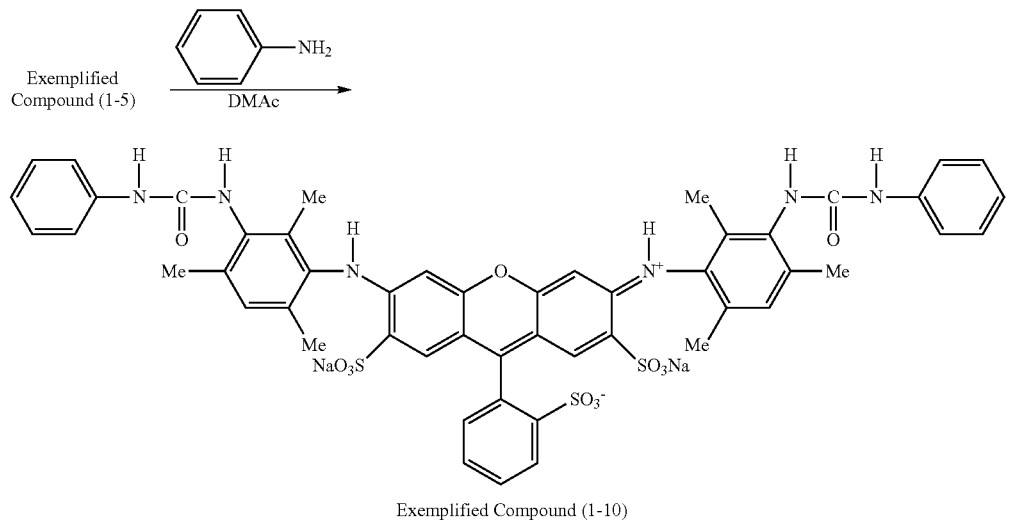

Exemplified Compound (1-10)

5.4 g of Exemplified Compound (1-5) was dissolved in 54 mL of N,N-dimethylacetamide (DMAc) and reacted for 8 hours at an internal temperature of 100° C. by adding 1.9 g of aniline (produced by Tokyo Chemical Industry Co., Ltd.). The obtained reaction liquid was poured into 500 mL of ethyl acetate and, after the precipitated crystals were filtered and separated, the crystals were dissolved in 100 mL of water and adjusted to pH7 with a diluted water solution of sodium hydroxide, and the obtained water solution was purified with column chromatography (filler: SEPHADEX LH-20 (produced by Pharmacia), developing solvent: water/methanol). After concentrating the results using a rotary evaporator, the resultant was redissolved in water and, after a strong acid ion-exchange resin (AMBERLITE IR124-H (product name), Organo Corp.) was passed therethrough, the pH was adjusted to 7 with a diluted water solution of sodium hydroxide, and then dust was removed and the resultant was filtered through a membrane filter, and a green shiny solid of Exemplified Compound (1-10) was obtained by concentrating and drying using a rotary evaporator. The yield was 2.8 g and the yield rate was 48%. MS (m/z)=1051 ([M−Na]$^-$, 100%). The maximum absorption wavelength of the absorption spectrum of the Exemplified Compound (1-10) in the diluted aqueous solution was 532 nm.

(Synthesis of Exemplified Compound (1-13) and Exemplified Compound (1-37))

It is possible to synthesize Exemplified Compound (1-13) and Exemplified Compound (1-37), for example, according to the following scheme.

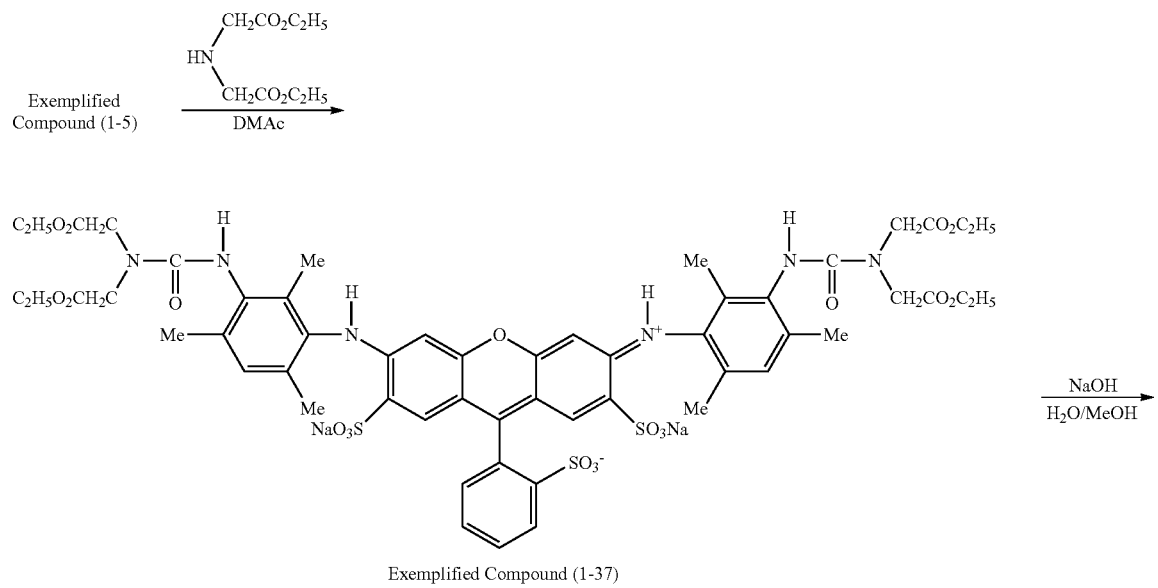

Exemplified Compound (1-37)

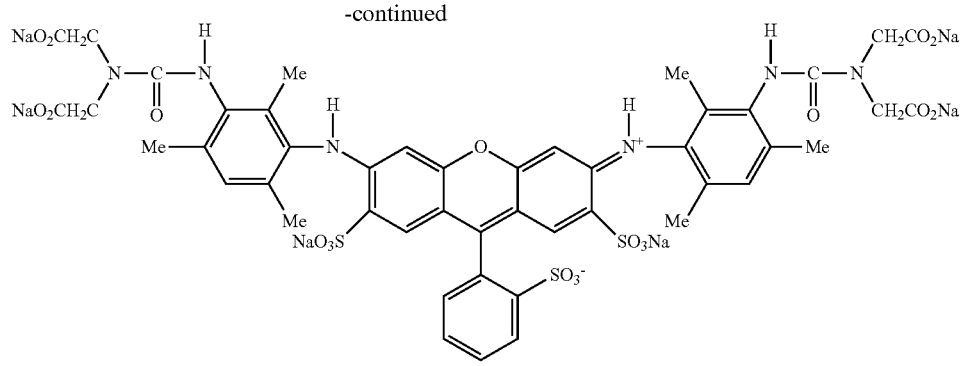

Exemplified Compound (1-13)

(Synthesis of Exemplified Compound (1-37))

5.4 g of Exemplified Compound (1-5) was dissolved in 54 mL of N,N-dimethylacetamide (DMAc) and reacted for 8 hours at an internal temperature of 120° C. by adding 5.0 g of iminodiacetic acid diethyl (produced by Tokyo Chemical Industry Co., Ltd.) thereto. The obtained reaction liquid was poured into 500 mL of ethyl acetate and, after the precipitated crystals were filtered and separated, the crystals were dissolved in 100 mL of water and adjusted to pH7 with a diluted water solution of sodium hydroxide, and the obtained water solution was purified with column chromatography (filler: SEPHADEX LH-20 (produced by Pharmacia), developing solvent: water/methanol). The resultant was concentrated using a rotary evaporator and redissolved in water and, after a strong acid ion-exchange resin (AMBERLITE IR124-H (product name), Organo Corp.) was passed therethrough, the pH was adjusted to 7 with a diluted water solution of sodium hydroxide, and then dust was removed and the resultant was filtered through a membrane filter, and a green shiny solid of Exemplified Compound (1-37) was obtained by concentrating and drying using a rotary evaporator. The yield was 3.0 g and the yield rate was 48%. MS (m/z)=1244 ([M−Na]⁻, 100%). The maximum absorption wavelength of absorption spectrum of the Exemplified Compound (1-37) in the diluted aqueous solution was 533 nm.

(Synthesis of Exemplified Compound (1-13))

3.0 g of Exemplified Compound (1-37) was dissolved in 100 mL of water and the pH was adjusted to 12 to 13 using an aqueous sodium hydroxide solution. The resultant was stirred for 1 hour at room temperature and adjusted to pH 8.0 using diluted hydrochloric acid, and the obtained water solution was purified with column chromatography (filler: SEPHADEX LH-20 (produced by Pharmacia), developing solvent: water/methanol). The resultant was concentrated using a rotary evaporator and redissolved in water and, after a strong acid ion-exchange resin (AMBERLITE IR124-H (product name), Organo Corp.) was passed therethrough, the pH was adjusted to 7 with a diluted water solution of sodium hydroxide, and then dust was removed and the resultant was filtered through a membrane filter, and a green shiny solid of Exemplified Compound (1-13) was obtained by concentrating and drying using a rotary evaporator. The yield was 2.0 g and the yield rate was 57%. MS (m/z)=1219 ([M−Na]⁻, 100%). The maximum absorption wavelength of absorption spectrum of the Exemplified Compound (1-13) in the diluted aqueous solution was 533 nm.

(Synthesis of Exemplified Compound (1-20))

It is possible to synthesize Exemplified Compound (1-20) according to the following scheme.

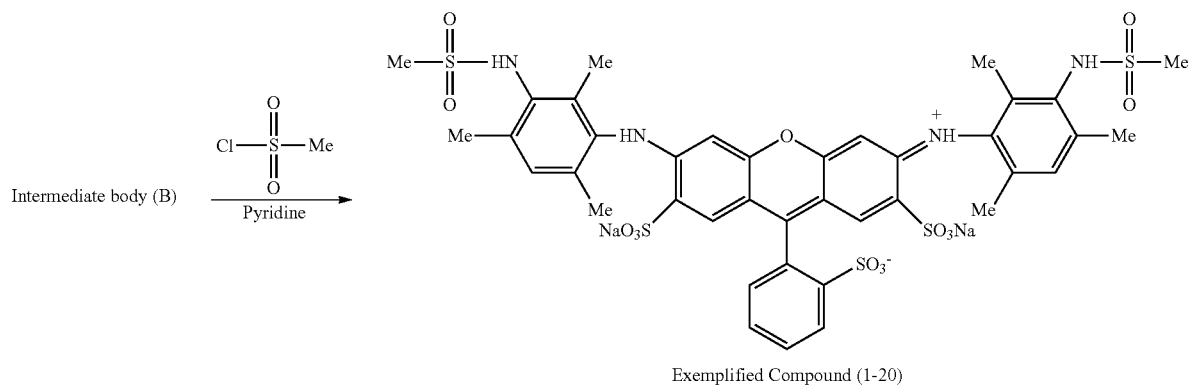

Exemplified Compound (1-20)

4 g of the intermediate body (B) obtained as a synthetic intermediate body of the Exemplified Compound (1-4) described above was reacted for 3 hours at room temperature while slowly dripping 8 mL of pyridine therein after adding 2.0 g of methanesulfonyl chloride thereto. The reaction liquid was added to a large excess of ethyl acetate and the precipitated crystals were filtered and separated. The obtained crystals were dissolved in 50 mL of water and adjusted to pH 7 with a diluted water solution of sodium hydroxide, the obtained water solution was purified with column chromatography (filler: SEPHADEX LH-20 (produced by Pharmacia), developing solvent: water/methanol), and green shiny crystals of Exemplified Compound (1-20)

were obtained. The yield was 3.0 g and the yield rate was 63%. MS (m/z)=993 ([M−1]⁻, 100%). The maximum absorption wavelength of absorption spectrum of the Exemplified Compound (1-20) in the diluted aqueous solution was 533 nm and the molar absorption coefficient was 54000.

(Synthesis of Exemplified Compound (1-23))

It is possible to synthesize the Exemplified Compound (1-23), for example, according to the following scheme.

The resultant was concentrated using a rotary evaporator and redissolved in water and, after a strong acid ion-exchange resin (AMBERLITE IR124-H (product name), Organo Corp.) was passed therethrough, the pH was adjusted to 7 with a diluted water solution of sodium hydroxide, and then dust was removed and the resultant was filtered through a

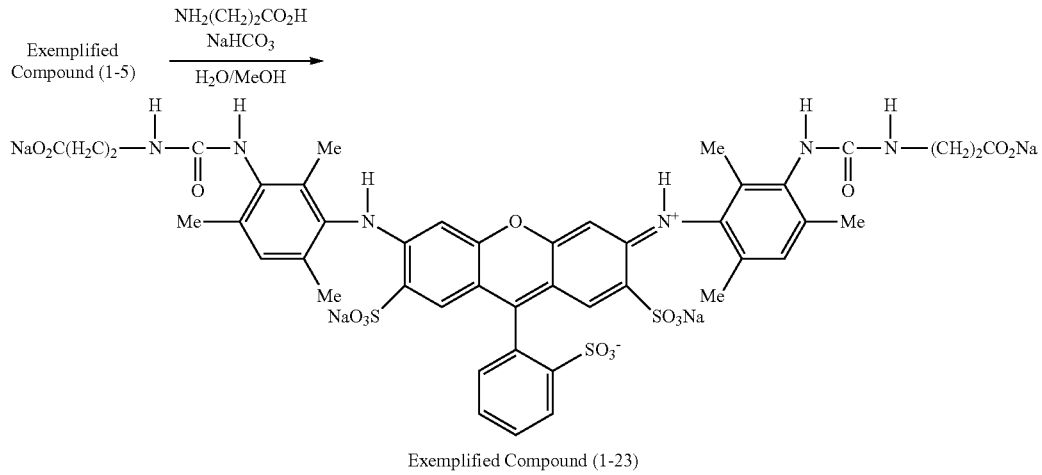

Exemplified Compound (1-23)

5.4 g of Exemplified Compound (1-5) was dissolved in 20 mL of water and 40 mL of methanol and reacted for 6 hours at an internal temperature of 80° C. by adding 2.4 g of BETA-ALANINE (produced by Tokyo Chemical Industry Co., Ltd.) and 1.2 g of sodium bicarbonate thereto. The obtained reaction liquid was poured into 500 mL of 2-propanol and, after the precipitated crystals were filtered and separated, the crystals were dissolved in 100 mL of water and adjusted to pH7 with a diluted water solution of sodium hydroxide, and the obtained water solution was purified with column chromatography (filler: SEPHADEX LH-20 (produced by Pharmacia), developing solvent: water/methanol).

membrane filter, and a green shiny solid of Exemplified Compound (1-23) was obtained by concentrating and drying using a rotary evaporator. The yield was 2.9 g and the yield rate was 52%. MS (m/z)=1087 ([M−Na]⁻, 100%). The maximum absorption wavelength of absorption spectrum of the Exemplified Compound (1-23) in the diluted aqueous solution was 533 nm.

(Synthesis of Exemplified Compound (1-27))

It is possible to synthesize the Exemplified Compound (1-27) according to the following scheme.

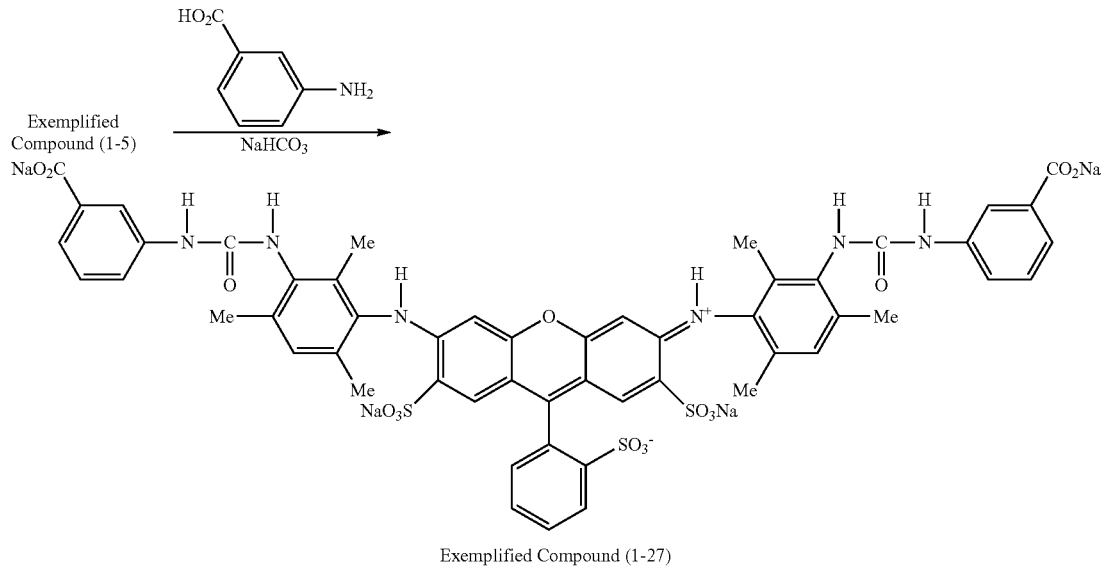

Exemplified Compound (1-27)

5.4 g of Exemplified Compound (1-5) was dissolved in 20 mL of water and 40 mL of methanol and reacted for 6 hours at an internal temperature of 80° C. by adding 2.0 g of m-amino benzoic acid (produced by Tokyo Chemical Industry Co., Ltd.) and 2.0 g of sodium bicarbonate thereto. The obtained reaction liquid was poured into 500 mL of 2-propanol and, after the precipitated crystals were filtered and separated, the crystals were dissolved in 100 mL of water and adjusted to pH7 with a diluted water solution of sodium hydroxide, and the obtained water solution was purified with column chromatography (filler: SEPHADEX LH-20 (produced by Pharmacia), developing solvent: water/methanol). After concentrating the results using a rotary evaporator and redissolving in water, after a strong acid ion-exchange resin (AMBERLITE IR124-H (product name), Organo Corp.) was passed therethrough, the pH was adjusted to 7 with a diluted water solution of sodium hydroxide, and then dust was removed and the resultant was filtered through a membrane filter, and a green shiny solid of Exemplified Compound (1-27) was obtained by concentrating and drying using a rotary evaporator. The yield was 2.5 g and the yield rate was 41%. MS (m/z)=1183 ([M−Na]$^-$, 100%). The maximum absorption wavelength of absorption spectrum of the Exemplified Compound (1-27) in the diluted aqueous solution was 533 nm.

(Synthesis of Exemplified Compound (1-33))

It is possible to synthesize the Exemplified Compound (1-33), for example, according to the following scheme.

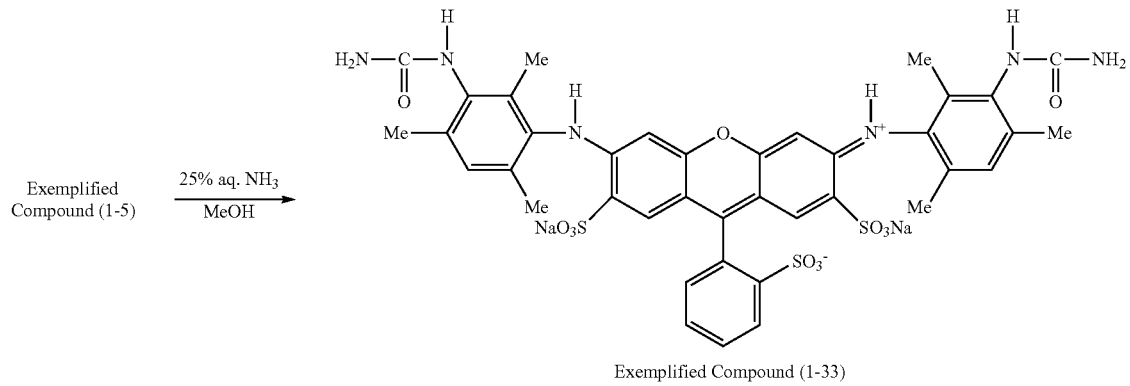

Exemplified Compound (1-33)

5.4 g of Exemplified Compound (1-5) was dissolved in 30 mL of methanol and a reaction was carried out by adding 10 mL of 25% aqueous ammonia (produced by Wako Pure Chemical Industries, Ltd., first class) at an internal temperature of 5° C. to 10° C. The obtained reaction liquid was purified with column chromatography (filler: SEPHADEX LH-20 (produced by Pharmacia), developing solvent: water/methanol). After concentrating the results using a rotary evaporator and redissolving in water, after a strong acid ion-exchange resin (AMBERLITE IR124-H (product name), Organo Corp.) was passed therethrough, the pH was adjusted to 7 with a diluted water solution of sodium hydroxide, and then dust was removed and the resultant was filtered through a membrane filter, and a green shiny solid of Exemplified Compound (1-33) was obtained by concentrating and drying using a rotary evaporator. The yield was 2.0 g and the yield rate was 43%. MS (m/z)=899 ([M−Na]$^-$, 100%). The maximum absorption wavelength of absorption spectrum of the Exemplified Compound (1-33) in the diluted aqueous solution was 532 nm.

(Synthesis of Exemplified Compound (1-34))

It is possible to synthesize Exemplified Compound (1-34), for example, according to the following scheme.

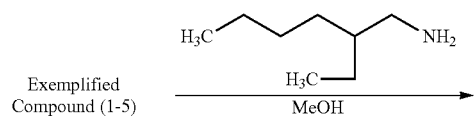

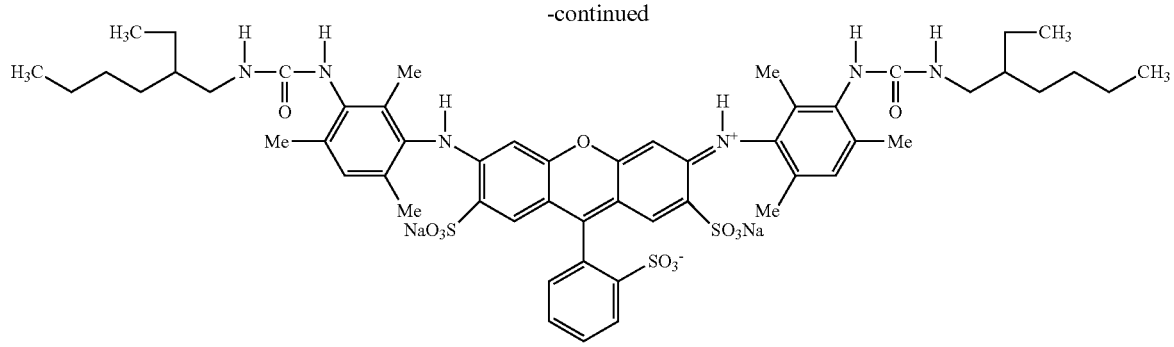

Exemplified Compound (1-34)

5.4 g of Exemplified Compound (1-5) was dissolved in 30 mL of methanol and a reaction was carried out by adding 3.9 g of 2-ethylhexyl amine (produced by Wako Pure Chemical Industries, Ltd.) thereto at an internal temperature of 5° C. to 10° C. The obtained reaction liquid was purified with column chromatography (filler: SEPHADEX LH-20 (produced by Pharmacia), developing solvent: water/methanol). The resultant was concentrated using a rotary evaporator and redissolved in water and, after a strong acid ion-exchange resin (AMBERLITE IR124-H (product name), Organo Corp.) was passed therethrough, the pH was adjusted to 7 with a diluted water solution of sodium hydroxide, and then dust was removed and the resultant was filtered through a membrane filter, and a green shiny solid of Exemplified Compound (1-34) was obtained by concentrating and drying using a rotary evaporator. The yield was 3.1 g and the yield rate was 54%. MS (m/z)=1124 ([M−Na]$^-$, 100%). The maximum absorption wavelength of absorption spectrum of the Exemplified Compound (1-34) in the diluted aqueous solution was 532 nm.

(Synthesis of Exemplified Compound (1-35))

It is possible to synthesize Exemplified Compound (1-35), for example, according to the following scheme.

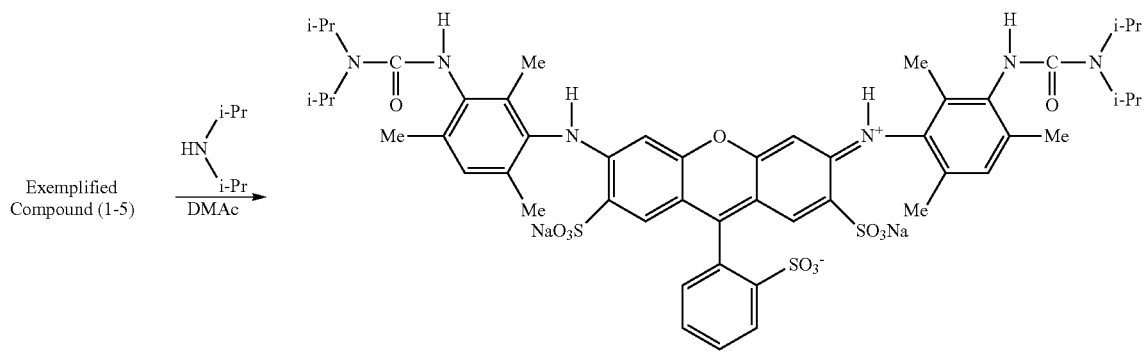

Exemplified Compound (1-35)

5.4 g of Exemplified Compound (1-5) was dissolved in 50 mL of N,N-dimethylacetamide (DMAc) and a reaction was carried out by adding 10 mL of diisopropylamine (produced by Wako Pure Chemical Industries, Ltd., first class) thereto at an internal temperature of 5° C. to 10° C. The obtained reaction liquid was purified with column chromatography (filler: SEPHADEX LH-20 (produced by Pharmacia), developing solvent: water/methanol). After concentrating the results using a rotary evaporator and redissolving in water, after a strong acid ion-exchange resin (AMBERLITE IR124-H (product name), Organo Corp.) was passed therethrough, the pH was adjusted to 7 with a diluted water solution of sodium hydroxide, and then dust was removed and the resultant was filtered through a membrane filter, and a green shiny solid of Exemplified Compound (1-35) was obtained by concentrating and drying using a rotary evaporator. The yield was 1.2 g and the yield rate was 22%. MS (m/z)=1067 ([M−Na]$^-$, 100%). The maximum absorption wavelength of absorption spectrum of the Exemplified Compound (1-35) in the diluted aqueous solution was 532 nm.

(Synthesis of Exemplified Compound (1-36))
It is possible to synthesize Exemplified Compound (1-36), for example, according to the following scheme.

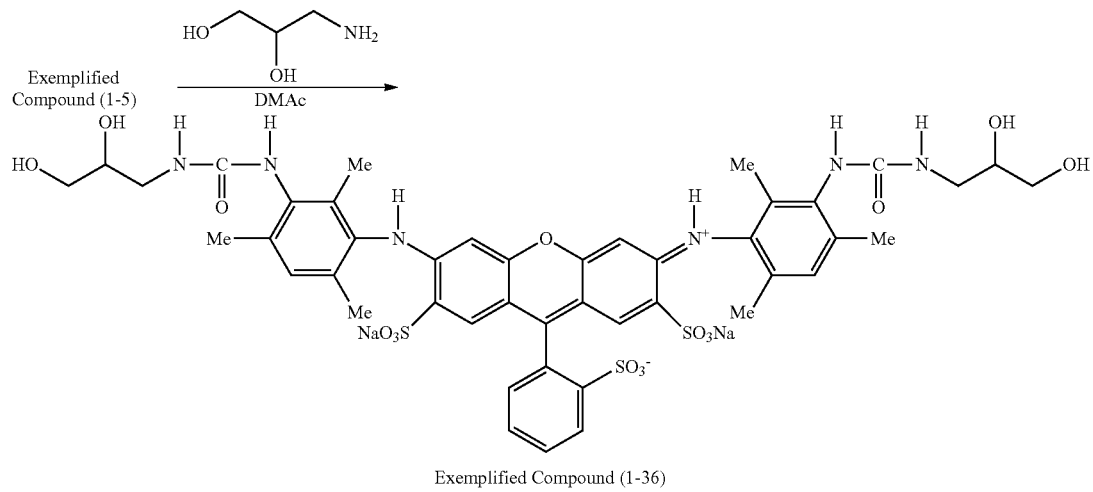

Exemplified Compound (1-36)

5 g of the intermediate body (B) obtained as a synthetic intermediate body of the Exemplified Compound (1-4) described above was dissolved in 50 mL of N,N-dimethylacetamide (DMAc) and the internal temperature thereof was cooled to 0° C. After adding 2.9 mL of chloroformic acid phenyl (produced by Tokyo Chemical Industry Co., Ltd.) dropwise thereto while maintaining the internal temperature at 5° C. or lower, a reaction was carried out for 30 minutes at room temperature. The internal temperature was cooled to 0° C. again and, after adding 2.3 mL of 3-amino-1,2-propanediol (produced by Acros Organics) dropwise thereto at an internal temperature of 10° C. or lower, stirring was carried out for 30 minutes at room temperature. The obtained reaction liquid was poured into 500 mL of 2-propanol and the precipitated solid was filtered and separated. The obtained solid was dissolved in water and adjusted to pH 7 with a diluted water solution of sodium hydroxide, the obtained water solution was purified with column chromatography (filler: SEPHADEX LH-20 (produced by Pharmacia), developing solvent: water/methanol), and green shiny crystals of Exemplified Compound (1-36) were obtained. The yield was 2.4 g and the yield rate was 45%. MS (m/z)=1047 [M−Na]−, 100%). The maximum absorption wavelength of absorption spectrum of the Exemplified Compound (1-36) in the diluted aqueous solution was 532 nm.

(Synthesis of Exemplified Compound (1-5) and Exemplified Compound (1-29))

It is possible to synthesize Exemplified Compound (1-29), for example, according to the following scheme.

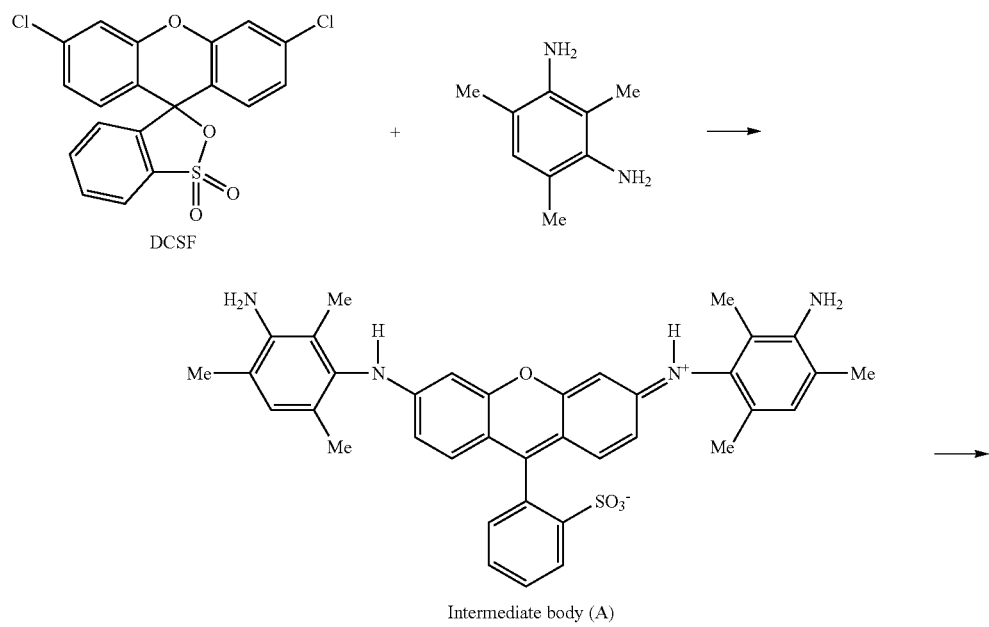

Intermediate body (A)

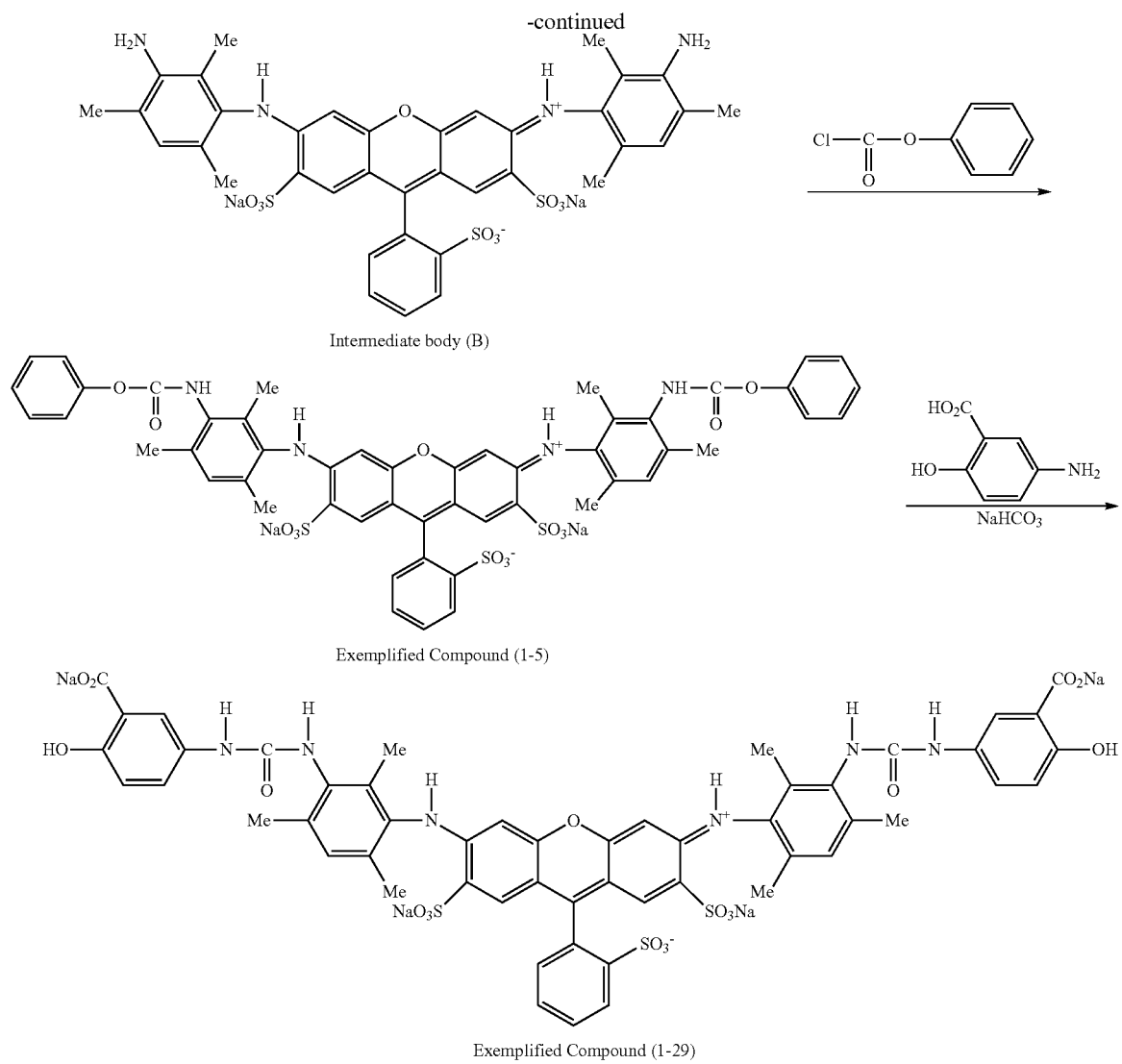

Intermediate body (B)

Exemplified Compound (1-5)

Exemplified Compound (1-29)

[Synthesis of Intermediate Body (A)]

30 g of dichloro sulfophthalein (produced by Chugai Kasei Co., Ltd., DCSF (product name)), 63 g of 2,4,6-trimethyl-1,3-phenylenediamine (produced by Tokyo Chemical Industry Co., Ltd.) and 11 g of zinc chloride were added to 265 g of ethylene glycol and a reaction was carried out for 6 hours at 150° C. The reaction liquid was cooled to room temperature, 300 mL of 0.6 M hydrochloric acid was added dropwise to precipitate crystals, and the precipitated crystals were filtered and separated, and washed with 300 mL of water. The obtained crystals were dried for 12 hours at 60° C. and crystals of the intermediate (A) were obtained. The yield was 23 g and the yield rate was 50%. MS (m/z)=633 ([M+1]$^+$, 100%).

(Synthesis of Intermediate Body (B))

23 g of the intermediate body (A) was added to 420 g of 10% fuming sulfuric acid and allowed to react for 72 hours at room temperature. The reaction liquid was poured into 5 L of 10% saline and the precipitated crystals were filtered and separated. The filtered and separated crystals were dissolved in 500 mL of methanol and adjusted to pH7 using 28% of sodium methoxide methanol solution and the precipitated sodium sulfate was removed by filtration. The filtrate was concentrated using a rotary evaporator and the obtained residue was purified using column chromatography (filler: SEPHADEX LH-20 (produced by Pharmacia), developing solvent: methanol), and crystals of the intermediate body (B) were obtained. The yield was 21 g and the yield rate was 68%. MS (m/z)=793 ([M−2Na+H]$^-$, 100%).

(Synthesis of Exemplified Compound (1-5))

30 g of the intermediate body (B) was dissolved in 200 mL of N,N-dimethylacetamide (DMAc) and cooled to 0° C. 16.8 g of chloroformic acid phenyl was added dropwise thereto and allowed to react for 1 hour at 0° C. After the reaction liquid was added dropwise into 1500 mL of ethyl acetate and the precipitated crystals were filtered, separated, and washed with ethyl acetate, the obtained crystals were dried for 6 hours at 60° C. and crystals of Exemplified Compound (1-5) were obtained. The yield was 35 g and the yield rate was 91%. MS (m/z)=1076 ([M−H]$^-$, 100%).

(Synthesis of Exemplified Compound (1-29))

Figure 3:
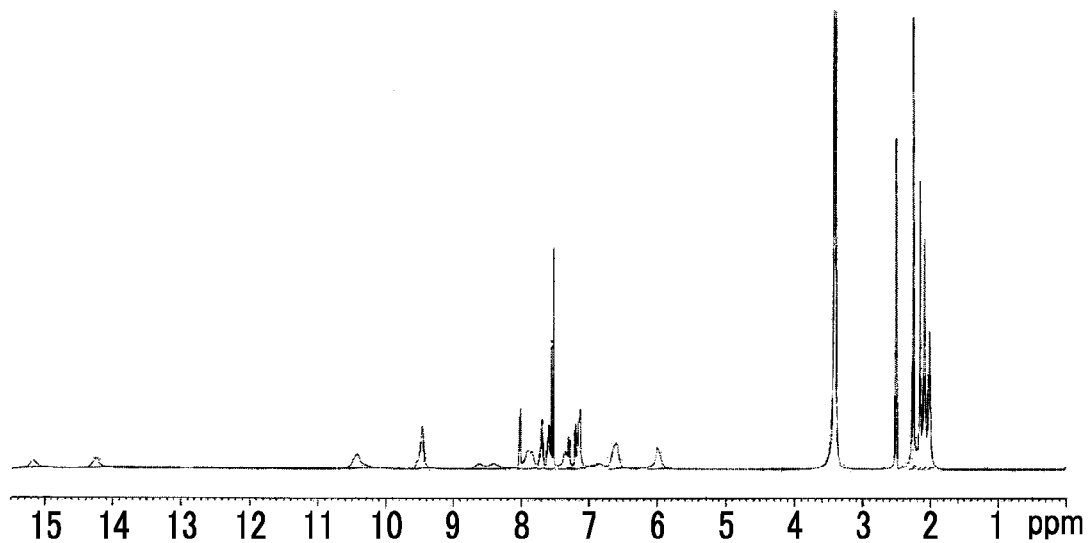
FIG. 3 is a diagram which shows the $^1$H-NMR spectrum in dimethyl sulfoxide-d6 of Exemplified Compound (1-29).

3 g of Exemplified Compound (1-5), 1.7 g of 5-amino salicylic acid, and 1.4 g of sodium bicarbonate were added to 15 mL of N,N-dimethylacetamide (DMAc) and allowed to react for 6 hours at 60° C. After filtering and separating the crystals which were obtained by adding 30 mL of 2-propanol dropwise into the reaction liquid, the resultant was purified by column chromatography (filler: SEPHA- DEX LH-20 (produced by Pharmacia), developing solvent: methanol) and crystals of the Exemplified Compound (1-29) were obtained. The yield was 3.0 g, the yield rate was 86%, and MS (m/z)=1237 ([M−H]⁻, 100%). FIG. 3 shows the ¹H-NMR spectrum of Exemplified Compound (1-29) in dimethyl sulfoxide-d6. In addition, FIG. 1 shows the absorption spectrum of Exemplified Compound (1-29) in a diluted aqueous solution. As shown in FIG. 1, the maximum absorption wavelength of absorption spectrum of the Exemplified Compound (1-29) in the diluted aqueous solution was 534 nm and the molar absorption coefficient was 81200.

(Synthesis of Exemplified Compound (1-55) and Exemplified Compound (1-56))

It is possible to synthesize Exemplified Compounds (1-55) and (1-56), for example, according to the following scheme.

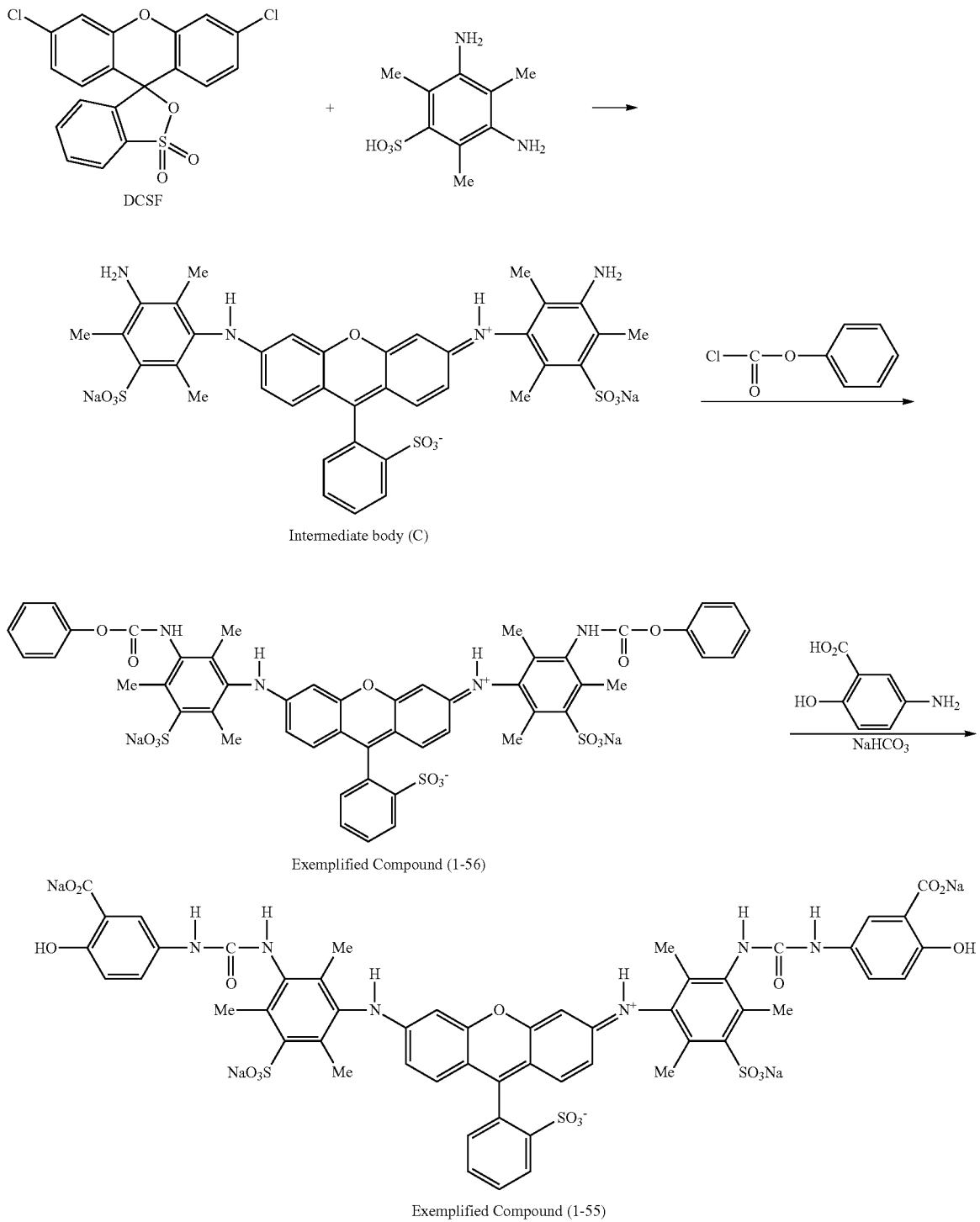

(Synthesis of Intermediate Body (C))

20 g of dichloro sulfophthalein (produced by Chugai Kasei Co., Ltd., DCSF (product name)), 46 g of 2,4-diaminomesitylene-6-sulfonic acid, 30 g of diazabicycloundecene (DBU), and 6.7 g of zinc chloride were added to 250 g of ethylene glycol and a reaction was carried out for 6 hours at 150° C. The obtained reaction liquid was cooled to room temperature, poured into 1 L of acetonitrile, and the obtained crystals were purified with column chromatography (filler: SEPHADEX LH-20 (produced by Pharmacia), developing solvent: water/methanol) and an intermediate body (C) was obtained. The yield was 7.7 g, the yield rate was 19%, and MS (m/z)=836 ([M−1]$^-$, 100%).

(Synthesis of Exemplified Compound (1-56))

3 g of the intermediate body (C) was dissolved in 20 mL of N,N-dimethylacetamide (DMAc) and cooled to 0° C. 1.7 g of chloroformic acid phenyl was added dropwise thereto and allowed to react for 1 hour at 0° C. After the reaction liquid was added dropwise into 150 mL of ethyl acetate, the precipitated crystals were filtered, separated, and washed with ethyl acetate, the obtained crystals were dried for 6 hours at 60° C. and crystals of Exemplified Compound (1-56) were obtained. The yield was 3.4 g, the yield rate was 88%, and MS (m/z)=1076 ([M−H]$^-$, 100%).

(Synthesis of Exemplified Compound (1-55))

Figure 2:
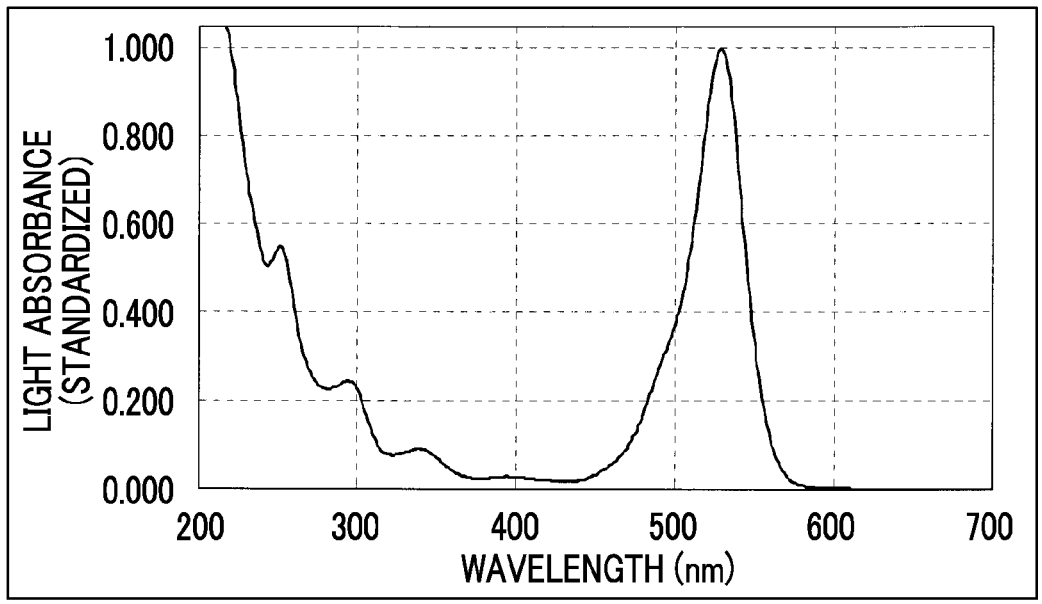
FIG. 2 is a diagram which shows an absorption spectrum in a diluted aqueous solution of Exemplified Compound (1-55).
Figure 4:
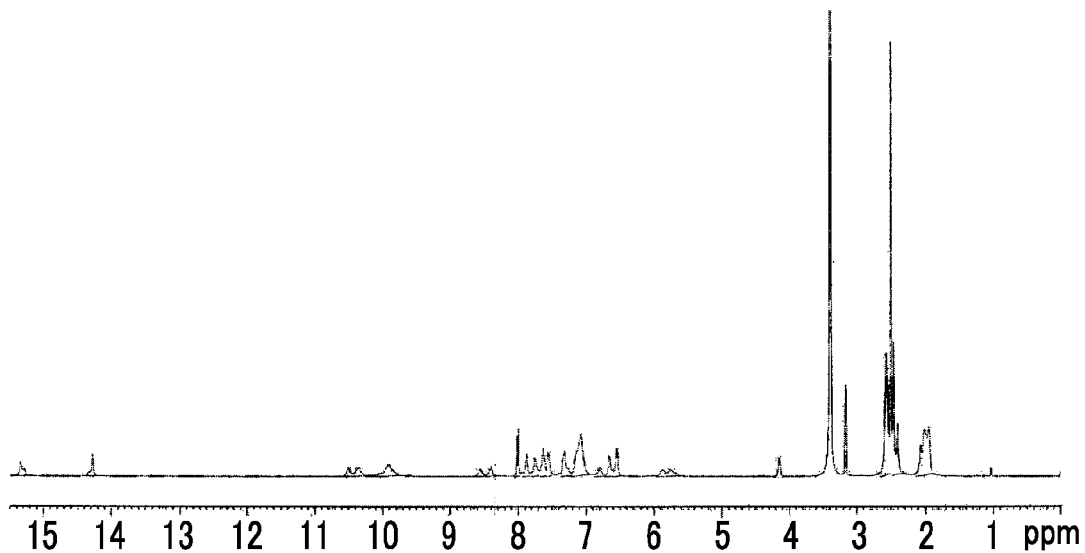
FIG. 4 is a diagram which shows the $^1$H-NMR spectrum in dimethyl sulfoxide-d6 of Exemplified Compound (1-55).

3 g of Exemplified Compound (1-56), 1.7 g of 5-amino salicylic acid, and 1.4 g of sodium bicarbonate were added to 15 mL of N,N-dimethylacetamide (DMAc) and a reaction was carried out for 6 hours at 60° C. After filtering and separating the crystals which were obtained by adding 30 mL of 2-propanol dropwise into the reaction liquid, the resultant was purified with column chromatography (filler: SEPHADEX LH-20 (produced by Pharmacia), developing solvent: methanol) and crystals of Exemplified Compound (1-55) were obtained. The yield was 3.1 g, the yield rate was 90%, and MS (m/z)=1237 ([M−H]$^-$, 100%). FIG. 4 shows the $^1$H-NMR spectrum of Exemplified Compound (1-55) in dimethyl sulfoxide-d6. In addition, FIG. 2 shows the absorption spectrum of Exemplified Compound (1-55) in a diluted aqueous solution. As shown in FIG. 2, the maximum absorption wavelength of absorption spectrum of the Exemplified Compound (1-55) in the diluted aqueous solution was 529 nm and the molar absorption coefficient was 92800.

It is also possible to synthesize the other exemplified compounds on the basis of the methods described above.

Example 1

After deionized water was added to the components below to make the total thereof 100 g, stirring was carried out for 1 hour while heating at 30° C. to 40° C. After that, the pH was adjusted to 9 with 10 mol/L of aqueous sodium hydroxide solution and a magenta ink liquid 1 was prepared by reducing the pressure and filtering using a micro filter with an average pore diameter of 0.25 μm.

Composition of Ink Liquid 1:

| | |
|---|---|
| Dye (Exemplified Compound (1-4)) | 3.50 g |
| Diethylene glycol | 10.65 g |
| Glycerine | 14.70 g |
| Diethylene glycol monobutyl ether | 12.70 g |
| Triethanolamine | 0.65 g |
| Olfine E1010 (produced by Nissin Chemical Industry Ltd.) | 0.9 g |

Examples 2 to 15 and Comparative Examples 1 and 2

Ink liquids using comparative compound 1 and compound 2 shown below were prepared as ink liquids 2 to 15 and comparative ink liquids in the same manner as the preparation of ink liquid 1 apart from changing the dye as shown in Table 1, Table 2 and Table 3 below.

The prepared ink liquids 1 to 15 and comparative ink liquids 1 and 2 were used as the ink jet recording ink.

(Image Recording and Evaluation)

The following evaluation was carried out on the ink jet recording ink in each of the Examples and Comparative Examples. Table 1, Table 2 and Table 3 show the results.

Here, in Table 1, Table 2, and Table 3, the saturation and ozone resistance and lightfastness were evaluated after each ink jet recording ink was loaded into an ink cartridge and an image was recorded on photo glossy paper (PHOTO PAPER PROFESSIONAL PT-201, product name, produced by Canon Inc.) using an ink jet printer (PIXUS iP8600, product name, produced by Canon Inc.).

<Printing Density>

A solid coated image (a recorded image with 100% applied voltage) was recorded on photo glossy paper (PHOTO PAPER PROFESSIONAL PT-201, product name, produced by Canon Inc.) using an ink jet printer (PIXUS iP8600, product name, produced by Canon Inc.) using each ink jet recording ink.

The printing density of the created solid coated image was measured using a reflection density meter (X-RITE 310TR).

<Saturation>

The saturation (C*) of the recording material was calculated by the following formula based on the measurement of color characteristics. The evaluation of the portion of the recording material at 50% of the applied voltage was carried out by measuring the values of L*, a*, and b* using a reflection density meter (X-RITE 310TR, product name) and calculating the saturation (C*) from the obtained value based on the following formula.

$$\text{Saturation } (C^*) = a(a^{*2} + b^{*2})^{1/2}$$

<Lightfastness>

After measuring an image density Ci directly after recording, the image density Cf was measured again after the image was irradiated with xenon light (100 thousand lux) for 3 days using a weather meter (ATLAS C.165), and the pigment residue rate (Cf/Ci×100%) was calculated and evaluated from the difference in the image densities before and after the xenon light irradiation. The image density was measured using a reflection density meter (X-RITE 310TR, product name). The pigment residue rate was measured by using the portion of the image of which the initial image density was in the vicinity of 1.0.

<Ozone Resistance>

A 5 kV AC voltage was applied while passing dry air into a double glass tube of a Siemens type ozonizer and, using this tube, photo glossy paper on which an image was formed was left in a box which was set in a dark place where the ozone gas density was 5±0.1 ppm at room temperature for 1 day, the image densities before and after being left in the ozone gas were measured using a reflection density meter (X-RITE 310TR, product name) and evaluated as the pigment residue rate (Cf$_2$/Ci×100%) from the initial image density Ci and the image density Cf$_2$ which was left in the ozone gas. Here, the pigment residue rate was measured using the portion of the image of which the initial image density was in the vicinity of 1.0. The ozone gas density in the box was set using an ozone gas monitor (model: OZG-EM-01) manufactured by APPLICS CO., LTD.

TABLE 1

| Examples/Comparative Examples | Dye Compound | Image Density | Saturation C* | Lightfastness (Remaining ratio %) | Ozone resistance (Remaining ratio %) |
|---|---|---|---|---|---|
| Example 1 | Exemplified Compound (1-4) | 2.40 | 89 | 91 | 93 |
| Example 2 | Exemplified Compound (1-8) | 2.44 | 94 | 94 | 93 |
| Example 3 | Exemplified Compound (1-20) | 2.37 | 91 | 93 | 97 |
| Example 4 | Exemplified Compound (1-10) | 2.36 | 92 | 87 | 94 |
| Example 5 | Exemplified Compound (1-23) | 2.39 | 94 | 90 | 93 |
| Example 6 | Exemplified Compound (1-27) | 2.38 | 92 | 91 | 93 |
| Example 7 | Exemplified Compound (1-33) | 2.38 | 90 | 90 | 93 |
| Example 8 | Exemplified Compound (1-34) | 2.36 | 97 | 85 | 95 |
| Comparative Example 1 | Comparative Compound 1 | 2.30 | 86 | 93 | 93 |
| Comparative Example 2 | Comparative Compound 2 | 2.22 | 93 | 64 | 65 |

TABLE 2

| Examples | Dye Compound | Image Density | Saturation C* | Lightfastness (Remaining ratio %) | Ozone resistance (Remaining ratio %) |
|---|---|---|---|---|---|
| Example 9 | Exemplified Compound (1-29) | 2.38 | 90 | 95 | 93 |
| Example 10 | Exemplified Compound (1-38) | 2.38 | 91 | 93 | 94 |
| Example 11 | Exemplified Compound (1-39) | 2.38 | 90 | 95 | 93 |
| Example 12 | Exemplified Compound (1-46) | 2.38 | 92 | 94 | 93 |
| Example 13 | Exemplified Compound (1-43) | 2.37 | 90 | 95 | 93 |

TABLE 3

| Examples | Dye Compound | Image Density | Saturation C* | Lightfastness (Remaining ratio %) | Ozone resistance (Remaining ratio %) |
|---|---|---|---|---|---|
| Example 14 | Exemplified Compound (1-54) | 2.45 | 97 | 88 | 89 |
| Example 15 | Exemplified Compound (1-55) | 2.38 | 98 | 91 | 90 |

As is clear from the results of Table 1, Table 2 and Table 3, the ink in the examples using the compounds of the present invention was excellent in all of printing density, saturation, lightfastness, and ozone resistance.

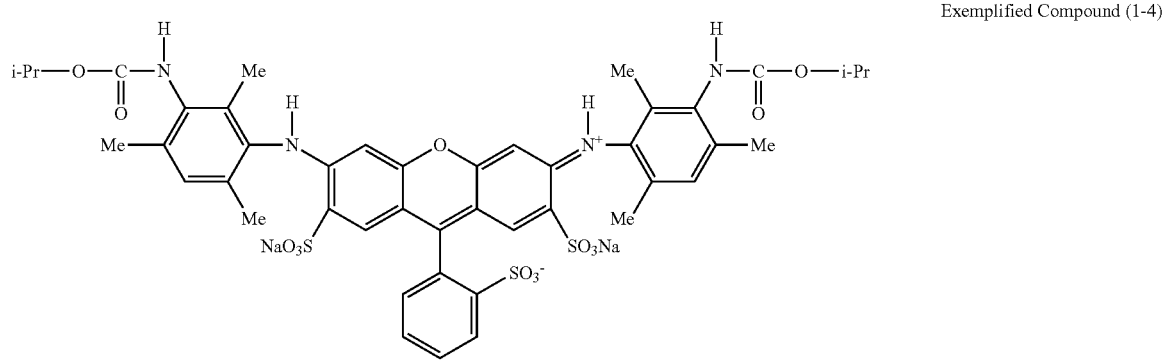

Exemplified Compound (1-4)

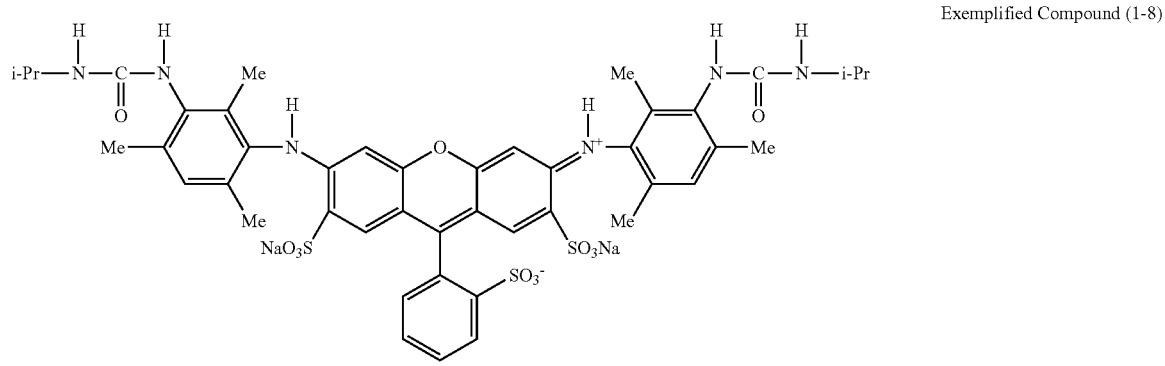

Exemplified Compound (1-8)

-continued
Exemplified Compound (1-20)
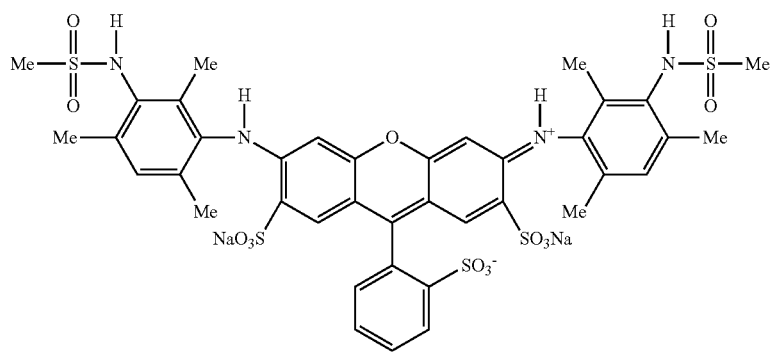
Exemplified Compound (1-10)
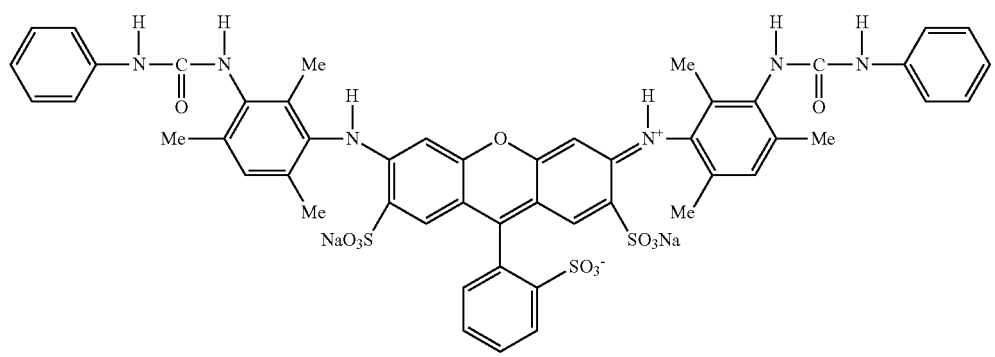
Exemplified Compound (1-23)
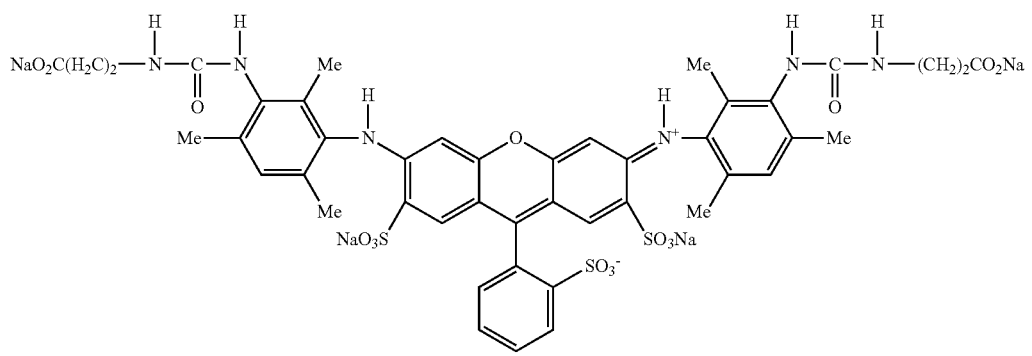
Exemplified Compound (1-27)
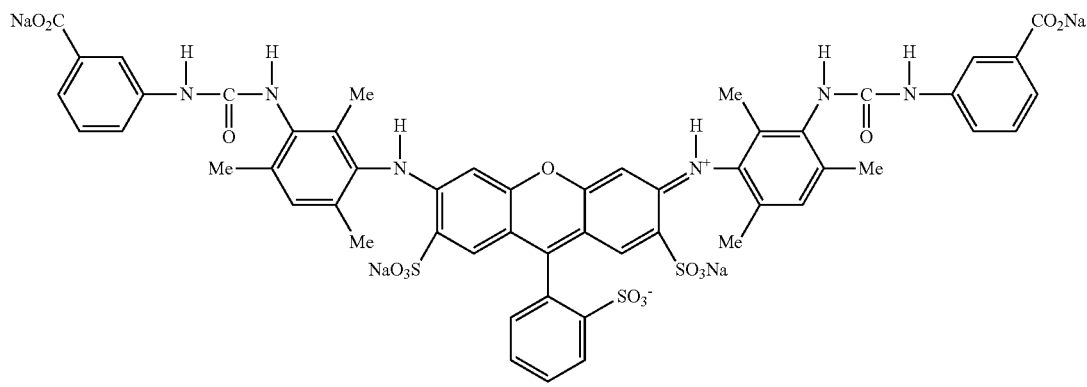

-continued
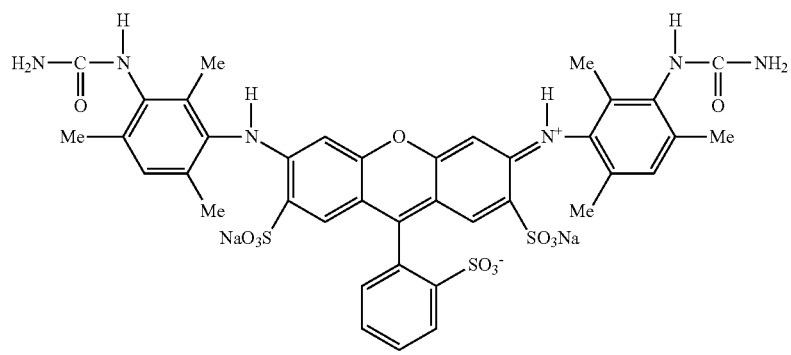
Exemplified Compound (1-33)
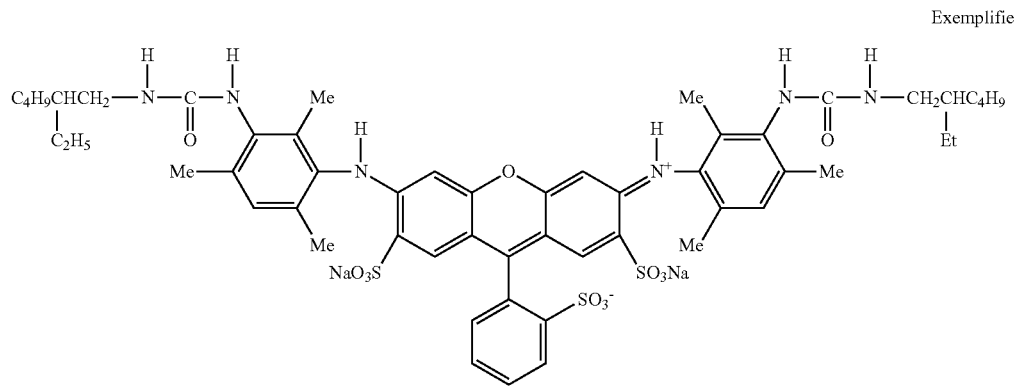
Exemplified Compound (1-34)
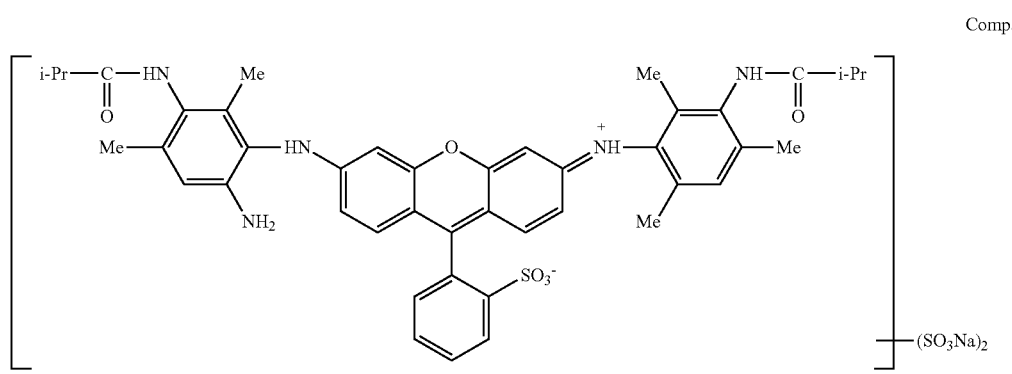
Comparative Compound 1
Coloring Compound (11) in JP2011-148973A
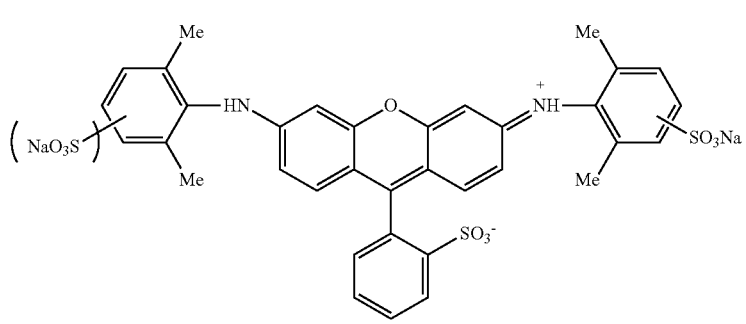
Comparative Compound 2
C.I. Acid Red 289

-continued
Exemplified Compound (1-29)
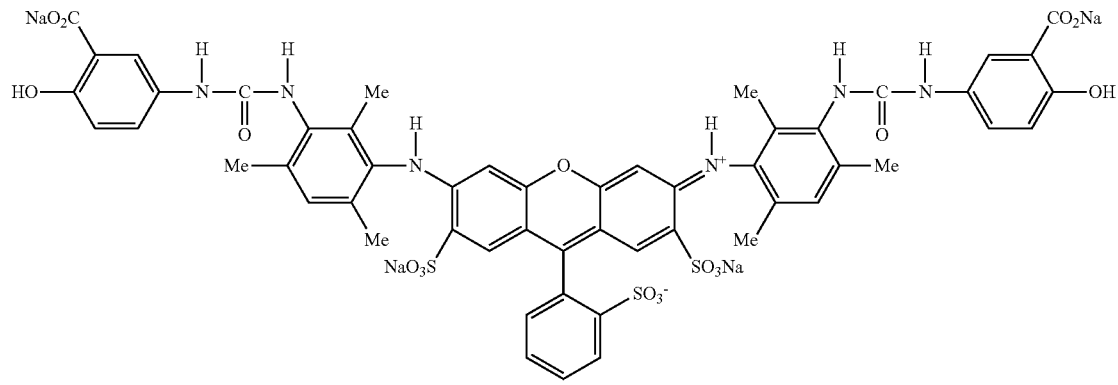
Exemplified Compound (1-38)
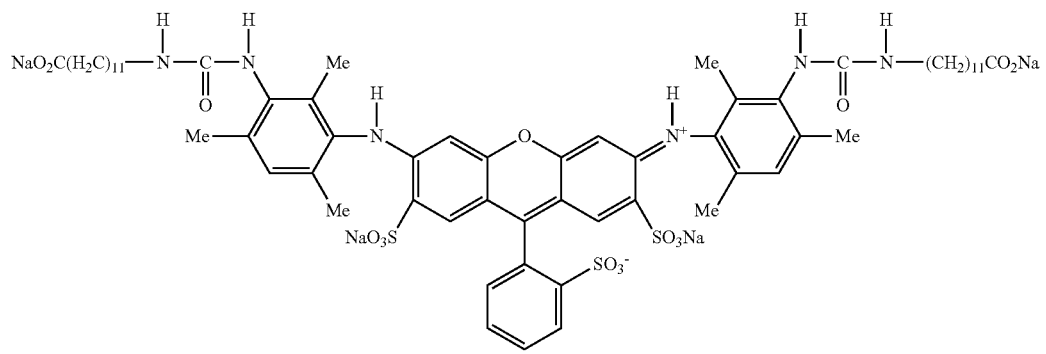
Exemplified Compound (1-39)
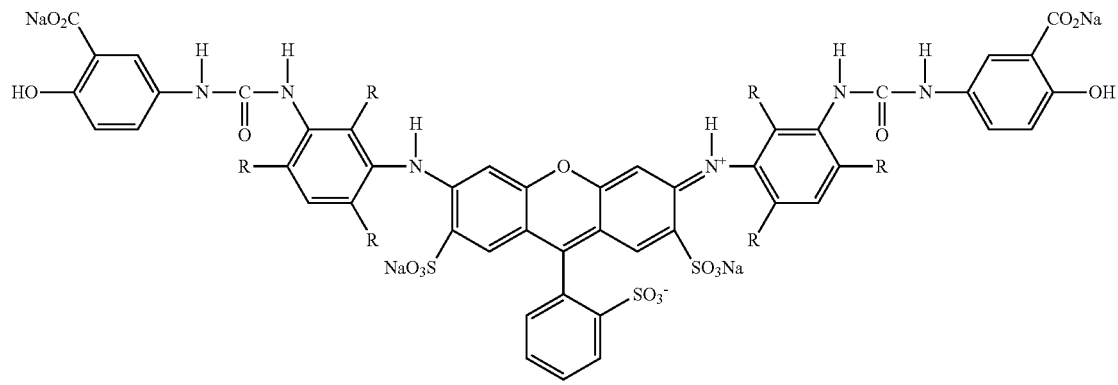
R: Et/Me = 2/1
Exemplified Compound (1-43)
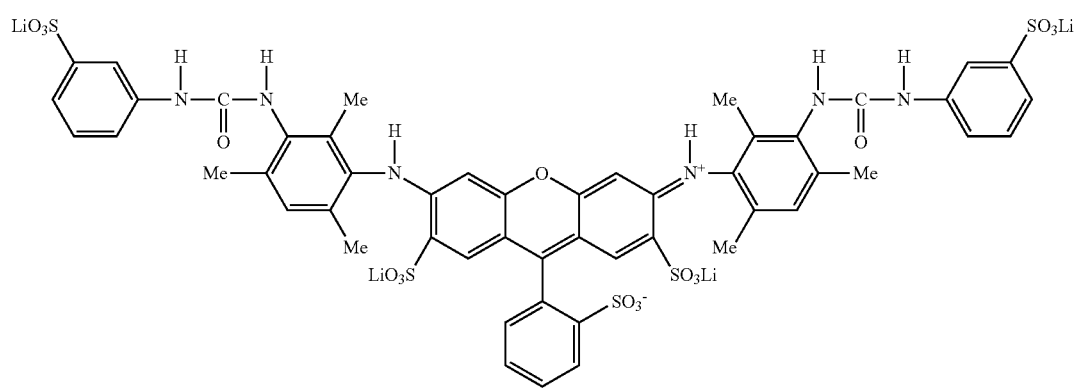

-continued
Exemplified Compound (1-46)
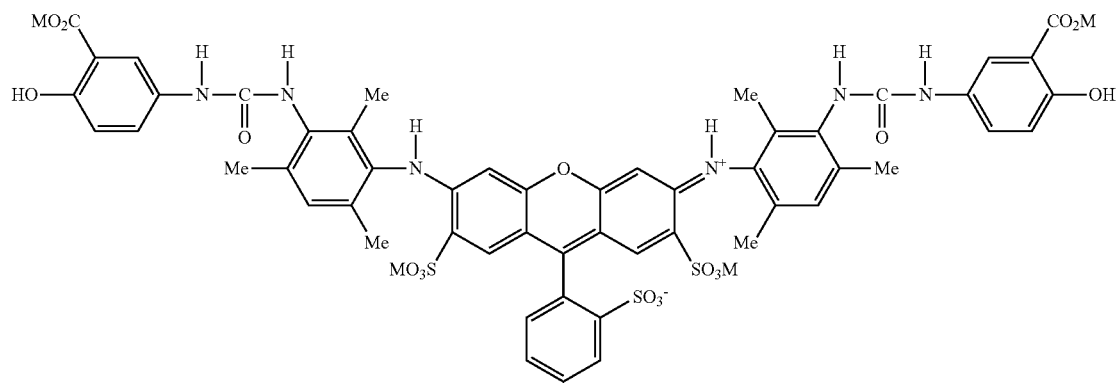
M: K/Na = 1/1
Exemplified Compound (1-52)
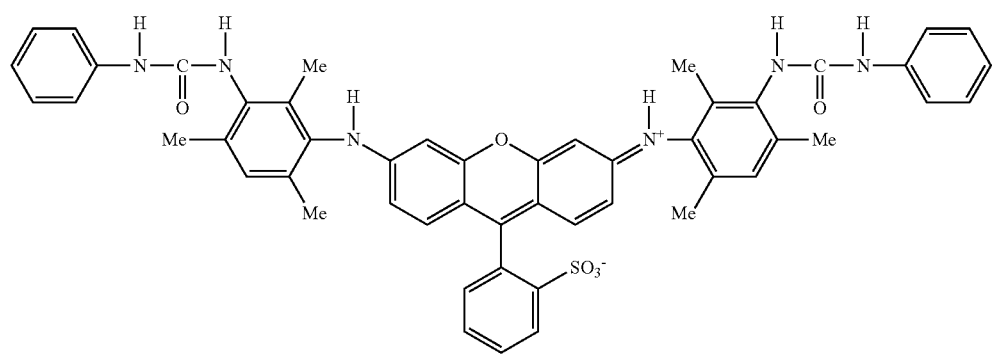
Exemplified Compound (1-54)
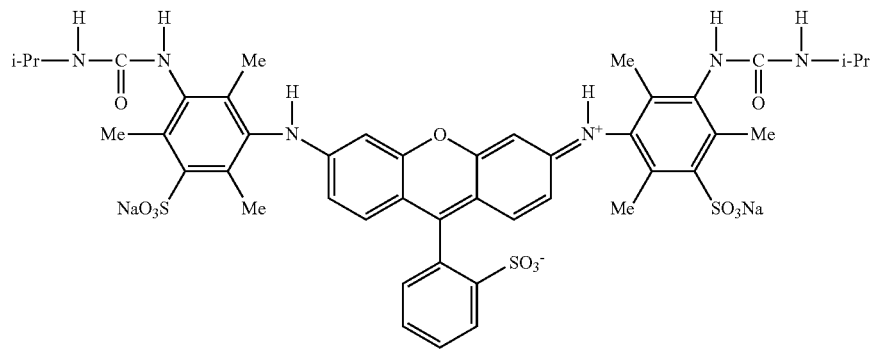
Exemplified Compound (1-55)
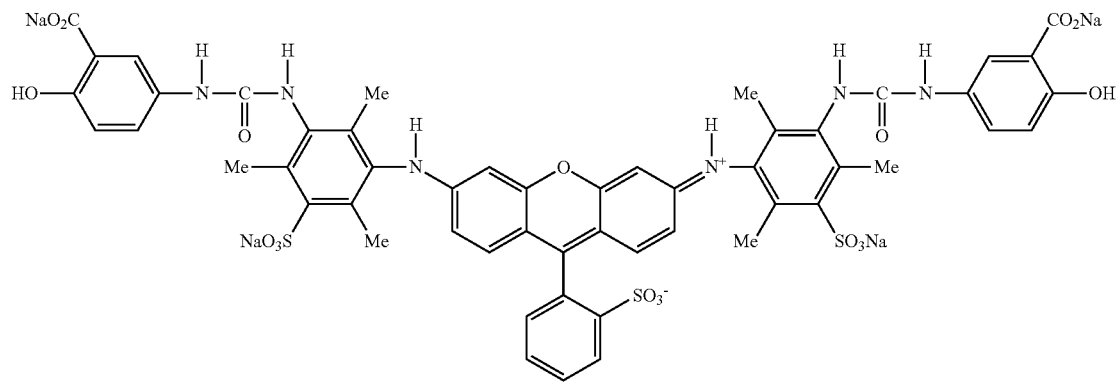

Example 16

Production and Evaluation of the Color Filter (Preparation of Positive Resist Composition)

A positive resist composition was obtained by mixing 3.4 parts by mass of cresol novolac resin (polystyrene equivalent weight average molecular weight 4300) obtained from a mixture of m-cresol/p-cresol/formaldehyde (reaction molar ratio=5/5/7.5), 1.8 parts by mass of o-naphthoquinonediazide-5-sulfonic acid ester (average 2 hydroxyl groups are esterified) which was prepared using the phenolic compounds below, 0.8 parts by mass of hexamethoxy methylol melamine, 20 parts by mass of ethyl lactate, and 1 part by mass of Exemplified Compound (1-52).

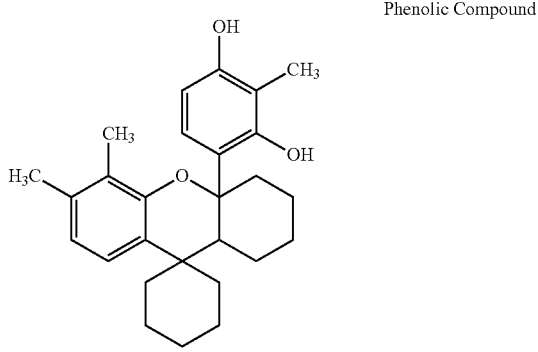 [SMILES: Cc1ccc2c(c1C)OC1(c3ccc(O)c(C)c3O)CCCCC1C21CCCCC1]

Phenolic Compound (Production and Evaluation of Color Filter)

After spin coating the obtained positive resist composition on a silicon wafer, the solvent was evaporated. Then, the silicon wafer was exposed through a mask and the o-naphthoquinonediazide-5-sulfonic acid ester was decomposed. Then, the resultant was heated at 100° C. and a positive type colored pattern which had a resolution of 0.8 μm was then obtained by removing the exposed portion by alkali development. After exposing the entire surface of the positive type colored pattern, a complementary color filter of magenta was obtained by heating at 150° C. for 15 minutes. The exposure was carried out using an i-ray exposure stepper HITACHI LD-5010-i (product name, produced by Hitachi, Ltd., NA=0.40). In addition, SOPD or SOPD-B (both product names, produced by Sumitomo Chemical Co., Ltd.) was used as the developing solution.

The obtained color filter had excellent color purity and high transparency, and exhibited excellent performances.

Example 17

Production and Evaluation of Color Toner (Production of Color Toner)

After 3 parts by mass of Exemplified Compound (1-52) which is a xanthene dye of the present invention and 100 parts by mass of a resin for toner "styrene-acrylic acid ester copolymer; HIMER TB-1000F (product name, produced by Sanyo Chemical Industries, Ltd.)" were mixed and ground using a ball mill, the resultant was heated to 150° C. and melted and mixed, and the results were cooled, crushed using a hammer mill, and then pulverized using a pulverizer using an air-jet system. Furthermore, particles which have a particle diameter of 1 μm to 20 μm were classified and selected to make a toner.

(Evaluation of Color Toner)

900 parts by mass of carrier iron powder (EFV250/400, product name, Powdertech Co., Ltd.) were uniformly mixed with 10 parts by mass of the toner to make a developer. When copying was carried out using a dry type plain paper electrophotographic copier using the developer "NP-5000, product name, produced by Canon Co., Ltd.", it is understood that the resultant had excellent spectral characteristics and exhibited excellent properties as a toner.

Example 18

Preparation and Evaluation of Sublimation Transfer Ink (Preparation of Sublimation Transfer Ink)

A dispersing treatment was carried out on a mixture consisting of 4.0 g of Exemplified Compound (1-52), 2.0 g of formalin condensate of β-naphthalene sulfonic acid as an anion-based dispersing agent, and 40.0 g of ion-exchange water using 0.2 mm diameter glass beads in a sand mill while cooling for approximately 15 hours. After the dispersing treatment, ion-exchange water was added for dilution, the dispersion liquid described above was then filtered using a glass fiber filter paper GC-50 (produced by Toyo Roshi Kaisha, Ltd., pore size of filter is 0.5 μm) and an aqueous dispersion of which the components with a large particle size were removed was obtained.

Next, 46.0 g of aqueous dispersion which was obtained as described above, 20.0 g of glycerin, 3.0 g of triethylene glycol monomethyl ether, and 31.0 g of ion-exchange water were mixed to obtain a sublimation transfer ink.

(Evaluation of Sublimation Transfer Ink)

The sublimation transfer ink described above was introduced into the ink jet apparatus, a paper which has an ink-receiving layer which consists of materials including silica was prepared as an intermediate transfer medium and, the sublimation transfer ink was discharged onto the ink-receiving layer of the intermediate transfer medium described above at 1440×720 dots per inch (dpi) at 100% duty, 50% duty, and 5% duty. In addition, "duty" is defined by Equation (A) below and indicates the units of the calculated value D.

$$D=\{(\text{number of actual printing dots})/(\text{vertical resolution}\times\text{horizontal resolution})\}\times 100 \text{ (duty)} \quad (A)$$

Then, the ink-receiving layer of the intermediate transfer medium to which the sublimation transfer ink was applied was closely adhered to a fabric (to be dyed) consisting of polyester fibers and, in this state, sublimation transfer was performed using a heat press machine TP-608M produced by Taiyo Seiki Co., Ltd. under the conditions of 200° C.×60 seconds.

The obtained fabrics did not lose color even after washing with water and fabrics dyed a magenta color were obtained.

INDUSTRIAL APPLICABILITY

The compound of the present invention is able to be preferably used for a coloring composition and an ink jet recording ink. The coloring composition and the ink jet recording ink of the present invention have high saturation and excellent printing density and are able to form images with excellent lightfastness and ozone resistance. In addition, the present invention provides an ink jet recording method, an ink jet printer cartridge, and an ink jet recording material which use the ink jet recording ink described above.

Furthermore, the present invention provides a color filter, a color toner, and a transfer ink which contain the compound described above.

Detailed description was given of the present invention with reference to specific embodiments; however, it will be clear to a person skilled in the art that it is possible to add various changes or modifications without departing from the spirit and scope of the present invention.

The present application is based on Japanese Patent (JP2014-003571) which was applied for on Jan. 10, 2014, Japanese Patent (JP2014-082185) which was applied for on Apr. 11, 2014, Japanese Patent (JP2014-167833) which was applied on Aug. 20, 2014, and Japanese Patent (JP2014-266429) which was applied on Dec. 26, 2014, the content of which is incorporated herein by reference.

What is claimed is:

1. A compound which is represented by General Formula (1) below,

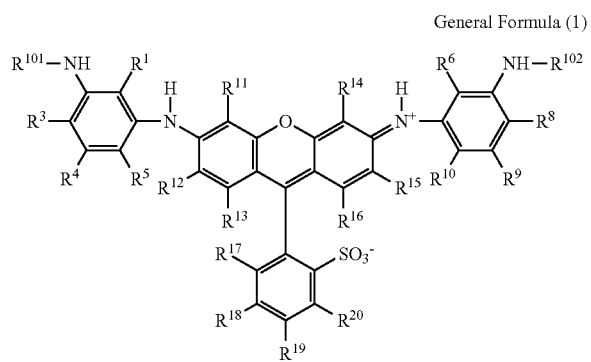

General Formula (1)

in General Formula (1), $R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$ and $R^{20}$ each independently represents a hydrogen atom or a substituent group selected from Substituent Group (A) below, and $R^{101}$ and $R^{102}$ each independently represents a substituted or unsubstituted alkyl group, a substituted or unsubstituted aryl group having a 5- or 6-membered ring, a substituted or unsubstituted heterocyclic group having a 5- or 6-membered ring, a substituted or unsubstituted alkylsulfonyl group, a substituted or unsubstituted arylsulfonyl group, a substituted or unsubstituted alkoxycarbonyl group, a substituted or unsubstituted aryloxycarbonyl group, a carbamoyl group, a substituted or unsubstituted mono alkyl amino carbonyl group, a substituted or unsubstituted dialkyl amino carbonyl group, a substituted or unsubstituted monoaryl amino carbonyl group, a substituted or unsubstituted diaryl amino carbonyl group, or a substituted or unsubstituted alkyl aryl amino carbonyl group, with the proviso that, when one of the above-listed groups for $R^{101}$ and $R^{102}$ is substituted, the substituent is selected from the Substituent Group (A) below;

wherein the Substituent Group (A) is a substituent group selected from the group consisting of a halogen atom, an alkyl group, an aralkyl group, an alkenyl group, an alkynyl group, an aryl group having a 5- or 6-membered ring, a heterocyclic group having a 5- or 6-membered ring, a cyano group, a hydroxyl group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acyl amino group, an amino carbonyl amino group, an alkoxycarbonyl amino group, an aryloxycarbonyl amino group, a sulfamoyl amino group, an alkyl or an aryl sulfonyl amino group, a mercapto group, an alkylthio group, an arylthio group, a heterocyclic thio group, a sulfamoyl group, an alkyl or an arylsulfinyl group, an alkyl or an arylsulfonyl group, an acyl group, an aryloxycarbonyl group, an alkoxycarbonyl group, a carbamoyl group, an aryl or a heterocyclic azo group, an imide group, a phosphino group, a phosphinyl group, a phosphinyloxy group, a phosphinyl amino group, a silyl group and an ionic hydrophilic group, and wherein the substituent groups in the Substituent Group (A) may optionally be substituted with a substituent group selected from the Substituent Group (A) above.

2. The compound according to claim 1, wherein $R^{101}$ and $R^{102}$ each independently represents a substituted or unsubstituted alkylsulfonyl group, a substituted or unsubstituted arylsulfonyl group, a substituted or unsubstituted alkoxycarbonyl group, a substituted or unsubstituted aryloxycarbonyl group, a carbamoyl group, a substituted or unsubstituted mono alkyl amino carbonyl group, a substituted or unsubstituted dialkyl amino carbonyl group, a substituted or unsubstituted monoaryl amino carbonyl group, or a substituted or unsubstituted diaryl amino carbonyl group.

3. The compound according to claim 1, wherein $R^1$, $R^5$, $R^6$, and $R^{10}$ each independently represents an alkyl group with 1 to 6 carbon atoms.

4. The compound according to claim 1, wherein $R^4$ and $R^9$ each independently represents a sulfo group.

5. The compound according to claim 1, wherein $R^{12}$ and $R^{15}$ each independently represents a sulfo group.

6. The compound according to claim 1, wherein $R^3$ and $R^8$ each independently represents an alkyl group with 1 to 6 carbon atoms.

7. A coloring composition comprising:
the compound according to claim 1.

8. An ink jet recording ink comprising:
the compound according to claim 1.

9. An ink jet recording method using the ink jet recording ink according to claim 8.

10. An ink jet printer cartridge which is filled with the ink jet recording ink according to claim 8.

11. A color filter comprising:
the compound according to claim 1.

12. A color toner comprising:
the compound according to claim 1.

13. A transfer ink comprising:
the compound according to claim 1.

14. The compound according to claim 1, wherein $R^1$, $R^5$, $R^6$ and $R^{10}$ each independently represents a hydrogen atom, a substituted or unsubstituted alkyl group, a substituted or unsubstituted aryl group having a 5- or 6-membered ring, a substituted or unsubstituted alkoxy group, a substituted or unsubstituted aryloxy group, a carboxyl group, or a halogen atom, provided that for any recited substituted groups, the substituents are selected from the Substituent Group A.

15. The compound according to claim 1, wherein $R^4$ and $R^9$ each independently represents a hydrogen atom, a substituted or unsubstituted alkyl group, a substituted or unsubstituted aryl group having a 5- or 6-membered ring, a substituted or unsubstituted alkoxy group, a substituted or unsubstituted aryloxy group, a substituted or unsubstituted amino group, a substituted or unsubstituted acyl amino group, a substituted or unsubstituted alkoxycarbonyl amino group, a substituted or unsubstituted alkylsulfonyl amino group, a substituted or unsubstituted arylsulfonyl amino group, a substituted or unsubstituted alkyl ureido group, a substituted or unsubstituted aryl ureido group, a sulfo group, a carboxyl group, or a halogen atom, provided that for any recited substituted groups, the substituents are selected from the Substituent Group A.

16. The compound according to claim 1, wherein $R^3$ and $R^8$ each independently represents a hydrogen atom, a substituted or unsubstituted alkyl group, a substituted or unsubstituted aryl group having a 5- or 6-membered ring, a substituted or unsubstituted alkoxy group, a substituted or unsubstituted aryloxy group, a substituted or unsubstituted amino group, a substituted or unsubstituted acyl amino group, a substituted or unsubstituted alkoxycarbonyl amino group, a substituted or unsubstituted alkylsulfonyl amino group, a substituted or unsubstituted arylsulfonyl amino group, a substituted or unsubstituted alkyl ureido group, a substituted or unsubstituted aryl ureido group, a sulfo group, a carboxyl group, or a halogen atom, provided that for any recited substituted groups, the substituents are selected from the Substituent Group A.

17. The compound according to claim 1, wherein $R^{11}$, $R^{14}$, $R^{13}$, $R^{16}$, $R^{17}$, $R^{18}$, $R^{19}$ and $R^{20}$ each independently represents a hydrogen atom, a substituted or unsubstituted alkyl group, a substituted or unsubstituted aryl group having a 5- or 6-membered ring, a substituted or unsubstituted alkoxy group, a substituted or unsubstituted aryloxy group, a hydroxy group, a halogen atom, or a sulfo group, provided that for any recited substituted groups, the substituents are selected from the Substituent Group A.

18. The compound according to claim 1, wherein $R^{12}$ and $R^{15}$ each independently represents a hydrogen atom, a substituted or unsubstituted alkyl group, a substituted or unsubstituted aryl group having a 5- or 6-membered ring, a halogen atom, or a sulfo group, provided that for any recited substituted groups, the substituents are selected from the Substituent Group A.

* * * * *